United States Patent
Liu et al.

(10) Patent No.: US 12,531,428 B2
(45) Date of Patent: Jan. 20, 2026

(54) POWER SUPPLY CIRCUIT, SENSING DEVICE AND APPLICATION THEREOF

(71) Applicant: Wuhan Linptech Co., Ltd., Wuhan (CN)

(72) Inventors: Yunjie Liu, Wuhan (CN); Xiaoke Cheng, Wuhan (CN)

(73) Assignee: Wuhan Linptech Co., Ltd., Wuhan (CN)

( * ) Notice: Subject to any disclaimer, the term of this patent is extended or adjusted under 35 U.S.C. 154(b) by 140 days.

(21) Appl. No.: 18/520,656

(22) Filed: Nov. 28, 2023

(65) Prior Publication Data

US 2024/0154439 A1    May 9, 2024

Related U.S. Application Data

(63) Continuation of application No. PCT/CN2021/119265, filed on Sep. 18, 2021.

(30) Foreign Application Priority Data

Jun. 18, 2021   (CN) .......................... 202110681498.2

(51) Int. Cl.
*H02J 7/00* (2006.01)
*G01V 3/08* (2006.01)

(52) U.S. Cl.
CPC ............ *H02J 7/0063* (2013.01); *G01V 3/081* (2013.01); *H02J 7/0031* (2013.01); *H02J 7/007* (2013.01)

(58) Field of Classification Search
None
See application file for complete search history.

(56) References Cited

U.S. PATENT DOCUMENTS

| 11,177,669 | B2* | 11/2021 | Sung | H02J 7/0016 |
| 11,411,418 | B2* | 8/2022 | Rea | H02J 7/0047 |
| 11,621,667 | B2* | 4/2023 | Allen | H02J 13/00004 320/101 |
| 2012/0256492 | A1* | 10/2012 | Song | H02J 1/102 307/64 |
| 2015/0244191 | A1* | 8/2015 | Matsumura | H02J 7/0013 320/116 |
| 2024/0356464 | A1* | 10/2024 | Liu | H02N 11/002 |

FOREIGN PATENT DOCUMENTS

| CN | 102507015 A | 6/2012 |
| CN | 103139936 A | 6/2013 |
| CN | 107223299 A | 9/2017 |
| CN | 110212627 A | 9/2019 |
| CN | 101808423 A | 8/2020 |

* cited by examiner

*Primary Examiner* — Richard Isla
(74) *Attorney, Agent, or Firm* — Westbridge IP LLC

(57) ABSTRACT

The present disclosure provides a power supply circuit, a sensing device and an application thereof, comprising: a transducer; an energy storage assembly operably connected to the transducer; a power supply assembly electrically connected between the energy storage assembly and a power consumption module so that the energy storage assembly does not supply power to the power consumption module when the power consumption module is in a non-powered state and the output voltage is within a specified voltage interval; and the energy storage assembly is caused to supply power to the power consumption module when the output voltage is within a non-specified voltage interval.

17 Claims, 29 Drawing Sheets

POWER SUPPLY CIRCUIT, SENSING DEVICE AND APPLICATION THEREOF

TECHNICAL FIELD

The present disclosure relates to the field of power supply, and more particularly to a power supply circuit, a sensing device and an application thereof.

BACKGROUND ART

The power supply circuit can be understood as a circuit capable of supplying power to a power consumption module, wherein a transducer can be used to obtain energy of a specified form other than electrical energy and then convert it into usable electrical energy.

In the related art, the supply of the specified form of energy (e.g. optical energy) is not necessarily sufficient, and if not sufficient, the power-on operation of the power consumption module cannot be driven in a timely and effective manner.

SUMMARY OF THE INVENTION

The present disclosure provides a power supply circuit, a sensing device and an application thereof to solve the problems of the prior art.

According to a first aspect of the present disclosure, the present disclosure provides a power supply circuit, comprising:
 a transducer configured to induce energy in a form other than electrical energy to produce electrical energy;
 an energy storage assembly directly or indirectly operably connected to the transducer and configured to receive and store the electrical energy;
 a power supply assembly, the power supply assembly being electrically connected between the energy storage assembly and a power consumption module, and being configured to monitor an output voltage of the energy storage assembly so that the energy storage assembly does not supply power to the power consumption module when the power consumption module is in a non-powered state and the output voltage is within a specified voltage interval, thereby forming a pre-power supply phase; and the energy storage assembly is caused to supply power to the power consumption module when the output voltage is within a non-specified voltage interval, thereby forming a power supply phase.

According to a second aspect of the present disclosure, the present disclosure provides a sensing device, comprising:
 at least one sensor, the sensor being provided to generate a sensing signal in response to a detection result of external detection;
 a power supply circuit, the power supply circuit comprising:
 a transducer configured to induce energy in a form other than electrical energy to produce electrical energy;
 an energy storage assembly directly or indirectly operably connected to the transducer and configured to receive and store the electrical energy;
 a power supply assembly, the power supply assembly being electrically connected between the energy storage assembly and a power consumption module, and being configured to monitor an output voltage of the energy storage assembly so that the energy storage assembly does not supply power to the power consumption module when the power consumption module is in a non-powered state and the output voltage is within a specified voltage interval, thereby forming a pre-power supply phase; and the energy storage assembly is caused to supply power to the power consumption module when the output voltage is within a non-specified voltage interval, thereby forming a power supply phase, such that the power consumption module is powered during the power supply phase to transmit a wireless signal upon receiving the sensing signal.

According to a third aspect of the present disclosure, the present disclosure provides a power supply circuit, comprising:
 a transducer for generating electrical energy;
 a first energy storage portion directly or indirectly operably connected to the transducer and configured to receive and store the electrical energy;
 a second energy storage portion directly or indirectly connected to the transducer through a first on-off portion and configured to be adapted to receive and store the electrical energy when the first switching unit is turned on; and
 a comparison control module configured to monitor a voltage of the first energy storage portion in the circuit, and output a first level for controlling the first on-off portion to be turned off to the first on-off portion or control the output control terminal to be in a high impedance state using an output control terminal when the voltage of the first energy storage portion is lower than the specified threshold value; and when the output control terminal is in the high impedance state, the first on-off portion is kept off, such that the transducer only charges the first energy storage portion to form a first charging state; and when the voltage of the first energy storage portion is greater than or equal to the specified threshold value, the output control terminal is used to output to the first on-off portion a second level for controlling the first on-off portion to be turned on such that the transducer supplies power to the first energy storage portion and the second energy storage portion simultaneously to form a second charging state.

The power supply circuit, the sensing device and the application thereof provided in the present disclosure can effectively improve the charging efficiency of energy storage before power-on and realize efficient charging before power-on. On this basis, since power-on necessarily requires a certain voltage for power-on, in this solution, the power consumption module can be powered on as soon as possible to improve the starting speed of the device and realize rapid starting.

BRIEF DESCRIPTION OF THE DRAWINGS

In order to explain the technical solutions in the embodiments of the present disclosure or in prior art more clearly, the following contents will briefly introduce the drawings which need to be used in the embodiments or in prior art. It would be obvious that the drawings in the following description are only embodiments of the present disclosure, and it is possible for a person skilled in the art to obtain other drawings according to these drawings provided without involving any inventive effort.

DETAILED DESCRIPTION OF THE INVENTION

The embodiments of the present disclosure will now be described more clearly and fully hereinafter with reference to the accompanying drawings, in which embodiments of the disclosure are shown. It is to be understood that the embodiments described are only a few, but not all embodiments of the disclosure. Based on the embodiments of the present disclosure, all other embodiments obtained by a person of ordinary skill in the art without inventive effort fall within the scope of the present disclosure.

The terms "first", "second", "third", "fourth", and the like (if present) in the description and in the claims, and in the above-described figures, are used for distinguishing between similar objects and not necessarily for describing a particular sequential or chronological order. It is to be understood that the data so used are interchangeable under appropriate circumstances such that the embodiments of the disclosure described herein are capable of operation in sequences other than those illustrated or otherwise described herein. Furthermore, the terms "comprising" and "having", as well as any variations thereof, are intended to cover a non-exclusive inclusion, such that a process, method, system, article, or device that comprises a list of steps or elements is not necessarily limited to those steps or elements expressly listed, but may include other steps or elements not expressly listed or inherent to such process, method, article, or device.

Hereinafter, the technical solution of the present disclosure will be described in detail with specific embodiments. The following specific embodiments may be combined with one another, and the same or similar concepts or processes may not be repeated in some embodiments.

Figure 1:
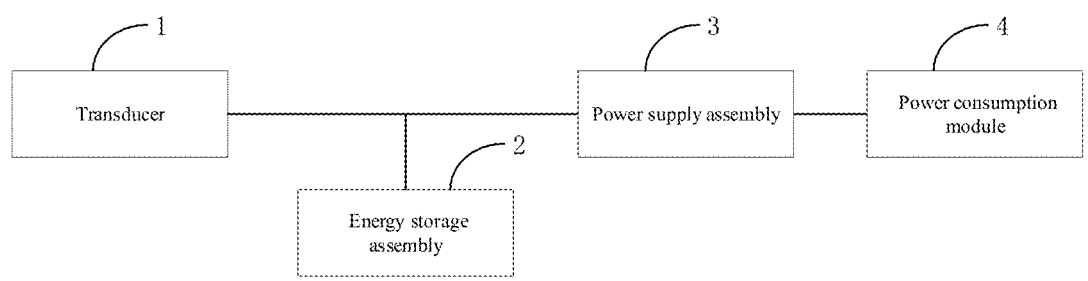
FIG. 1 is a schematic configuration diagram I of a power supply circuit and a power consumption module according to an embodiment of the present disclosure.

With reference to FIG. 1 in combination with other figures, an embodiment of the present disclosure provides a power supply circuit, comprising:
- a transducer 1 configured to induce energy in a form other than electrical energy to produce electrical energy; and
- an energy storage assembly 2 directly or indirectly operably connected to the transducer and configured to receive and store the electrical energy, wherein the term "operable connection" is to be understood to mean a connection suitable for enabling the transmission of electrical signals between the transducer 1 and the energy storage assembly 2, thereby enabling the energy storage assembly 2 to perform the operation of "receiving and storing electrical energy" when the transducer generates electrical energy. Furthermore, in some of the solutions, during the process of receiving and storing electrical energy by the energy storage assembly 2, at least one of the power supply assembly 3 and the power consumption module 4 can be introduced to realize the control, guidance, guarantee and assistance of the process of "receiving and storing the electrical energy". a power supply assembly 3, wherein the power supply assembly 3 is electrically connected between the energy storage assembly 2 and a power consumption module 4, and is configured and adapted to monitor an output voltage of the energy storage assembly 2, and further:
  - when the power consumption module 4 is in a non-powered state and the output voltage is within a specified voltage interval, the energy storage assembly 2 does not supply power to the power consumption module 4, thereby forming a pre-power supply stage; and
  - when the output voltage is in a non-specified voltage interval, the energy storage assembly supplies power to the power consumption module, thereby forming a power supply phase.

Being in the non-specified voltage interval can be understood as being not in the specified voltage interval. The specified voltage interval is understood to mean any pre-specified voltage interval or voltage interval specified during operation. The specified voltage interval may be characterized by an upper voltage threshold value and/or a lower voltage threshold value. In one example, the specified voltage interval may refer to a range of intervals that is less than (or not greater than) a first voltage threshold value.

The first voltage threshold value matches the power required by the power consumption module to complete one time of powering up.

The transducer may be an energy converter that converts any one or more of optical energy, electromagnetic wave energy, vibration energy, and thermal energy into electrical energy. In a further example, the transducer comprises a solar panel. The solar panel has a length and a width of X and Y, respectively, X being in a range of [30 mm,40 mm] and Y being in a range of [10 mm,16 mm]. In some examples, the solar panel may be an amorphous silicon low-light solar panel. Such solar panels enable efficient collection of optical energy in low light environments as compared to conventional solar panels.

In the above-mentioned solution, since the power consumption module is in a non-powered state, and the output voltage does not need to supply power to the power consumption module when it is within a specified voltage interval, at this moment, even if the energy storage assembly receives and stores the electrical energy of the transducer, the energy storage assembly will not be output to the power consumption module, and it can help to preferentially satisfy the energy storage requirement in the non-powered state and when the stored electrical energy is low. Compared with the solution of supplying power while storing energy, the solution can effectively improve the charging efficiency of the energy storage assembly before the power consumption module is not powered, and achieve efficient charging of the energy storage assembly before the power consumption module is not powered, and on this basis, since the power-on of the power consumption module necessarily needs a certain voltage for power supply, in the present solution, the power consumption module can be powered on as soon as possible to improve the starting speed of the power consumption module and realize the rapid start-up of the power consumption module.

Figure 2:
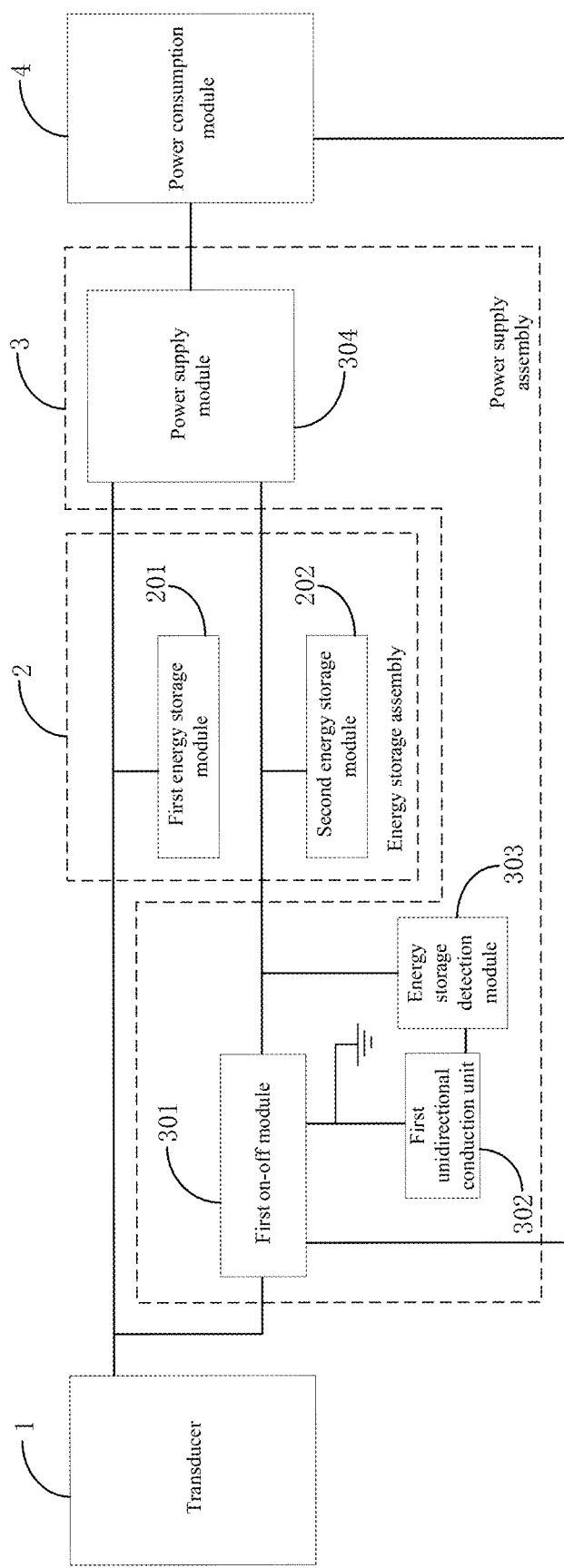
FIG. 2 is a schematic configuration diagram II of a power supply circuit and a power consumption module according to an embodiment of the present disclosure.
Figure 3:
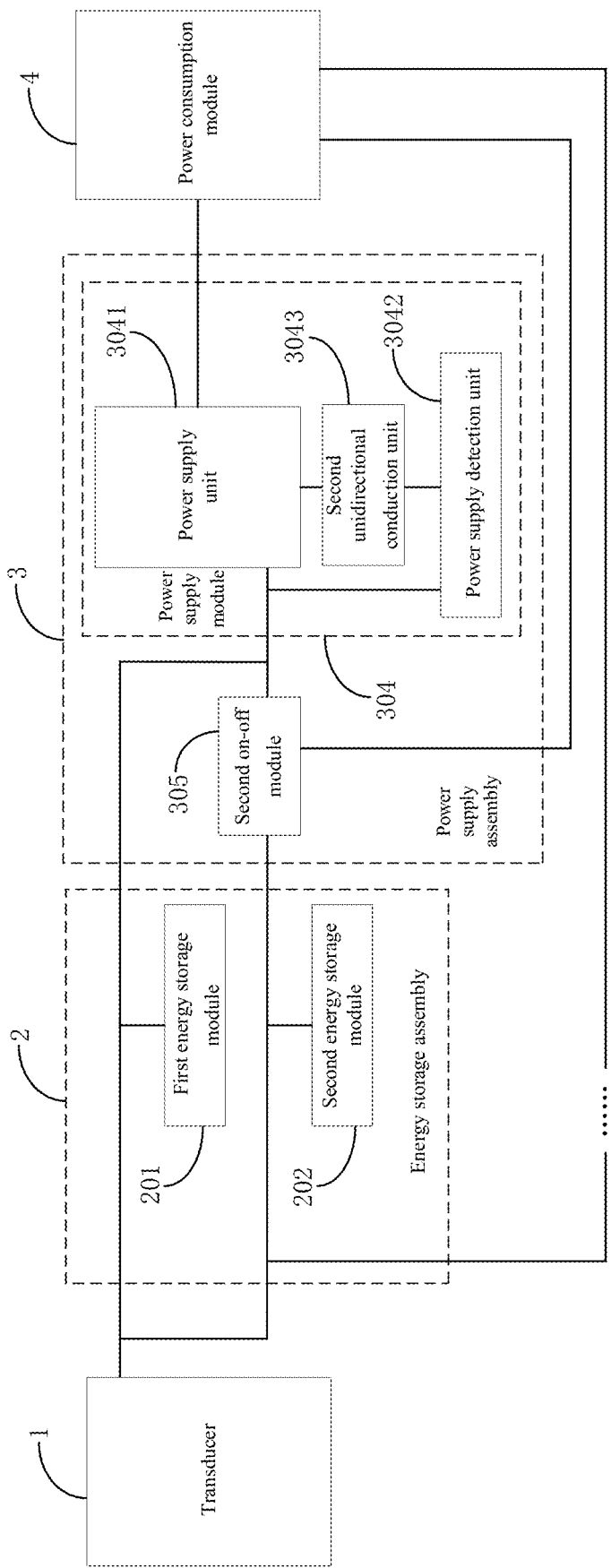
FIG. 3 is a schematic configuration diagram III of a power supply circuit and a power consumption module according to an embodiment of the present disclosure.

In one embodiment, referring to FIGS. 2, 3, and others, the energy storage assembly 2 includes a first energy storage module 201 and a second energy storage module 202. The power supply assembly 3 includes a power supply module 304.

The first energy storage module 201 and the second energy storage module 202 can be any device or combination of devices having energy storage capability. For example, the first energy storage module comprises at least one capacitor (such as the capacitor C6 shown in FIGS. 14 and 7-11, which may be a tantalum capacitor) for rapidly storing electrical energy, and the second energy storage module 202 comprises at least one super capacitor or a rechargeable battery (such as the capacitor C1 shown in FIGS. 14 and 7-11). Furthermore, the capacitance of the second energy storage module needs to be at least larger than that of the first energy storage module.

In a specific example, the first energy storage module 201 has a capacitance value in the range of 470 μF~1000 μF and the second energy storage module 202 has a capacitance value in the range of 0.2 F~0.5 F. Still further, the first energy storage module 201 has a capacitance value set to 470 μF and the second energy storage module 202 has a capacitance value set to 0.25 F.

An input side of the power supply module 304 is respectively directly or indirectly connected to a first end of the first energy storage module 201 and a first end of the second energy storage module 202, and an output side of the power supply module 304 is connected to the power consumption module 4, namely, the power supply module 304 is provided in a power supply path between the energy storage assembly 2 and the power supply module 2.

The power supply assembly 304 is configured for, when the power consumption module 4 is not powered on, if it is detected that the voltage of the first energy storage module 201 is within the specified voltage interval, a power supply path between the energy storage assembly 2 (namely, the first energy storage module 21 and the second energy storage module 22) and the power consumption module 4 is disconnected, thereby forming the pre-power supply phase; and the electrical energy stored by the first energy storage module 21 and/or the second energy storage module 22 is supplied to the power consumption module 4 after the power consumption module 4 is powered up, thereby forming the power supply phase.

Further, referring to FIG. 2, the power module 3 comprises a first on-off module 301.

A first end of the second energy storage module 202 is electrically connected to a first end of the transducer 1 via the first on-off module 301; the first on-off module 301 is configured to remain off during the pre-power supply phase such that the transducer 1 is charging only the first energy storage module 201 during the pre-power supply phase such that the first energy storage module 201 can quickly store electrical energy during the pre-power supply phase.

Rapidly storing electrical energy can be understood such that when a transducer is used to charge an energy storage assembly, the charging speed for charging only the first energy storage module 201 is faster than the charging speed for simultaneously charging the first energy storage module 201 and the second energy storage module 202. In the above-mentioned solution, in the case where two energy storage modules are introduced, through the control of the first on-off module 301, the energy storage assembly in the pre-power supply stage can complete the required charging as soon as possible (for example, charging to a first voltage threshold value so as to enable the output voltage to meet the power-on demand of the power consumption module), and then the power consumption module can be powered on as soon as possible, so as to improve the starting speed of the power consumption module and realize the rapid starting of the power consumption module.

It can be seen that the specific solution of the present disclosure provides two energy storage modules (namely, the first energy storage module 201 and the second energy storage module 202) with different sizes, wherein the first energy storage module 201 is a small-capacitance energy storage module (being able to be quickly filled), and the second energy storage module 202 is a large-capacitance memory (a large-capacitance capacitor, a rechargeable battery, etc.); the minimum capacitance of the first energy storage module 201 can satisfy that the power-on initialization is completed once by the power consumption module.

Further, the first on-off module 301 comprises a first control terminal and a second control terminal, and is configured to be turned on when the first control terminal and the second control terminal are triggered simultaneously; furthermore, when any one of the first control terminal and the second control terminal of the first on-off module 301 is not triggered, the first on-off module 301 is caused to be turned off. The second energy storage module is configured to receive and store electrical energy generated by the transducer when the first on-off module is turned on; and the first control terminal of the first on-off module 301 is configured to be triggered to receive a specified level during the power supply phase.

In one solution, with reference to FIG. 2, a first control terminal of the first on-off module 301 can be triggered to be turned on after the power consumption module is powered on, so as to use the transducer to supply power for the second energy storage module. For example, the first control terminal of the first on-off module 301 is electrically connected to the power consumption module, and is set to receive a specified level (a high level or a low level) during the power supply phase under the control of the power consumption module so as to be triggered.

However, when two energy storage modules, namely, the first energy storage module and the second energy storage module (for example, one large capacity capacitor and one small capacity capacitor) are used, the calculation is started when both of the two capacitors are not charged. It is necessary to charge the first energy storage module (for example, the small capacity capacitor) firstly, after the voltage of the small capacity capacitor is greater than a certain threshold value (a voltage which is greater than the minimum operating voltage, namely, greater than the first voltage threshold value), the power consumption module is powered so as to start up, and a charging loop of the second energy storage module (for example, the large capacity capacitor) is opened to charge the second energy storage module (for example, the large capacity capacitor), which can be achieved by controlling the first on-off module to be turned on.

However, when the second energy storage module has no power at all or has a serious power loss, the power-on action is performed because the load starts to work when the first energy storage module is charged to a threshold value, and then once the charging loop is opened, since the difference between the large capacity capacitor and the small capacity capacitor is relatively large (the voltage of the large capacity capacitor is relatively low), the charging current will be relatively large, but since the current that can be provided by some transducers (for example, solar panels capable of being used in a low-light environment) is small, the generated energy is almost all used for charging the second energy storage module (for example, the large capacity capacitor). Over time the voltage of the first energy storage module (e.g. small capacity capacitor) will gradually decrease until below the operational threshold value and the system will shut down. Therefore, in order to solve this problem, in one embodiment, a set threshold value is introduced, and the first control terminal of the first on-off module is configured for receiving the specified level and being triggered when the voltage of the first energy storage module is above a specified threshold value; and the specified threshold value is matched to a lowest operating voltage.

It can be seen that after the voltage of the first energy storage module (for example, the small capacity capacitor) is greater than the first voltage threshold value, the second energy storage module (for example, the large capacity capacitor) is charged only after the voltage of the power consumption module and the first energy storage module (for example, a small capacity capacitor) is greater than a specified threshold value.

The first control terminal of the first on-off module 301 is configured for receiving the specified level and being triggered when the voltage of the first energy storage module is above a specified threshold value; and the specified threshold value is matched to a lowest operating voltage.

In one example, with reference to FIG. 2, the control based on the specified threshold value can be implemented by means of the power consumption module 4 provided to output the specified level to the first control terminal of the first on-off module to trigger the first control terminal of the first on-off module when the voltage of the first energy storage module is above the specified threshold value during the power supply phase. It can be seen that in the above-mentioned solution, if the on/off change of the first on-off module 301 is realized based on the control of the power consumption module, then it can be ensured that the second energy storage module is triggered to be turned on only after the power consumption module is powered on.

Figure 35:
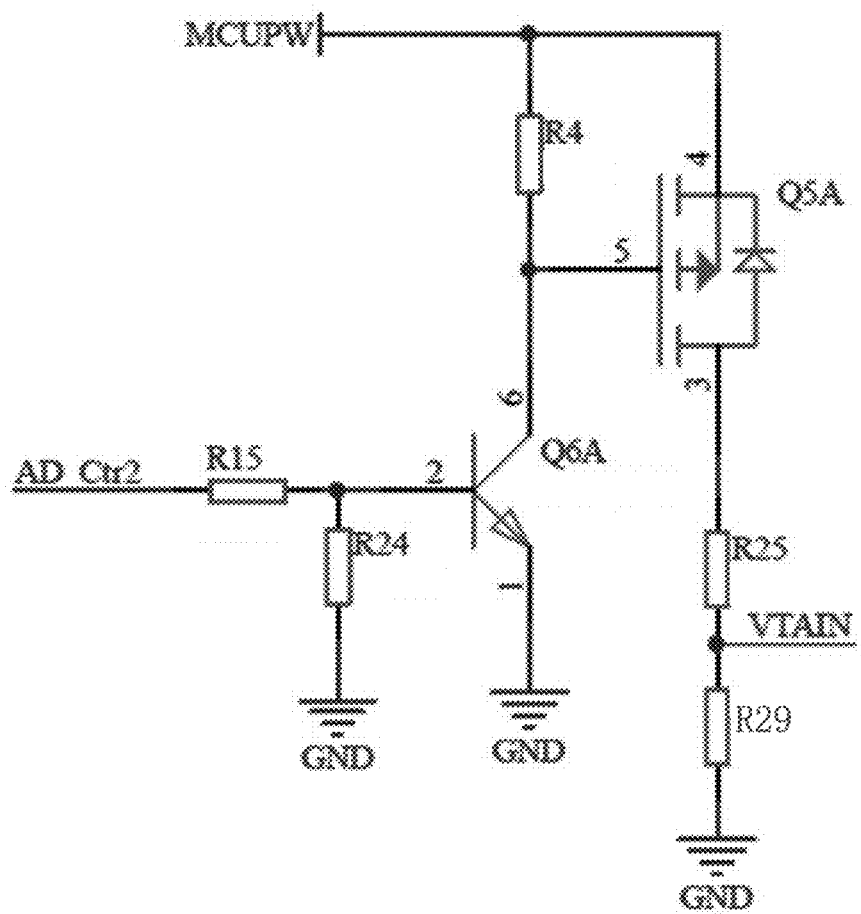
FIG. 35 is a schematic circuit diagram of a sampling module according to an embodiment of the present disclosure.

In order to achieve the detection of the voltage of the first energy storage module by the power consumption module, in a specific example, an acquisition module shown in FIG. 35 may be used, and the acquisition module may include: a transistor Q5A and a driver tube Q6A, wherein a first end of the transistor Q5A is connected to a gate electrode of the transistor Q6A, a resistor R4 is provided between the gate electrodes of the first end of the transistor Q6A, the first end of the transistor Q6A can be connected to the first energy storage module so as to collect the voltage of the first energy storage module, and a second end of the transistor Q6A is grounded via the resistor R25 and the resistor R23, and then the resistor R25 and the resistor R23 can realize voltage division so as to form a voltage VTAIN, which can be input to a control unit and represents the voltage of the first energy storage module. The control unit of the power consumption module is connected between the resistor R25 and the resistor R23. The control terminal of the driver tube Q6A is grounded via the resistor R24, and the control terminal of the driver tube Q6A is also connected to the control unit via the resistor R15 so as to receive a control signal.

By means of the control signal, the driver tube Q6A can be controlled to be turned on when measurement is required, and the control unit measures the voltage of the first energy storage module (for example, the small capacity capacitor) after voltage is divided by the resistor R25 and the resistor R23, so as to obtain the voltage of the small first energy storage module (for example, the small capacity capacitor). Furthermore, the control unit (such as an MCU) can control the charging loop of the second energy storage module (such as the large capacity capacitor) in real time according to the voltage condition of the first energy storage module (such as the small capacity capacitor) so as to ensure that the first energy storage module does not fall below the minimum operating voltage and cause a shutdown problem. The AD_Ctr2 pin in FIG. 35 may be connected to the control unit (e.g. MCU) for controlling the on-off of the driver tube Q5A, and the VTAIN pin may be connected to the control unit (e.g. MCU) for acquiring the voltage MCUPW of the first energy storage module (e.g. the small capacity capacitor).

Figure 34:
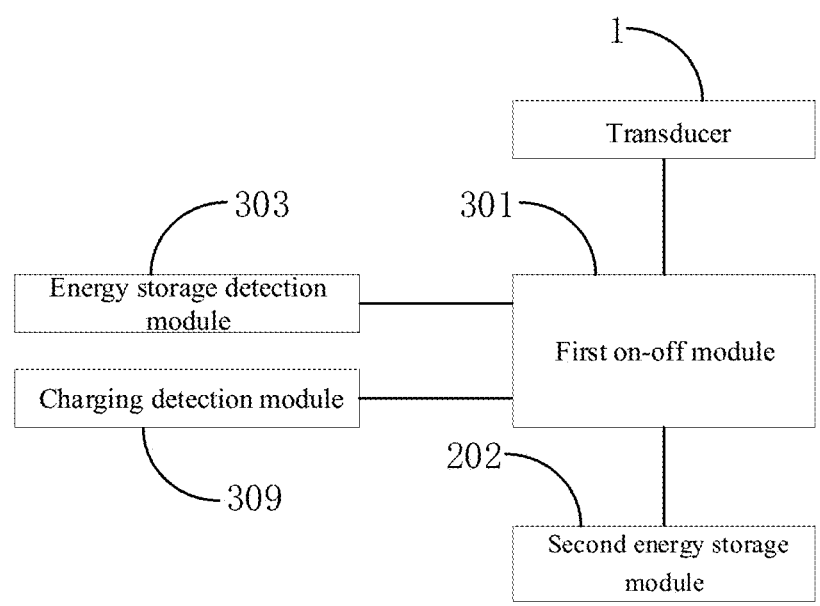
FIG. 34 is a schematic configuration diagram of a part of a power supply circuit according to an embodiment of the present disclosure.

In another example, the control based on the specified threshold value can also be realized by a charging determination and detection module. Taking FIG. 34 as an example, the power supply assembly further includes a charging determination and detection module 309, wherein an input terminal of the charging determination and detection module 309 is electrically connected to the first end of the first energy storage module, and an output terminal is electrically connected to the first control terminal of the first on-off module 301; and The charging determination and detection module 309 is configured to:
output the specified level to the first control terminal of the first on-off module to trigger the first control terminal of the first on-off module when the voltage of the first energy storage module is above the specified threshold value during the power supply phase.

In this solution, the on-off control of the first on-off module can no longer depend on the power consumption module, and the control result can be avoided to be influenced by the operating state of the power consumption module.

In a specific example, the charging determination and detection module 309 can be implemented using a voltage comparator or a voltage detection chip, and the charging loop of the second energy storage module (such as the large capacity capacitor) can be controlled via the voltage comparator or the voltage detection chip, namely, the output of the voltage comparator or voltage detection chip may be used for charging control of the large capacity capacitor.

Figure 36:
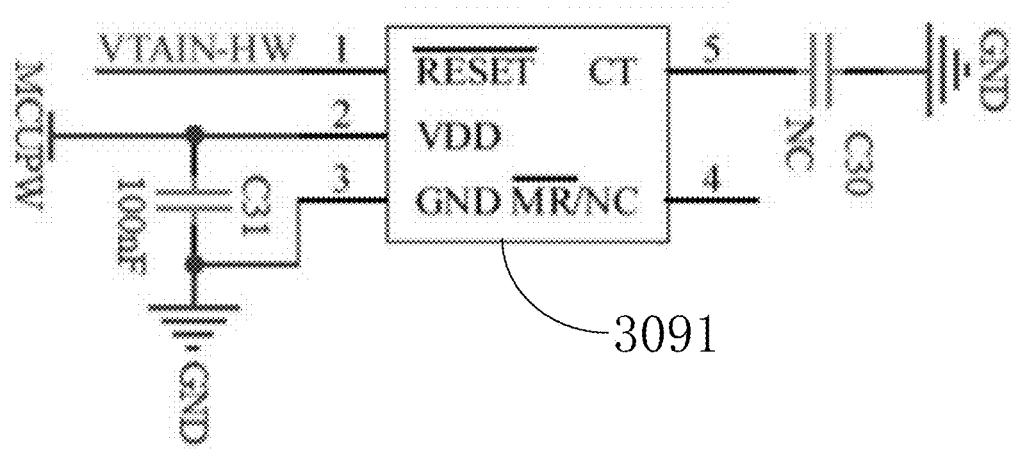
FIG. 36 is a schematic circuit diagram of an power supply determination and detection module according to an embodiment of the present disclosure.

The voltage detection chip can be as shown in FIG. 36, such as the voltage detection chip 3091. The functions of the capacitors C31, C30 to which the voltage detection chip 3091 is connected can be understood with reference to the filter capacitor Cf2 and the capacitor C7 in FIG. 17.

When the control is based on the specified threshold value, there may be no hysteresis effect (at this time, the specified threshold value may be set to 2.4V), and there may also be the hysteresis effect (for example, the hysteresis voltage may be set to 200 mV, namely, forming an upper limit bit of 2.5V and a lower limit of 2.3V). When the voltage detection chip 3091 is used to control the charging loop of the second energy storage module, the hysteresis function of the voltage detection chip 3091 itself can be used to realize the hysteresis effect, and when a control unit (such as a MCU) is used to monitor the voltage of the first energy storage module (such as the small capacity capacitor), the hysteresis effect can be realized by means of software programming.

The signal accessed by the second control terminal of the first on-off module 301 can be associated with the voltage of the second energy storage module, and then the on-off control of the first on-off module 301 can be made to match the actual voltage of the second energy storage module. In a specific solution, the power supply assembly 3 further comprises an energy storage detection module 303.

An input terminal of the energy storage detection module 303 is electrically connected to the first end of the second energy storage module 202 (for example, the capacitor C1), and an output terminal is electrically connected to a second control terminal of the first on-off module 301. The energy storage detection module 303 is configured and adapted to monitor the voltage of the second energy storage module, and output the level for turning off the first on-off module to a second control terminal when the voltage of the second energy storage module 202 reaches a second voltage threshold value. Further, when the voltage of the second energy storage module 202 does not reach the second voltage threshold value, the energy storage detection module 303 is able to trigger the second control terminal of the first switch-on/switch-off module 301, in which case the first switch-on/switch-off module is only possible to be turned on.

It can be seen that:
in the above-mentioned example, the first on-off module 301 is triggered to be turned on only when the following two conditions are simultaneously met: condition 1: the power consumption module 4 outputs a specified level to the first control terminal of the first on-off module so as to trigger the first control terminal; condition 2: since the voltage of the second energy storage module 202 does not reach the second voltage threshold value, the energy storage detection module 303 triggers the second control terminal of the first on-off module. Failure to meet either of these two conditions results in the first on-off module 301 being turned off so that the second energy storage module is no longer charged. The second voltage threshold value is matched to the voltage at which the second energy storage module is fully charged, for example may be the voltage itself, or a voltage value slightly below (or above) the voltage.

Furthermore, the second energy storage module 202 may stop being charged after being fully charged, effectively avoiding the occurrence of an overcharge, thereby protecting the second energy storage module 202.

In some examples, the first on-off module 301 may also be controlled only by the power consumption module 4 (e.g. its control unit). For example, the power module is connected to the energy storage detection module 303, and further, the first on-off module 301 can be controlled based on the detection result, and the control logic of the first on-off module 301 can be understood with reference to the above-mentioned description.

Figure 17:
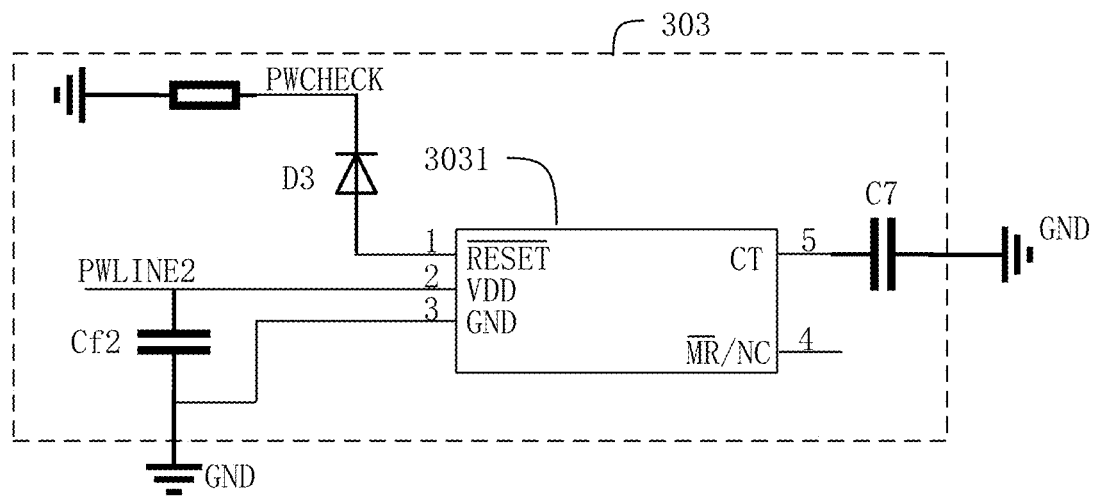
FIG. 17 is a schematic circuit diagram I of an energy storage detection module according to an embodiment of the present disclosure.
Figure 18:
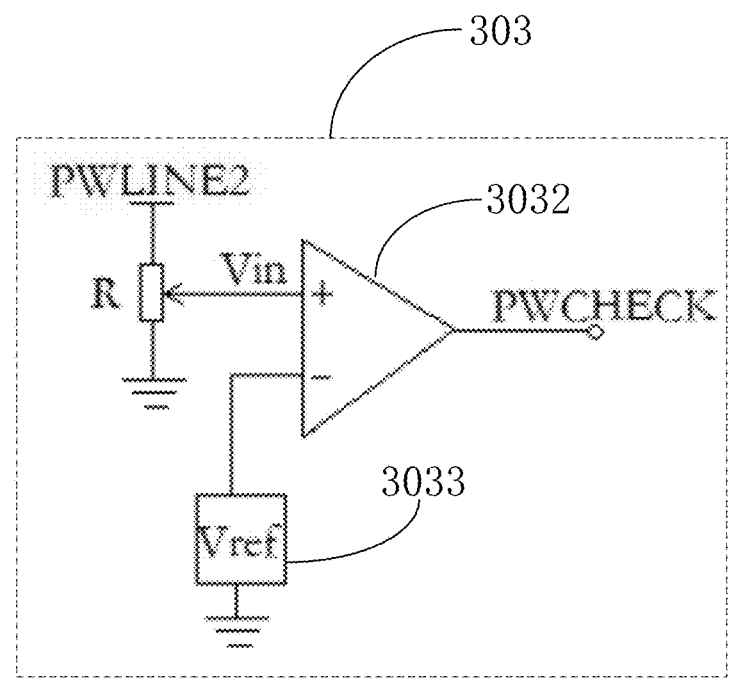
FIG. 18 is a schematic circuit diagram II of an energy storage detection module according to an embodiment of the present disclosure.

In one example, with reference to FIG. 17, the energy storage detection module 303 includes an energy storage voltage detection chip 3031, and the function implemented thereby can be understood to include the function of the energy storage detection comparator 3032 shown in FIG. 18. In some embodiments, some or all of the functions of an energy storage detection slide rheostat R and a reference voltage unit 3033 in FIG. 18 can also be implemented.

Figure 16:
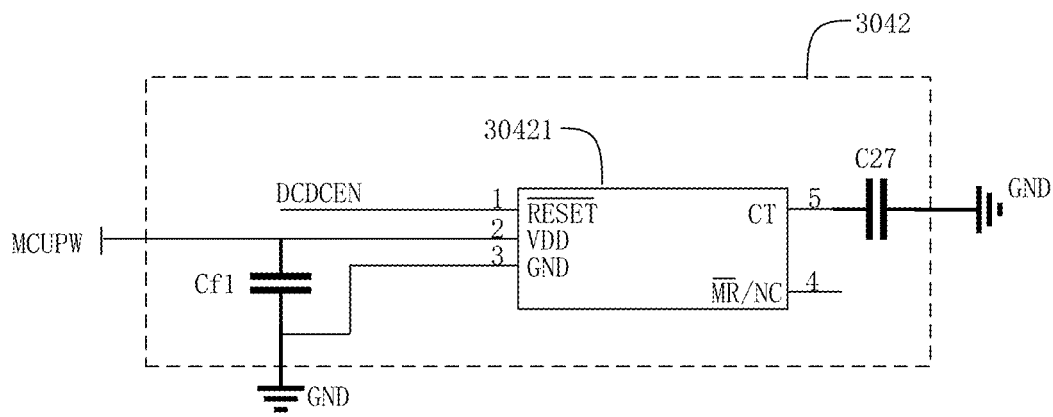
FIG. 16 is a schematic circuit diagram of a power supply detection unit according to an embodiment of the present disclosure.

In one embodiment, referring to FIG. 16, an input terminal of the energy storage voltage detection chip 3011 (which may be a first input terminal of an energy storage detection comparator 3032 or connected to the first input terminal) is directly or indirectly connected to the first end of the second energy storage module 202, and an output terminal is directly or indirectly connected to the second control terminal of the first on-off module 301, so as to output a level for turning off the first on-off module 301 to the second control terminal of the first on-off module via the output terminal of the energy storage voltage detection chip 3011 when the voltage of the second energy storage module reaches the second voltage threshold value.

A first filter element (for example, a filter capacitor Cf2) is further connected between a ground pin of the energy storage voltage detection chip 3011 and an input terminal (namely, one end connected to the second energy storage module), and the first filter element is used for filtering out an input voltage signal of the input terminal of the energy storage voltage detection chip for filtering.

In the solution shown in FIG. 17, a first unidirectional conduction unit (for example, comprising a diode D3) is further connected between the output terminal of the energy storage voltage detection chip 3031 and the second control terminal of the first on-off module 301, an input terminal of the first unidirectional conduction unit is connected to the output terminal of the energy storage voltage detection chip 3031, and an output terminal of the first unidirectional conduction unit (for example, comprising a diode D3) is connected to the second control terminal of the first on-off module 301, and passes through the first unidirectional conduction unit. The output terminal of the energy storage voltage detection chip can be prevented from inputting a reverse voltage to damage the tank voltage detection chip.

The first unidirectional conduction unit may include a diode D3; an anode of the diode D3 is electrically connected to the input terminal of the energy storage voltage detection chip 3031, and the cathode is electrically connected to the second control terminal of the first on-off module 301. In a solution not shown, the first unidirectional conduction unit may include a triode and a first pull-up resistor and a first pull-down resistor matched with the triode; the first pull-up resistor is connected between a base and a collector of the triode, and the base of the triode is grounded via the first pull-down resistor; and the collector of the triode is also electrically connected to the output terminal of the energy storage voltage detection chip, and an emitter of the triode is electrically connected to the second control terminal of the first on-off module. Other transistors may alternatively be used as the triode.

In one embodiment, referring to FIG. 18, the energy storage detection module 303 includes an energy storage detection comparator 3032, a first input terminal of the energy storage detection comparator 3032 is directly or indirectly connected to a first end of the second energy storage module 202, and a second input terminal of the energy storage detection comparator 3032 is connected to a reference voltage corresponding to the second voltage threshold value; an output terminal of the energy storage detection comparator 3032 is connected to the second control terminal of the first on-off module 301 so as to output a level for turning off the first on-off module to the second control terminal of the first on-off module 301 via the output terminal of the energy storage detection comparator 3032 when the voltage of the second energy storage module reaches the second voltage threshold value.

The reference voltage therein can be provided by a reference voltage unit 3033, and the reference voltage unit 3033 can be any circuit capable of providing a reference voltage, for example, the reference voltage can be formed by using a current source and a resistor connected in series, and the reference voltage can also be formed by using a voltage regulator, a transformer, etc.

In a further example, the energy storage detection module 303 also includes an energy storage detection slide rheostat R.

An active end of the energy storage detection slide rheostat R is connected to a first input terminal of the energy storage detection comparator, a first end of the energy storage detection slide rheostat R is directly or indirectly connected to the second energy storage module 202, and a second end of the energy storage detection slide rheostat R is grounded.

In the circuit, Vref is a given reference voltage, PWLINE2 is a sampling voltage of the second energy storage module, representing the voltage of the second energy storage module, Vin is an input voltage of the comparator, and PWCHECK is an output to the second control terminal of the first on-off module; and when Vin>Vref, it indicates that the voltage of the second energy storage module is greater than the second voltage threshold value, and at this moment, the PWCHECK outputs a high level and can control the first on-off module to be turned off whereas outputting a low level, and can control the first on-off module to be turned on. The sliding rheostat R can be used to adjust the voltage relationship between Vin and PWLINE2. In addition, the energy storage voltage detection chip 3031 can be connected to the second control terminal of the first on-off module 301 via a diode D3, and the anode of the diode D3 is connected to the energy storage voltage detection chip 3031.

In other examples, the storage voltage detection chip 3031 may also be a chip capable of detecting the voltage value of the second storage module, such as an analog-to-digital conversion chip, and is not limited to a storage voltage detection chip implementing a comparator function.

In one embodiment, the power supply module is specifically configured for, if it is detected that the voltage of the first energy storage module does not reach the specified first voltage threshold value when the power consumption module is not powered on, keeping the power supply circuit between the first energy storage module and the second energy storage module with the power consumption module disconnected so as to form the specified voltage interval with the first voltage threshold value as an end point; and if it is detected that the voltage of the first energy storage module reaches the specified first voltage threshold value, starting to supply the electrical energy stored by the first energy storage module to the power consumption module so as to power up the power consumption module.

In one embodiment, referring to FIG. 3 in combination with other figures, the power supply assembly 3 further includes:

a second on-off module 305 connected between the first end of the second energy storage module 202 and the input side of the power supply module 304; and the power consumption module 4 is further configured to control the second on-off module 302 to be turned on during the power supply phase (for example, during all or part of the power supply phase), wherein when the second on-off module 305 is turned on, the electrical energy stored by the second energy storage module 202 is able to be supplied to the power consumption module 304 by the power supply module 4.

Furthermore, referring to FIG. 3, the power consumption module 4 (for example, the control unit 401 thereof) is also electrically connected to the first end of the second energy storage module 202, so as to monitor the voltage of the second energy storage module 202 (which can represent the electric quantity of the second energy storage module), so as to control the second on-off module to be turned on when the voltage of the second energy storage module reaches a preset third voltage threshold value, such that the electrical energy of the second energy storage module 202 can be supplied by the power supply module to the power consumption module.

In some solutions, the power consumption module 4 can directly sample from the second energy storage module 202 to detect the voltage thereof, and it does not exclude that the voltage of the second energy storage module 202 is detected in combination with other circuits. For example, an analogue-to-digital conversion module can also be provided between the power consumption module 4 and the second energy storage module 202.

In the solution of using a first on-off module and a second on-off module, in the specific solution, when starting to work, there is no electric quantity in both the first energy storage module 201 and the second energy storage module 202 (or there is a small amount of electric quantity, but not enough to supply power to a load), and charging needs to be performed via a solar panel. At this moment, the power supply module cuts off a path for the first energy storage module to supply power to the power supply module, and simultaneously, the first on-off module 301 is also cut off, so that a charging path from the solar panel to the second energy storage module 202 is also cut off, so that the electric quantity of the solar panel can be concentrated to charge the first energy storage module 201. Since the first energy storage module 201 has a small capacitance, it can be quickly charged to a voltage satisfying the start-up of a load (i.e. a power consumption module) (it can quickly store energy even in a low-light environment).

When it is detected that the voltage of the first energy storage module is greater than the first voltage threshold value (greater than the minimum operating voltage of the power consumption module), the power supply module is switched on, the first energy storage module 201 can supply power for the power consumption module, the power consumption module starts to operate, and in the case where the power consumption module is configured with a sensor, the state of the sensor can be detected, and then a signal is sent via the wireless module.

After the power-on of the power consumption module, the control unit in the power consumption module controls the first on-off module 301 to be switched on so as to enable the second energy storage module 202 to start energy storage, monitors the voltage of the second energy storage module 202 in real time so as to prevent the second energy storage module 202 from being overcharged, and controls the first on-off module 301 to be switched off when it is detected that the second energy storage module 202 is full.

When the output energy of the solar panel decreases (such as no light after darkness), because the second on-off module 305 is turned on, the energy of the second energy storage module 202 can be automatically replenished to the first energy storage module 201 via a corresponding path for use by a load, so that the load can continue to operate in a non-light environment.

In one embodiment, in order to realize the control based on the first voltage threshold value, a circuit unit (such as a power supply detection unit) having a detection function can be configured in a power supply module; specifically, referring to FIG. 3, the power supply module 304 comprises a power supply unit 3041 and a power supply detection unit 3042;

the input side of the power supply unit 3041 is directly or indirectly connected to the first end of the first energy storage module 201 and the first end of the second energy storage module 202, and the output side of a power supply unit 3041 is connected to the power supply terminal of the power consumption module 4 (for example, being directly or indirectly connected to a power supply terminal of a control unit 401 and a wireless unit 404); the power supply detection unit 3042 is connected to the input side of the power supply unit 3041, and the power supply detection unit 3042 is further connected to a trigger terminal of the power supply unit 3041;

the power supply detection unit 3042 is configured to monitor a voltage at the input side of the power supply unit during the pre-power supply phase as the voltage of the first energy storage module 201;

when it is monitored that the voltage of the first energy storage module 201 does not reach a specified first voltage threshold value (namely, lower than the first voltage threshold value), the power supply unit is not triggered, such that the power supply unit maintains an off state in the specified voltage interval (namely, the power supply path from the energy storage assembly to the power consumption module is disconnected); and when it is monitored that the voltage of the first energy storage module 201 reaches a specified first voltage threshold value, then a specified level is output to trigger the power supply unit to start operation, such that initialization of power-on of the power consumption module is completed.

A second on-off module 305 is connected between the first end of the second energy storage module 202 and the input terminal of the power supply unit 3041; and the power supply unit 3041 supplies the electrical energy stored by the first energy storage module 201 to the power consumption module 4 when the second on-off module 202 is turned off; and the power supply unit 3041 supplies the electrical energy stored by the first energy storage module 201 and the second energy storage module 202 to the power consumption module when the second on-off module 202 is turned on.

In the example shown in FIG. 16, the power supply detection unit 3042 includes a power supply voltage detection chip 30421; the functions realized thereby can be understood to comprise the functions of the following power supply detection comparator, and in some solutions, some or all of the functions of the following power supply detection slide rheostat and a corresponding reference voltage unit can also be realized.

The power supply detection unit comprises a power supply voltage detection chip 30421; the input terminal of the power supply voltage detection chip is directly or indirectly connected to the first end of the first energy storage module 201 (for example, the capacitor C6), and the output terminal is directly or indirectly connected to the trigger terminal of the power supply unit 3041, such that when the voltage of the first energy storage module 201 reaches the first voltage threshold value, the power supply unit is triggered to start operation by outputting a specified level via the output terminal of the power supply voltage detection chip 30421 (namely, a DCDCEN signal of the specified level).

In addition, the specified level output by the power supply voltage detection chip 30421 and the storage voltage detection chip 3031 may be the same level or different levels.

In the example shown in FIG. 16, a second filter element (such as a filtering capacitor Cf1) is further connected between the input terminal and the ground pin of the power supply voltage detection chip 30421, and the second filter element filters an input voltage signal of the input terminal of the power supply voltage detection chip for wave filtering.

In addition, the CT end of the power supply voltage detection chip 30421 is grounded via a capacitor C27, so as to realize the time delay of the power supply voltage detection chip 30421. The CT end of the energy storage voltage detection chip 3031 is grounded via a capacitor C7, so as to realize the time delay of the energy storage voltage detection chip 3031.

In a non-illustrated example, with reference to the energy storage voltage detection chip 3031, a second unidirectional conduction unit is further connected between the output terminal of the power supply voltage detection chip 30421 and the trigger terminal of the power supply unit 3041, wherein the input terminal of the second unidirectional conduction unit is connected to the output terminal of the power supply voltage detection chip, and the output terminal of the second unidirectional conduction unit is connected to the trigger terminal of the power supply unit, so as to prevent the output terminal of the power supply voltage detection chip from inputting a reverse voltage and damaging the power supply voltage detection chip.

In a further example, the second unidirectional conduction unit comprises a diode; an anode of the diode is electrically connected to the input terminal of the power supply voltage detection chip, and the cathode is electrically connected to the trigger terminal of the power supply unit. In still another example, the second unidirectional conduction unit comprises a triode and a second pull-up resistor and a second pull-down resistor matched with the triode; the second pull-up resistor is connected between the base and the collector of the triode, and the base of the triode is grounded via the second pull-down resistor; and the collector of the triode is also electrically connected to the output terminal of the power supply voltage detection chip, and the emitter of the triode is electrically connected to the trigger terminal of the power supply unit.

Referring to the stored energy detection comparator shown in FIG. 18, the power supply detection unit may include a power supply detection comparator; the first input terminal of the power supply detection comparator is directly or indirectly connected to the first end of the first energy storage module, and the second input terminal of the power supply detection comparator is connected to a reference voltage corresponding to the first voltage threshold value; and an output terminal of the power supply detection comparator is connected to the trigger terminal of the power supply unit. Further, the power supply detection unit further comprises a power supply detection slide rheostat; and the active end of the power supply detection slide rheostat is connected to the first input terminal of the power supply detection comparator, the first end of the power supply detection slide rheostat is directly or indirectly connected to the input side of the power supply unit, and the second end of the power supply detection slide rheostat is grounded.

In one embodiment, the power supply unit, when supplying the electrical energy stored by the first energy storage module and/or the second energy storage module to the power consumption module, is specifically configure for:

performing voltage conversion on the voltage at the input side of the power supply unit to obtain a converted voltage, and outputting electrical energy of the converted voltage to the power consumption module so as to output electrical energy having a voltage suitable for the operation of the power consumption module upon being powered. Furthermore, the output voltage can meet the requirements of the power consumption module.

Figure 4:
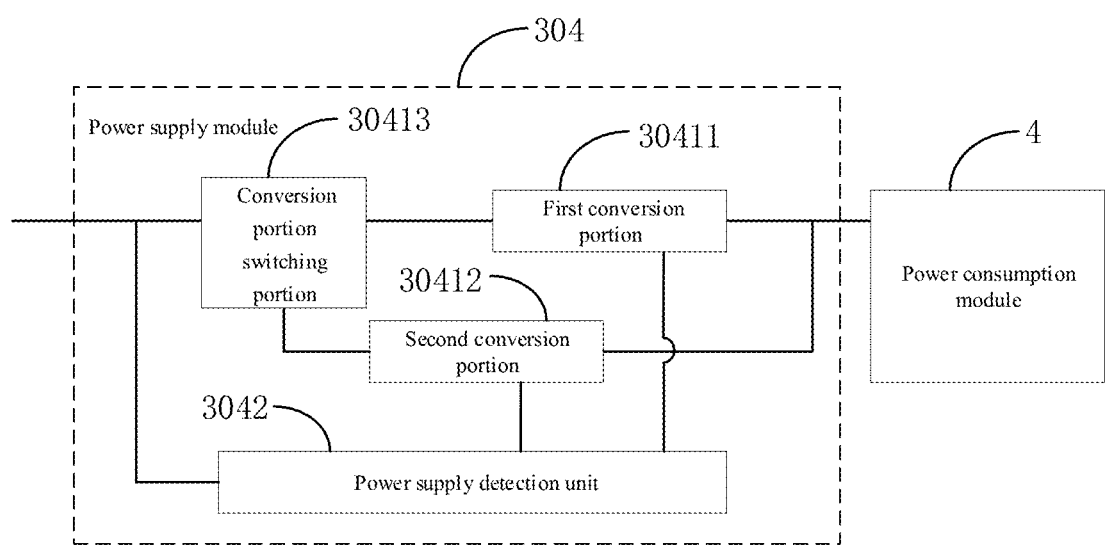
FIG. 4 is a schematic configuration diagram of a power supply circuit and a power consumption module according to an embodiment of the present disclosure.
Figure 8:
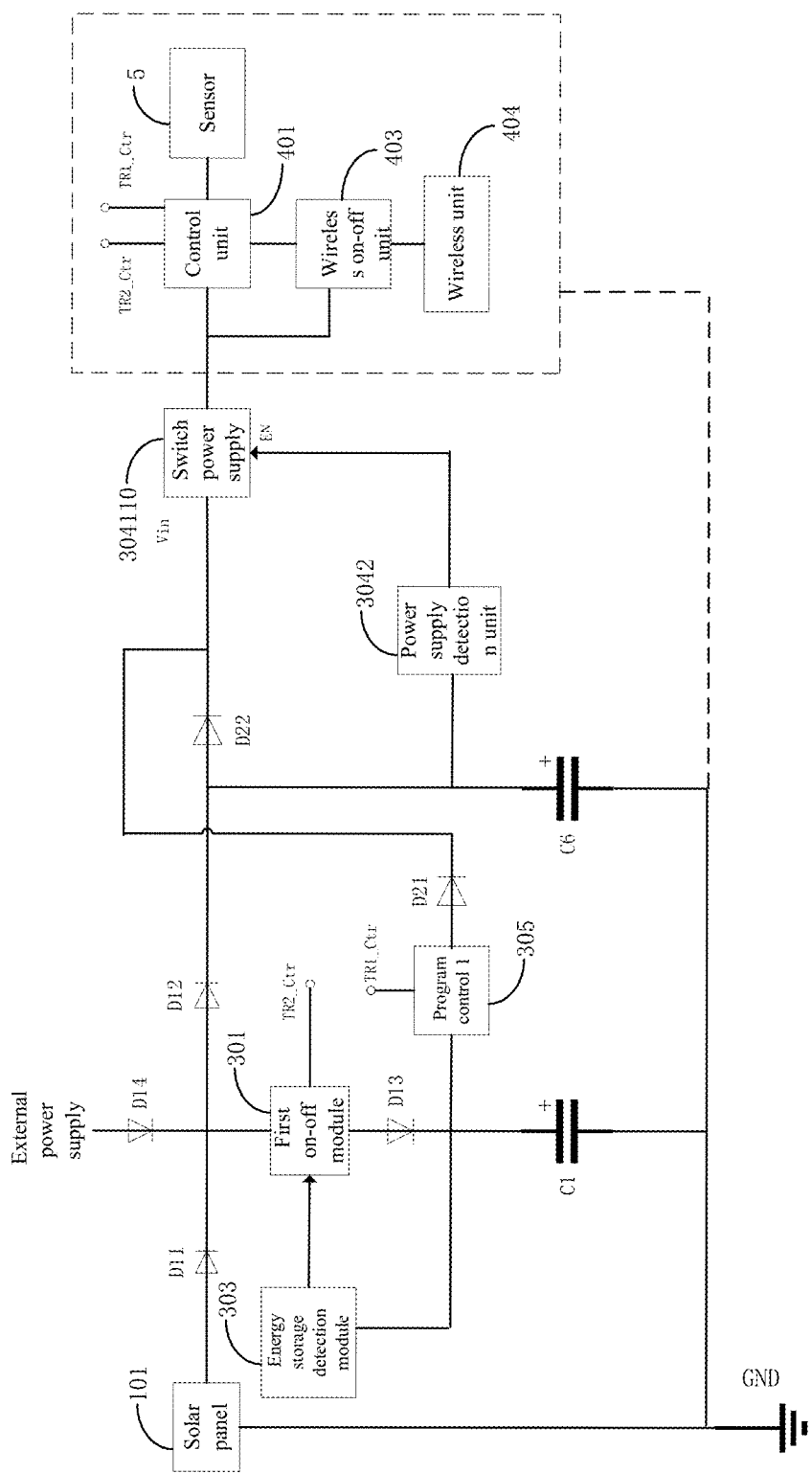
FIG. 8 is a schematic configuration diagram II of a power supply circuit, a power consumption module, and a sensor according to an embodiment of the present disclosure.
Figure 9:
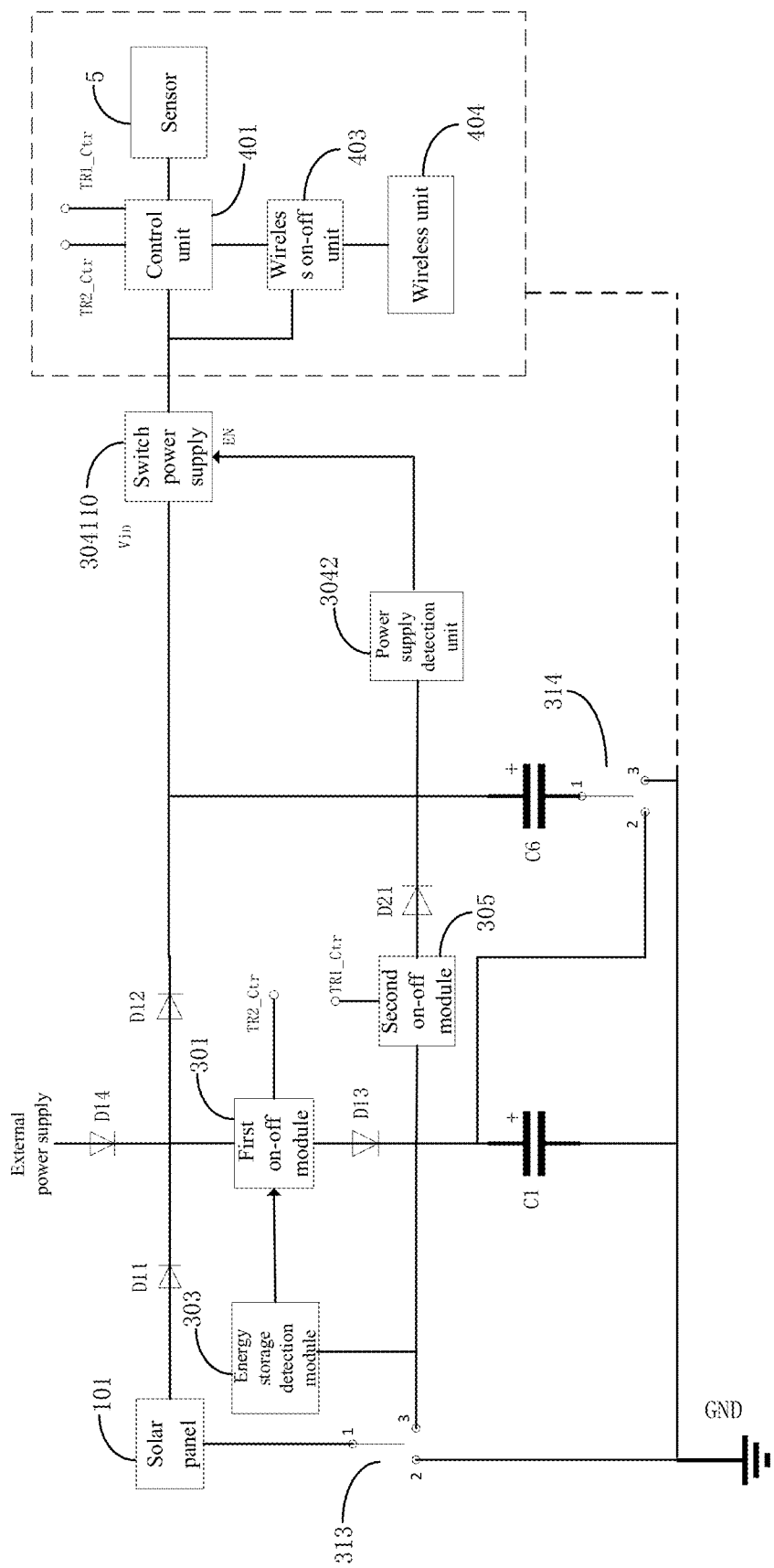
FIG. 9 is a schematic configuration diagram III of a power supply circuit, a power consumption module, and a sensor according to an embodiment of the present disclosure.
Figure 10:
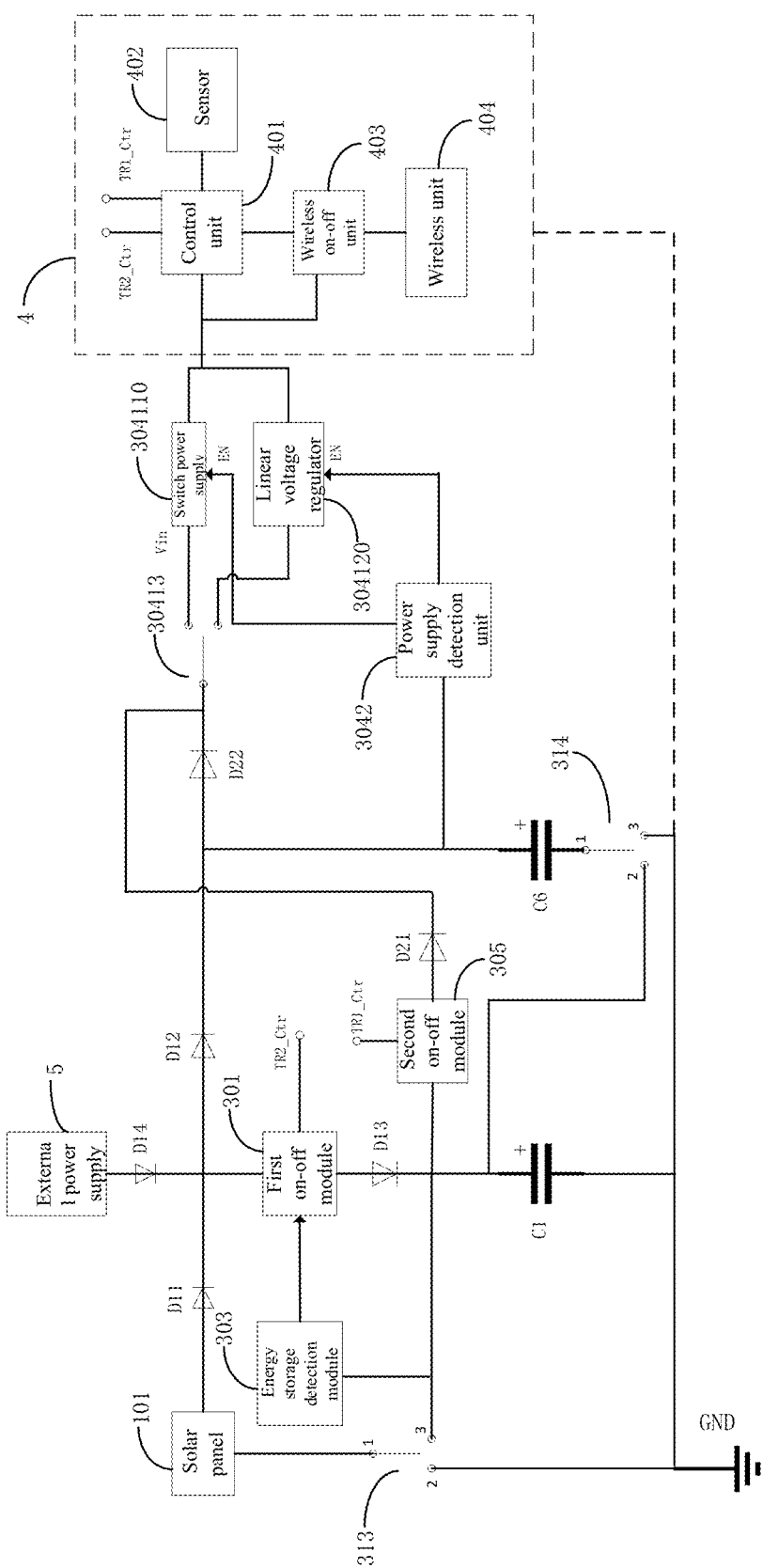
FIG. 10 is a schematic configuration diagram IV of a power supply circuit, a power consumption module, and a sensor according to an embodiment of the present disclosure.
Figure 11:
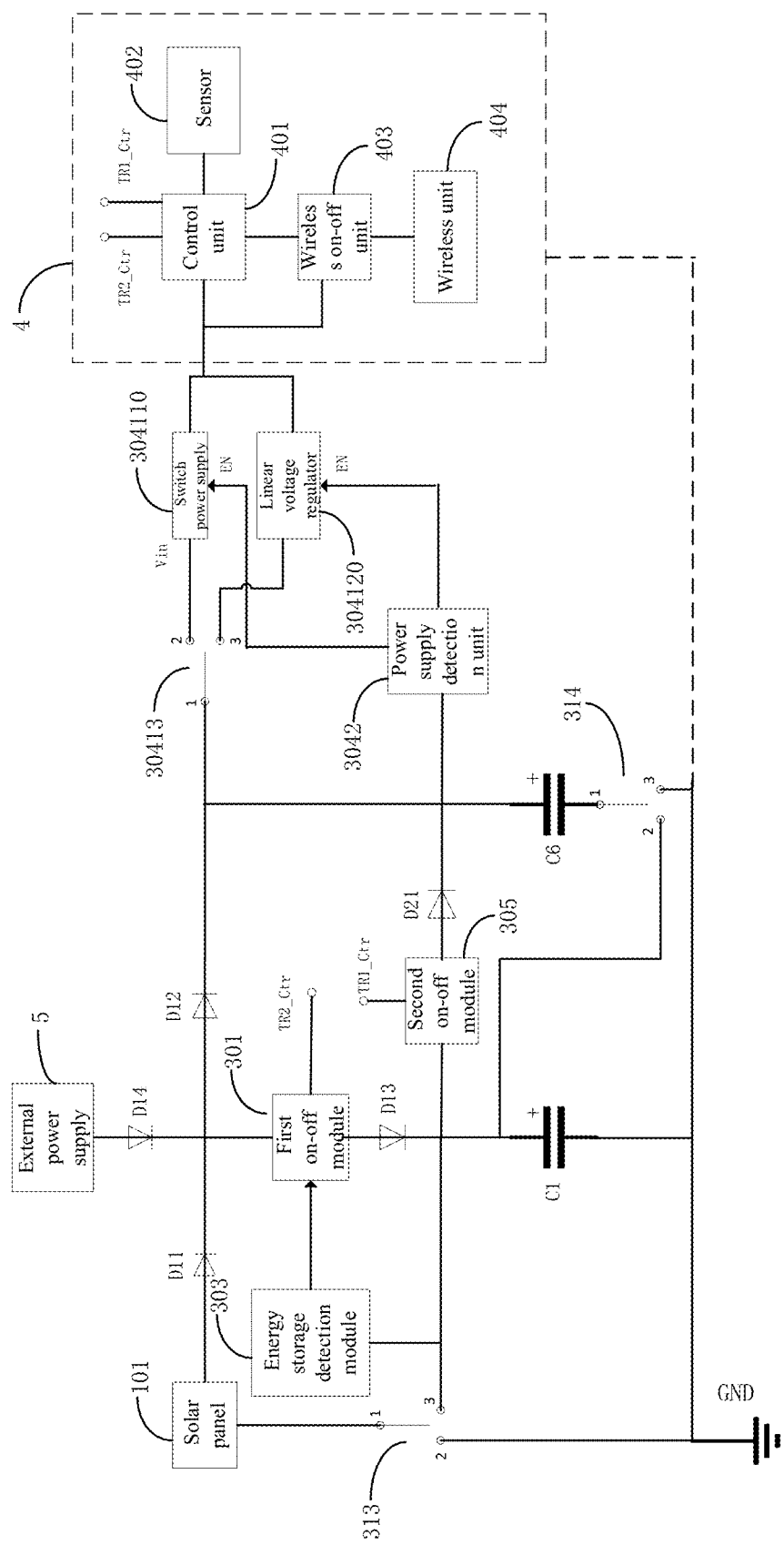
FIG. 11 is a schematic configuration diagram V of a power supply circuit, a power consumption module, and a sensor according to an embodiment of the present disclosure.

In one embodiment, the power supply unit comprises at least one conversion portion, the quantity of conversion portions being two conversion portions as shown in FIGS. 4, 10 and 11 (for example, a first conversion portion 30411 using a switch power supply 304110 and a second conversion portion 30412 using a linear voltage regulator 304120), and one conversion portion as shown in FIGS. 8 and 9 (for example, a conversion portion using a switch power supply 304110); an input side of the conversion portion is directly or indirectly connected to a first end of the first energy storage module 201 and the first end of the second energy storage module 202, and an output side of the conversion portion is connected to the power supply terminal of the power consumption module 4; and the conversion portion is configured to perform the voltage conversion when activated, for example, by the power supply detection unit 3042.

In a further aspect, taking FIGS. 4, 10 and 11 as examples, the at least one conversion portion comprises a plurality of different conversion portions;

the power supply detection unit is further configured for:
detecting a voltage at the input side of the power supply unit after the power consumption module is powered on, and alternatively triggering the conversion portion to operate according to the voltage at the input side of the power supply unit.

Furthermore, since the conversion capability of different conversion portions or the voltage suitable for conversion is different, the conversion process can be effectively ensured by the alternative triggering, and the conversion result can accurately match the actual power supply demand.

The plurality of conversion portions includes a first conversion portion 30411; the first conversion portion 30411 is configured as a switch power supply 304110; and an enabling end of the switch power supply 304110 is one trigger terminal of the power supply unit 3041;

the power supply detection unit 3042, during alternatively triggering the conversion portion to operate according to the voltage at the input side of the power supply unit, is specifically configured for:
triggering the first conversion portion to operate when the voltage at the input side of the power supply unit 3041 is lower than a preset conversion portion switching threshold value.

The switch power supply can be a buck-type DC-DC switch power supply to output electrical energy having a regulated voltage to the power consumption module upon being powered.

In a further solution, the plurality of conversion portions further comprise a second conversion portion 30412; the second conversion portion 30412 is configured as a linear voltage regulator 304120; an enabling end of the linear voltage regulator 304120 is the trigger terminal of the power supply unit; and in general, the suitable voltage difference between the input and output of the DC-DC switch power supply is usually greater than the suitable voltage difference between the input and output of the linear voltage regulator LDO; furthermore, under the condition that the voltage output to the power consumption module is fixed, whether the DC-DC switch power supply or the linear voltage regulator can be adaptively selected according to the magnitude of the input voltage. On this basis, the power consumption of the power supply unit can be effectively reduced. The power supply detection unit, during alternatively triggering the conversion portion to operate according to the voltage at the input side of the power supply unit, is specifically further configured for:
triggering the second exchange portion to operate when the voltage at the input side of the power supply unit is greater than the conversion portion switching threshold value.

In addition to the alternative selection of the conversion portion, a conversion portion switching portion can also be introduced into the line, so as to avoid the problem of simultaneous power supply caused by the conversion portion not completing triggering and stopping triggering in time, and guarantee safety. Furthermore, the power supply unit 3041 further includes a conversion portion switching portion 30413, and a first node of the conversion portion switching portion 30413 is directly or indirectly connected to the first end of the first energy storage module 201 (for example, the capacitor C6) and the first end of the second energy storage module 202 (for example, the capacitor C1). A second node of the conversion portion switching portion 30413 is connected to an input side of the first conversion portion 30411 (for example, the switch power supply 304110), and a third node of the conversion portion switching portion 30413 is connected to an input side of the second conversion portion 30412 (for example, the linear voltage regulator 304120). The power supply detection unit 3042 and a control terminal of the conversion portion switching portion are also connected to the power consumption module; and the quantity of nodes of the conversion portion switching portion 30413 may be three or not limited to the above three, and may be four or more, for example.

The conversion portion switching portion 30413 is configured for:
turning on the first node and the second node under control of the power consumption module when the voltage at the input side of the power supply unit is greater than the conversion portion switching threshold value; and
turning on the first node and the third node under the control of the power consumption module when the voltage on the input side of the power supply unit is less than or equal to the conversion portion switching threshold value, so as to reduce the power consumption of the power supply unit.

Figure 12:
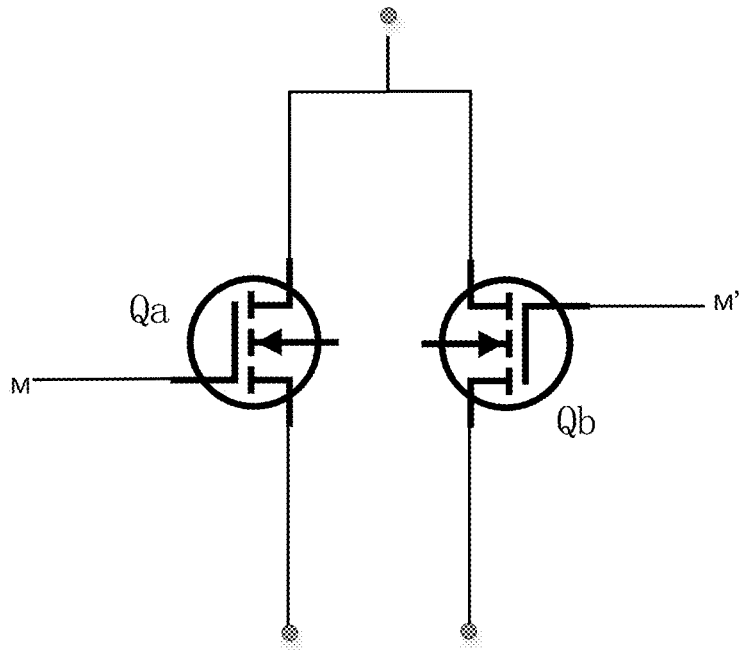
FIG. 12 is a schematic circuit diagram of a switching portion according to an embodiment of the present disclosure.

The conversion portion switching portion may include a first transistor and a second transistor; the first transistor and the second transistor can be understood with reference to the transistor Qa and the transistor Qb shown in FIG. 12.

the first transistor is connected to a first end of the second transistor to form the first node of the conversion portion switching portion (for example, a node at an upper end shown in FIG. 12), a second end of the first transistor forms the second node of the conversion portion switching portion (for example, a node at a lower end of the transistor Qa shown in FIG. 12), and a second end of the second transistor forms the third node of the conversion portion switching portion (for example, a node at a lower end of the transistor Qb shown in FIG. 12); and a control terminal (e.g. an M end) of the first transistor is connected to the power consumption module, and a control terminal of the second transistor is connected to the power consumption module via an inverter; or a control terminal of the second transistor is connected to the power consumption module, and a control terminal (e.g. an M' end) of the first transistor is connected to the power consumption module via an inverter.

Further, when the first transistor is turned on, the second transistor is turned off and the corresponding two nodes are turned on, and when the second transistor is turned on, the first transistor is turned off and the corresponding two nodes are turned on.

In the above-mentioned solution, the switching of the power supply path may be controlled by enabling or disabling the conversion portion in the power supply unit, and in another aspect, the switching of the power supply path may be controlled by switching the conversion portion and the switch in series.

In one embodiment, the trigger terminal of the power supply unit can also directly access the output voltage of the energy storage assembly, and then is directly controlled by the output voltage of the energy storage assembly without being controlled based on (or not merely based on) the detection result of the power supply detection unit. For example, the output voltage of the energy storage assembly can be connected to an enabling end (namely, an enable pin) of a DC-DC switch power supply (and/or a linear voltage regulator LDO). When the output voltage is lower than an enable threshold value of the enabling end, the DC-DC switch power supply (and/or the linear voltage regulator LDO) has no output, and a back-end circuit (for example, the power consumption module) does not operate. When the output voltage is greater than the enable threshold value of the enabling end, the DC-DC switch power supply (and/or the linear voltage regulator LDO) has an output, and the back-end circuit (e.g. the power consumption module) operates, and the enable threshold value can also be understood as the first voltage threshold value.

In some solutions, the power supply voltage detection chip of the power supply detection unit can directly output a signal to a trigger terminal of the power supply unit (for example, an enabling end of a DC-DC switch power supply and/or a linear voltage regulator LDO), and if the power supply unit does not have a trigger terminal, the power supply voltage detection chip can also output a signal to a transistor (for example, a MOS tube), and then control whether the power supply unit supplies power through on-off control of the transistor (for example, a MOS tube).

Furthermore, the power supply unit, power supply detection unit (e.g. the function of a DC-DC switch power supply) may be integrated with the control unit in the power consumption module, i.e, the power supply unit, the power supply detection unit and the control unit in the power consumption module may form an integrated circuit, which may also be regarded as a control unit. As long as the implemented functions are the same as or similar to the embodiments of the present disclosure, whether the circuits are discrete, integrated, or otherwise formed, they do not depart from the scope of the embodiments of the present disclosure.

Figure 5:
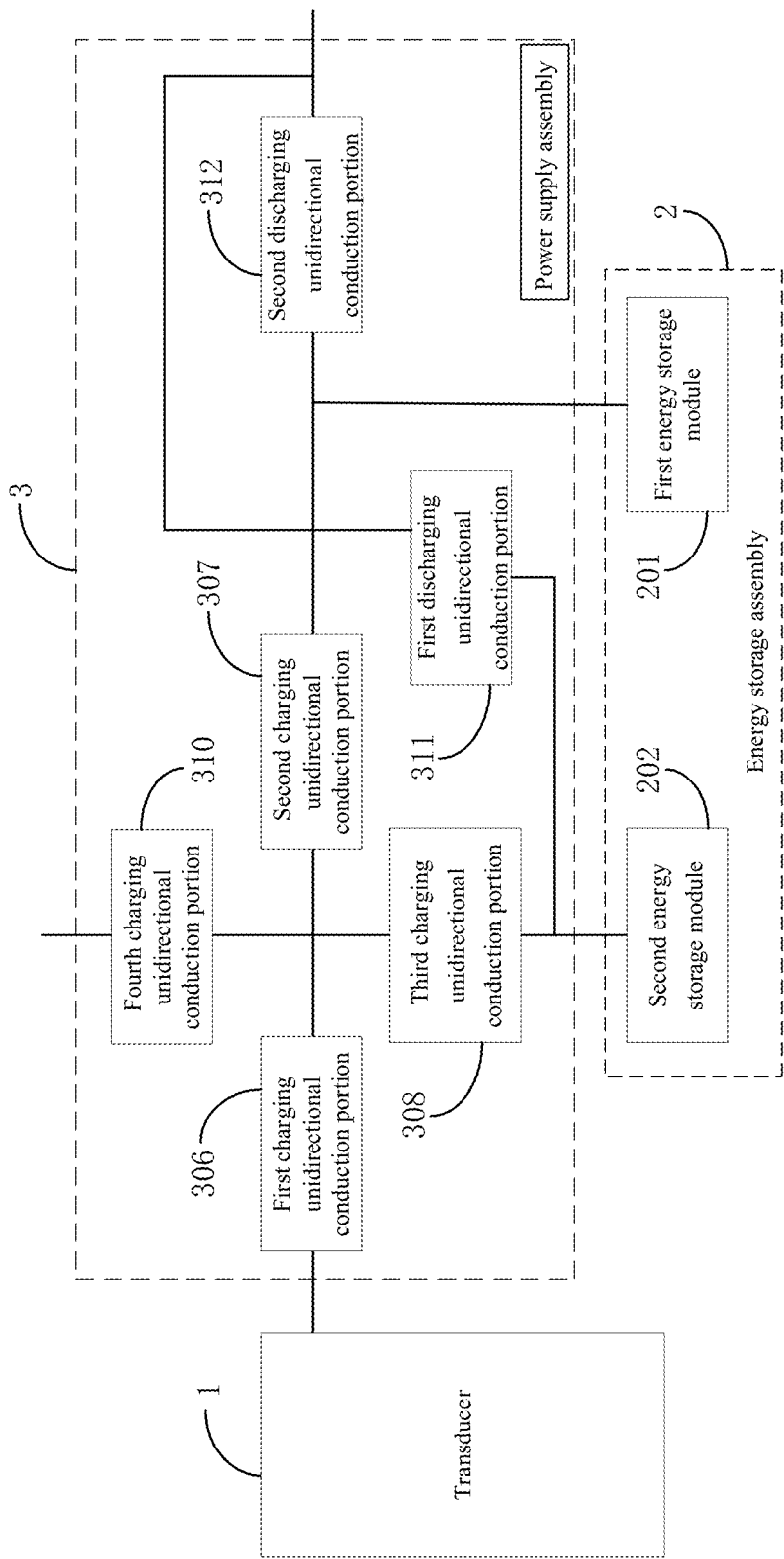
FIG. 5 is a schematic configuration diagram IV of a power supply circuit and a power consumption module according to an embodiment of the present disclosure.
Figure 6:
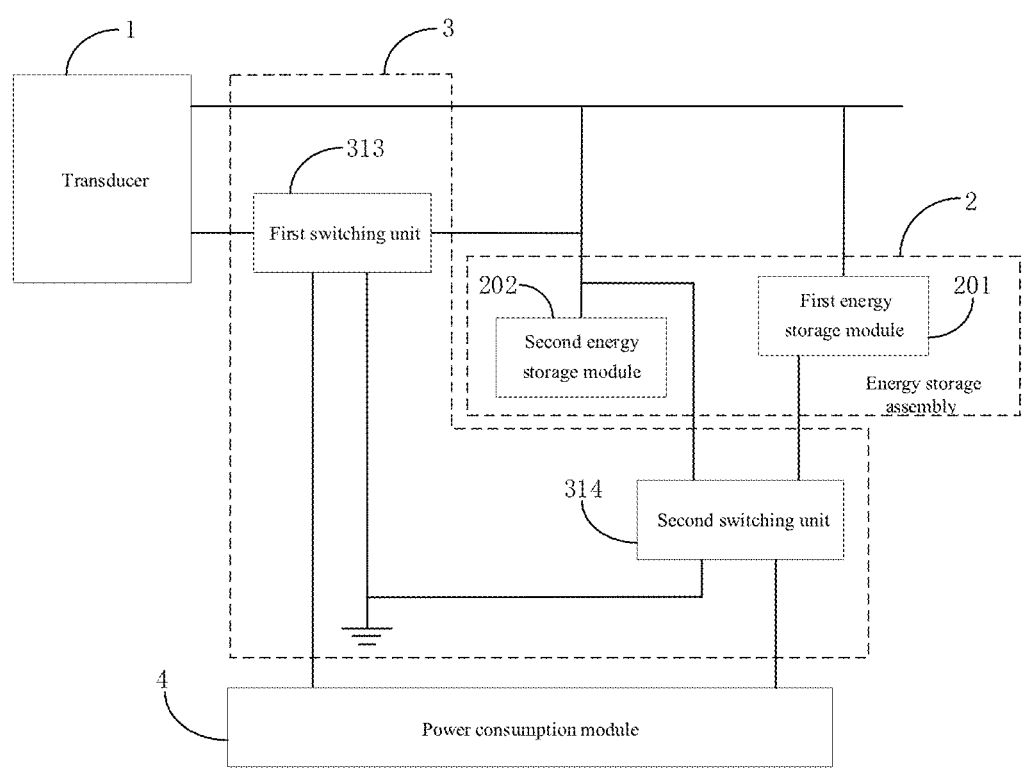
FIG. 6 is a schematic configuration diagram V of a power supply circuit and a power consumption module according to an embodiment of the present disclosure.
Figure 7:
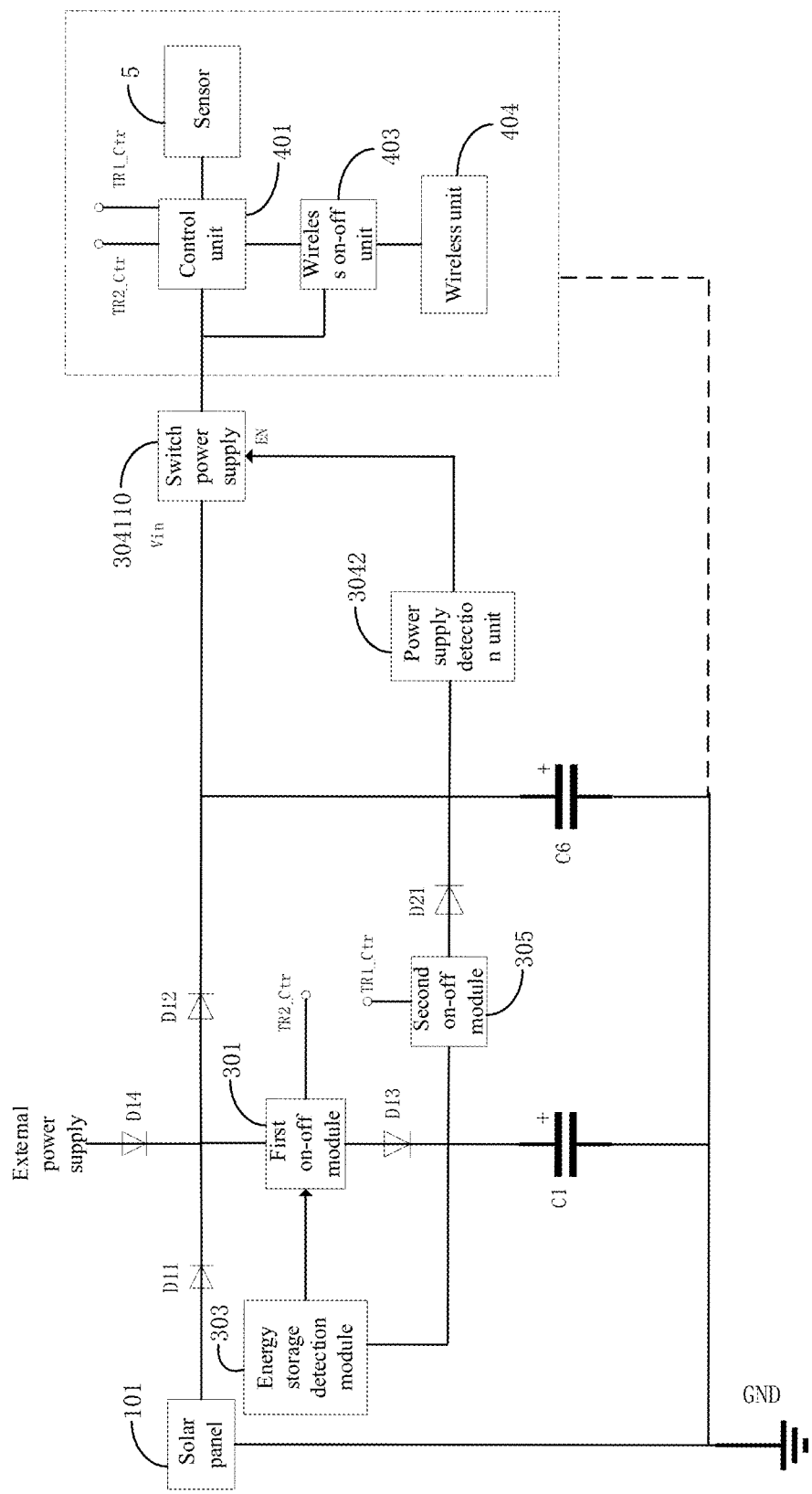
FIG. 7 is a schematic configuration diagram I of a power supply circuit, a power consumption module, and a sensor according to an embodiment of the present disclosure.

In one embodiment, referring to FIG. 5, the power supply assembly further comprises a first charging unidirectional conduction portion 306, an input terminal of the first charging unidirectional conduction portion 306 being connected to a first end of the transducer 1, and an output terminal of the first charging unidirectional conduction portion 306 being directly or indirectly connected to the first end of the first energy storage module 201 and the first end of the second energy storage module 202. Further, referring to FIGS. 7 to 11 and 14, the first charging unidirectional conduction portion 306 may include at least one first charging diode D11, and if at least two first charging diodes are included, the first charging diodes may be connected in series. In a non-illustrated example, the first charging unidirectional conduction portion 306 includes at least one first charging triode, and further, the function of unidirectional conducting is realized using the transistor.

By means of the first charging unidirectional conduction portion 306, a unidirectional conduction output of the transducer 1 (e.g. solar panel 101) can be achieved, avoiding a reverse transfer of electrical energy to the transducer.

In one embodiment, referring to FIG. 5, the power supply assembly 3 further includes a second charging unidirectional conduction portion 307 and a third charging unidirectional conduction portion 308;

An input terminal of the second charging unidirectional conduction portion 307 is connected to an output terminal of the first charging unidirectional conduction portion 306, and an output terminal of the second charging unidirectional conduction portion 307 is connected to the first end of the first energy storage module 201 and the input side of the power supply module. Further, referring to FIGS. 7 to 11 and 14, the second charging unidirectional conduction portion 307 may include at least one second charging diode D12, and if at least two second charging diodes are included, the second charging diodes may be connected in series. In a non-illustrated example, the second charging unidirectional conduction portion 307 includes at least one second charging triode, and further, the function of unidirectional conducting is realized using the transistor.

An input terminal of the third charging unidirectional conduction portion 308 is connected to the output terminal of the first charging unidirectional conduction portion 306, and an output terminal of the third charging unidirectional conduction portion 308 is connected to the first end of the second energy storage module 202 and the input side of the power supply module 304. Further, referring to FIGS. 7 to 11 and 14, the third charging unidirectional conduction portion 308 may include at least one third charging diode D13, and if at least two third charging diodes are included, the third charging diodes may be connected in series. In a non-illustrated example, the third charging unidirectional conduction portion 308 includes at least one third charging triode, and further, the function of unidirectional conducting is realized using the transistor.

By means of the second charging unidirectional conduction portion and the third charging unidirectional conduction portion, unidirectional conduction during charging of the first energy storage module (for example, the capacitor C6) and the second energy storage module (for example, the capacitor C1) can be achieved, and discharging of reverse power transfer can be avoided.

On this basis, if there is no third charging unidirectional conduction portion, the second energy storage module 202 must pass through the first energy storage module 201 when discharging, and the specific process is as follows: the second energy storage module 202 discharges a load, and when a current flows through the first energy storage module 201, the voltage of the first energy storage module 201 is charged to be consistent with the second energy storage module 202, and then the first energy storage module 201 and the second energy storage module 202 together discharge a discharge module at the rear end. However, at night or in some other use environments, in order to make it possible for the electrical energy in the second energy storage module 202 to supply the load for a long time and for the load to be used in a non-light environment for a longer time, it is not desirable for the second energy storage module 202 to have a process of charging the first energy storage module 201 when it is discharged, since this would additionally increase the consumption of the second energy storage module 202. Based on this fact, the third charging unidirectional conduction portion is introduced in the above-mentioned solution, and after the third charging unidirectional conduction portion is introduced, the current can only flow to the power consumption module through the first energy storage module 201 and cannot be reversed. Then, when the second energy storage module 202 is discharged, power can only be supplied to the power consumption module through the second on-off module 305 and the first discharging unidirectional conduction portion (e.g. a first discharging diode) without consuming power through the first energy storage module 201.

In one embodiment, an external power supply may be introduced in addition to the power supply of the transducer.

Referring to FIGS. 5 and 7-11, the power supply assembly further includes a fourth charging unidirectional conduction portion 310, an input terminal of the fourth charging unidirectional conduction portion 310 being connected to an external power supply, and an output terminal of the fourth charging unidirectional conduction portion 310 being connected to the output terminal of the first charging unidirectional conduction portion 306. In the examples shown in FIGS. 7 to 11 and 14, the fourth charging unidirectional conduction portion 310 includes at least one fourth charging diode D14, and if at least two fourth charging diodes are included, the fourth charging diodes may be connected in series. In a non-illustrated example, the fourth charging unidirectional conduction portion 310 may include at least one fourth charging triode, and further, the function of unidirectional conducting is realized using the transistor.

An external power supply is understood to be any other power supply than a transducer, for example a battery power supply, a power supply of a power supply interface, etc.

In one embodiment, referring to FIG. 5, the power supply assembly further includes a first discharging unidirectional conduction portion 311; and an input terminal of the first discharging unidirectional conduction portion 311 is directly or indirectly connected to the first end of the second energy storage module 202, and an output terminal of the first discharging unidirectional conduction portion 311 is connected to the input side of the power supply module. Further, referring to FIGS. 7 to 11, the first discharging unidirectional conduction portion includes at least one first discharging diode D21, and if at least two first discharging diodes are included, the first discharging diodes may be connected in series. In a non-illustrated example, the first discharging unidirectional conduction portion 311 may include at least one first discharging triode, and further, the function of unidirectional conducting is realized using the transistor.

By the first discharging unidirectional conduction portion 311, the electrical energy of the first energy storage module can be prevented from being transmitted to the second energy storage module.

In one embodiment, referring to FIG. 5, the power supply assembly 3 further includes a second discharging unidirectional conduction portion 312; and an input terminal of the second discharging unidirectional conduction portion 312 is directly or indirectly connected to the first end of the first energy storage module 201, and an output terminal of the second discharging unidirectional conduction portion 312 is connected to the input side of the power supply module 304 and the output terminal of the first discharging unidirectional conduction portion 311. Further, referring to FIGS. 8 and 10, the second discharging unidirectional conduction portion 311 includes at least one second discharging diode D22, and if at least two second discharging diodes are included, the second discharging diodes may be connected in series. In a non-illustrated example, the second discharging unidirectional conduction portion 312 may include at least one second discharging triode, and further, the function of unidirectional conducting is realized using the transistor.

By means of the second discharging unidirectional conducting portion 312, it is possible to prevent the electrical energy output by the second energy storage module 202 during the power supply phase to the power consumption module 4 from passing through the first energy storage module.

In one embodiment, referring to FIGS. 6 and 9-11, the power supply assembly 3 further includes a first switching unit 313;

a first node of the first switching unit 313 is connected to the second end of the transducer 1 (e.g. a solar panel 101), a second node of the first switching unit 313 is grounded, and a third node of the first switching unit 313 is connected to the first end of the second energy storage module 202 (e.g. a capacitor C1).

The number of nodes of the first switching unit 313 may be three, and in some examples, may not be limited to only three, and may be four or more.

The first switching unit 313 has at least the following two connection states:

a first state in which the first node of the first switching unit is connected to the second node so that the second end of the transducer is grounded; and a second state in which the first node of the first switching unit is connected to the third node, so that the second end of the transducer is electrically connected to the first end of the second energy storage module.

The quantity of nodes is not limited to three, the corresponding connection state may also include but is not limited to the above-mentioned two.

The state switching of the first switching unit 313 can be controlled by a power consumption module 4 (for example, the control unit 401 thereof), and can also be controlled by other circuits or external signals; in one example, the control terminal of the first switching unit 313 is electrically connected to the power consumption module 4 so as to be able to switch two connection states under the control of the power consumption module; and the power consumption module 4 (e.g. the control unit 401 thereof) is configured to, during the power supply phase, control the first switching unit to maintain the first state such that the transducer charges the first energy storage module and the second energy storage module simultaneously during the power supply stage when the voltage at the input side of the power supply module 304 is greater than the specified voltage threshold value; and configured to, during the pre-power supply phase, control the first switching unit 313 to maintain the second state such that the transducer charges only the first energy storage module 201 during the pre-power supply stage when the voltage at the input side of the power supply module 304 is lower than the specified voltage threshold value.

In a specific example, the first switching unit includes a first switch tube and a second switch tube; the first switch tube and the second switch tube can be understood, for example, with reference to the transistor Qa and the transistor Qb shown in FIG. 12.

The first switch tube is connected to a first end of the second switch tube to form a first node of the first switching unit, a second end of the first switch tube forms a second node of the first switching unit, and a second end of the second switch tube forms a third node of the first switching unit; and a control terminal of the first switch tube is connected to the power consumption module, and a control terminal of the second switch tube is connected to the power consumption module via an inverter; or a control terminal of the second switch tube is connected to the power consumption module, and a control terminal of the first switch tube is connected to the power consumption module via an inverter.

In one embodiment, referring to FIGS. 6 and 9-12, the power supply assembly 3 further includes a second switching unit 314; and a first node of the second switching unit 314 is connected to the second end of the first energy storage module 201 (e.g. the capacitor C1), a second end of the second switching portion unit 314 is connected to the first end of the second energy storage module 202 (e.g. the capacitor C6), and a third node of the second switching unit 314 is grounded.

The quantity of nodes of the second switching unit 314 may be three, and in some examples, may not be limited to only three, and may be four or more.

The second switching unit 314 has at least the following two connection states:

a third state in which the first node of the second switching unit is connected to the third node so that the second end of the first energy storage module is grounded; and a fourth state in which the first node of the second switching unit is connected to the second node, so that the second end of the first energy storage module is electrically connected to the first end of the second energy storage module, so as to form a circuit connection relationship for series power supply.

The quantity of nodes is not limited to three, the corresponding connection state may also include but is not limited to the above-mentioned two.

The state switching of the first switching unit 313 can be controlled by a power consumption module 4 (for example, the control unit 401 thereof), and can also be controlled by other circuits or external signals; in one example, the control terminal of the second switching unit 314 is connected to the power consumption module 4 (for example, the control unit 401 thereof) so as to be able to switch two connection states under the control of the power consumption module; and the power consumption module is further configured to control the second switching unit to maintain the third state such that the first energy storage module forms a parallel circuit relationship with the second energy storage module in the circuit when the voltage at the input side of the power supply module 304 is greater than the specified threshold value during the power supply phase; and configured to control the second switching unit to maintain the fourth state such that the first energy storage module forms a series circuit relationship with the second energy storage module in the circuit when the voltage at the input side of the power supply module is lower than the specified voltage threshold value.

Where the specified threshold value used when the first switching unit switches may be the same as the specified threshold value used when the second switching unit switches, the specified threshold value used when the first switching unit switches may also be different (e.g. higher or lower) than the specified threshold value used when the second switching unit switches.

In a specific example, the second switching unit 314 includes a third switch tube and a fourth switch tube; the third switch tube and the fourth switch tube can be understood, for example, with reference to the transistor Qa and the transistor Qb shown in FIG. 12; and the third switch tube is connected to a first end of the fourth switch tube to form a first node of the second switching unit, a second end of the third switch tube forms a second node of the second switching unit, and a second end of the fourth switch tube forms a third node of the second switching unit; and a control terminal of the third switch tube is connected to the power consumption module, and a control terminal of the fourth switch tube is connected to the power consumption module via an inverter; or a control terminal of the fourth switch tube is connected to the power consumption module, and a control terminal of the third switch tube is connected to the power consumption module via an inverter.

Figure 14:
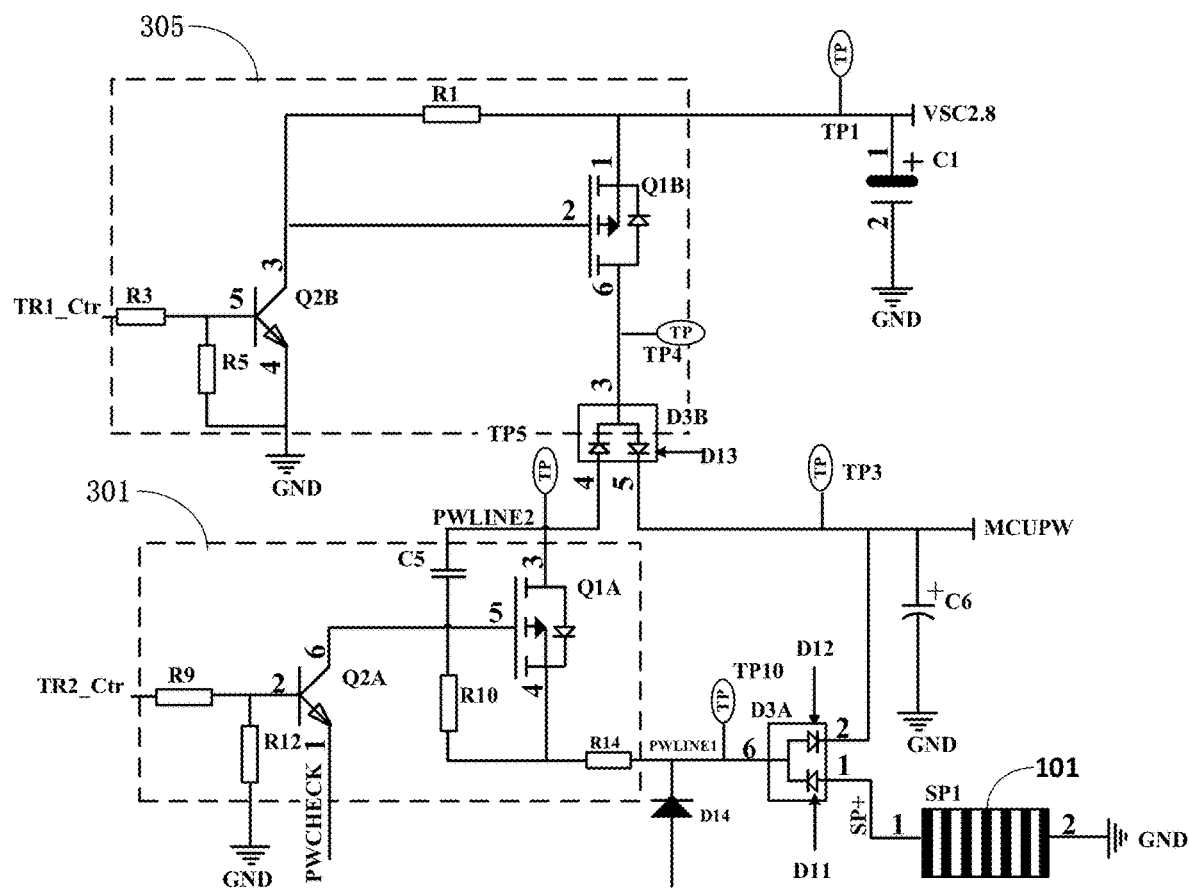
FIG. 14 is a schematic circuit diagram of a part of a power supply circuit according to an embodiment of the present disclosure.
Figure 15:
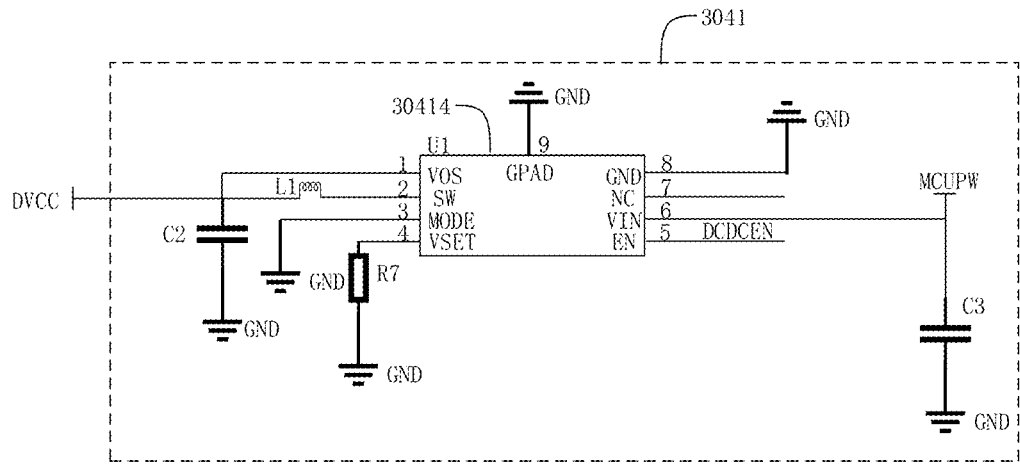
FIG. 15 is a schematic circuit diagram of a power supply unit according to an embodiment of the present disclosure.

In one embodiment, referring to FIG. 14, the first on-off module 301 includes a first on-off transistor Q1A and a first on-off driver tube Q2A;

A first end of the first on-off transistor Q1A is directly or indirectly connected to a first end of the transducer 1, and a second end of the first on-off transistor Q1A is directly or indirectly connected to the first end of the second energy storage module (for example, the capacitor C1), and specifically, the second end of the first on-off transistor Q1A can be connected via a body diode of a second on-off transistor Q2A in the second on-off module 305 and conducts same to the second energy storage module (for example, the capacitor C1) so as to charge same when conducting same. A control terminal of the first on-off driver tube Q2A is connected as the first control terminal to the power consumption module (for example, the control unit 401 of the power consumption module 4) via a resistor. A first end of the first on-off driver tube Q2A is connected to a control terminal of the first on-off transistor Q1A; a second end of the first on-off driver tube is grounded; and in addition, a second end of the first on-off driver tube Q2A is also connected as the second control terminal to an output terminal of the energy storage detection module.

The first on-off transistor Q1A therein can be a field effect transistor or a triode, and the first on-off driver tube Q2A can be a field effect transistor or a triode.

Furthermore, referring to FIG. 14, a second on-off module 305 connected between the first end of the second energy storage module 202 and the input side of the power supply module 304 includes a second on-off transistor Q1B; and a first end of the second on-off transistor Q1B is directly or indirectly connected to the first end of the second energy storage module, a second end of the second on-off transistor Q1B is connected to the input side of the power supply module 304, and a control terminal of the second on-off transistor Q1B is controlled by the power consumption module 4 (for example, the control unit 401 thereof) so as to be switched on and off under the control of the power consumption module 4.

The second on-off transistor Q1B may be a field effect transistor having a body diode.

The second end of the first on-off transistor Q1A is connected to the second energy storage module (for example, the capacitor C1) through the second on-off transistor Q1B, and is configured such that when the second on-off transistor Q1B is off and the first on-off transistor Q1A is on, the power transferred by the first on-off transistor Q1A is able to be sent to the second energy storage module (for example, the capacitor C1) through a body diode of the second on-off transistor Q1B.

In a further solution, the second on-off module 305 further includes a second on-off driver tube Q2B, a control terminal of the second on-off driver tube Q2B is connected to the power consumption module 4 (for example, the control unit 401 of the power consumption module 4) via a resistor, a first end of the second on-off driver tube Q2B is connected to the control terminal of the second on-off transistor Q1B, the first end of the second on-off driver tube Q2B is further connected to the first end of the second energy storage module (for example, the capacitor C1) via a pull-up resistor, a second end of the second on-off driver tube Q2B is grounded, and a pull-down resistor R5 is provided between the second end of the second on-off driver tube Q2B and the control terminal, such that the second on-off driver tube Q2B is turned on and off under the control of the power consumption module, and the control terminal of the second on-off transistor Q1B is grounded when the second on-off driver tube Q2B is turned on, so as to be triggered.

The second on-off driver tube may be a triode or a field effect transistor.

Further, in some embodiments, the first on-off transistor and the second on-off transistor may be driven without using a driver tube, and the first on-off transistor and the second on-off transistor are directly controlled by the power consumption module 4 (e.g. the control unit 401). In one embodiment, referring to FIGS. 7 to 11, the power consumption module 4 includes a control unit 401; the output side of the power supply module 304 is connected to the control unit 401, and the first control terminal of the first on-off module 301 is controlled by the control unit 401.

Furthermore, the power module 4 further comprises a wireless unit 404, and the wireless unit 404 is directly or indirectly connected to the control unit 41 to transmit a predetermined wireless signal under the control of the control unit 401. The wireless units therein may include at least one of: bluetooth wireless unit, radio frequency wireless unit, wifi wireless unit.

Meanwhile, the wireless unit 404 may be directly or indirectly connected to the output side of the power supply module 304 so as to be powered. Furthermore, the power consumption module 4 further comprises a wireless on-off unit 403; the output side of the power supply module 304 is further connected to the power supply terminal of the wireless unit 404 via the wireless on-off unit 403, and the control terminal of the wireless on-off unit 403 is connected to the control unit 401 and is provided to be adapted to turn on and turn off the power supply module 304*m* and the power supply terminal of the wireless unit 404 under the control of the control unit 401. Further, the control unit 401 may control whether power is supplied to the wireless unit 404.

In a aspects, the control unit 401 is configured for:
controlling the wireless on-off unit to be turned on when it is necessary to use the wireless unit to send or receive the wireless signal; and
controlling the wireless on-off unit to be turned off when it is unnecessary to use the wireless unit to send or receive the wireless signal.

By controlling the switching off of the wireless switching portion, the standby power consumption of the wireless unit can be reduced.

Figure 21:
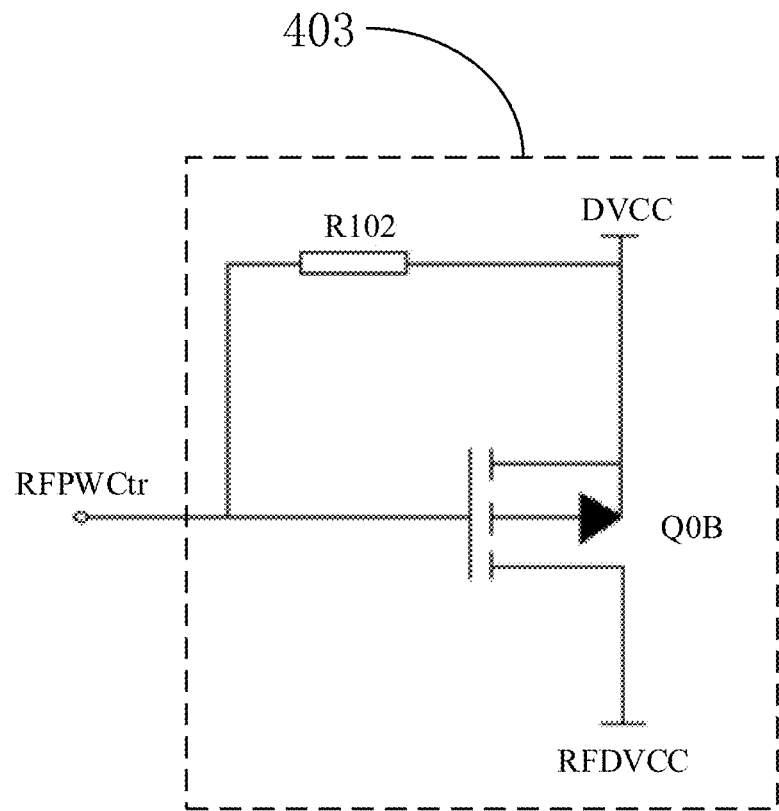
FIG. 21 is a schematic circuit diagram III of a wireless on-off module according to an embodiment of the present disclosure.

In one embodiment, referring to FIG. 21, the wireless on-off unit 403 includes a wireless on-off field effect transistor QOB; and
two ends of the wireless on-off field effect transistor are respectively connected to the output side of the power supply module 304 and the power supply terminal of the wireless unit 404, and the control terminal of the wireless on-off field effect transistor QOB is controlled by the control unit 401 so as to be turned on and turned off under the control of the control unit.

Figure 20:
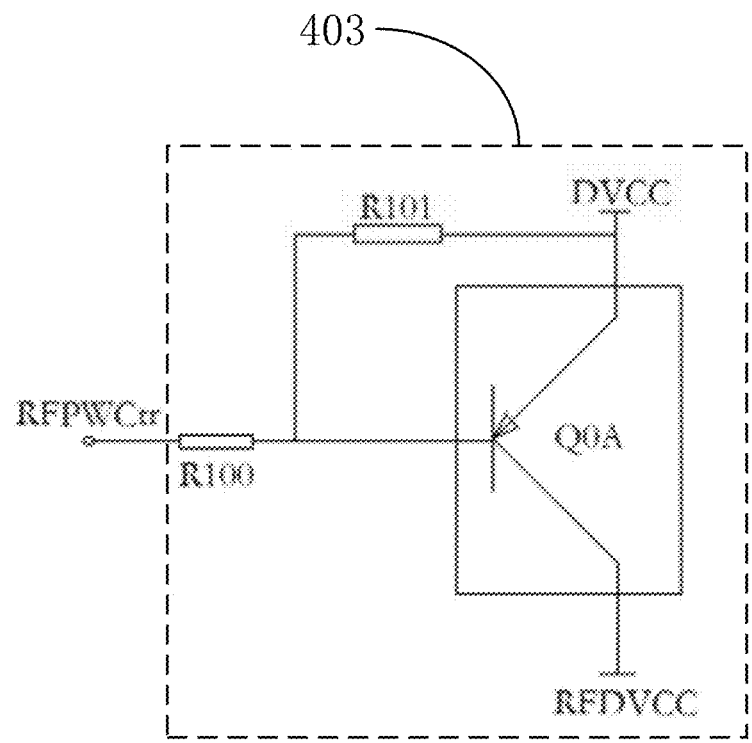
FIG. 20 is a schematic circuit diagram II of a wireless on-off module according to an embodiment of the present disclosure.

In one embodiment, referring to FIG. 20, the wireless on-off unit 403 includes a wireless on-off transistor QOA; and
a first end of the wireless on-off triode QOA is connected to the output side of the power supply module 304, a second end of the wireless on-off triode QOA is connected to the power supply terminal of the wireless unit 404, and a control terminal of the wireless on-off transistor QOA is connected to the control unit 401 via a current limiting resistor R100 so as to be turned on and turned off under the control of the control unit 401.

Figure 19:
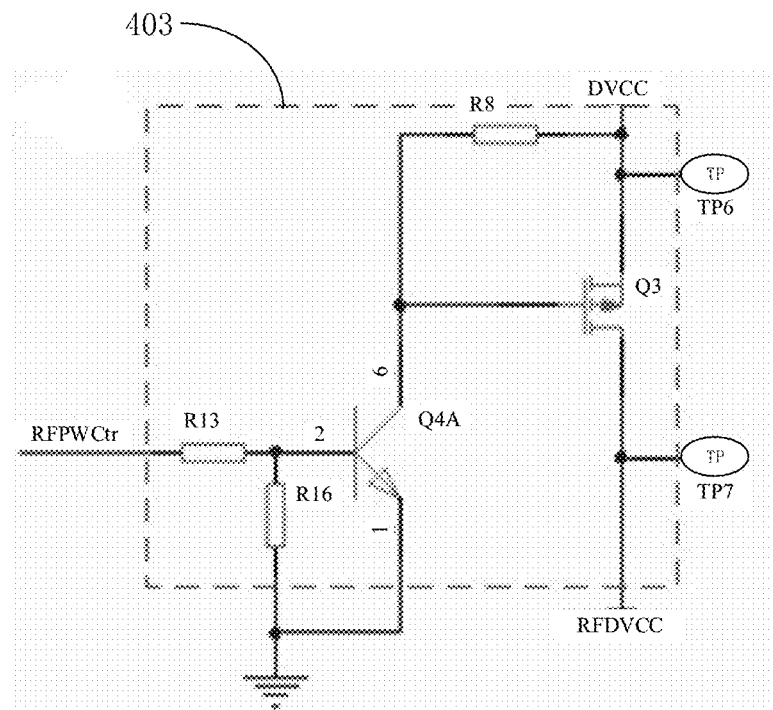
FIG. 19 is a schematic circuit diagram I of a wireless on-off module according to an embodiment of the present disclosure.

In one embodiment, referring to FIG. 19, the wireless on-off unit 403 includes a wireless on-off transistor Q3 and a wireless on-off driver tube Q4A; the wireless on-off transistor Q3 therein can be a field effect transistor and can also be a triode, and the wireless on-off driver tube Q4A therein can be a field effect transistor and can also be a triode;
two ends of the wireless on-off transistor Q3 are respectively connected to the output side of the power supply module 304 and the power supply terminal of the wireless unit 404, and a control terminal of the wireless on-off transistor Q3 is connected to the first end of the wireless on-off driver tube; and
a control terminal of the wireless on-off driver tube Q4A is connected to the control unit 401 via a current limiting resistor R13, a second end of the wireless on-off driver tube Q4A is grounded, and a first end of the wireless on-off driver tube Q4A is also connected to the output side of the power supply module 304 via a pull-up resistor R8; and a resistor R16 is also connected between the second end of the wireless on-off driver tube Q4A and the control terminal 304.

With respect to the circuits of FIGS. 13-17, 19, 22, the operation thereof may for example be as follow.

The solar panel 101 charges the capacitor C6 of the first energy storage module via the diode in the module D3A. The voltage MCUPW of the capacitor C6 is input to the VDD of the power supply voltage detection chip 30421, and at the same time of supplying power to the chip, the voltage signal of the capacitor C6 is also transmitted to the power supply voltage detection chip 30421. When the power supply voltage detection chip 30421 detects that the voltage of the capacitor C6 reaches a threshold value Von (namely, a first voltage threshold value), an enable signal DCDCEN is output to the EN pin of the power supply chip 30414 (which is a switch power supply or a part of the switch power supply) in the power supply unit 3041 via the RESET pin, and simultaneously, the Vin pin of the power supply chip 30414 is connected to the MCUPW of the capacitor C6. When the EN pin of the power supply chip 30414 is enabled, the power supply chip 30414 starts to operate, and the DVCC to supply power for the power consumption module 4 via the SW pin after the input voltage MCUPW is reduced in voltage.

The value of Von (namely, the first voltage threshold value) therein is greater than the minimum voltage required for the operation of the power consumption module, and the voltage provided by the Von should be able to satisfy the electric quantity required for a series of initializations when the power consumption module starts. Since each component in the load is in an uncertain state when it is not initialized, and the state is very power-consuming, the Von should be greater than the minimum voltage required for the operation of the load so as to ensure that the load starts smoothly and initializes successfully, and save power after the initialization is completed. In a specific example, the minimum voltage required for load operation is 1.8V, and typically Von (i.e. the first voltage threshold value) may be set to 2.0 v.

After the load is powered on, the MUC4011 of the control unit 401 is powered on; the MUC4011 sends a sensing signal TR2_Ctr to the first control module 301 via the PC5 pin; simultaneously, the energy storage detection module 303 (for example, the energy storage voltage detection chip 3031 therein) inputs a voltage signal PWLINE2 of the capacitor C1 of the second energy storage module via the VDD pin; and when the PWLINE2 is less than a threshold value voltage Vc1 (namely, the second voltage threshold value) of the second capacitor C1, the energy storage voltage detection chip 3031 outputs a low level PWCHECK to the emitter of the first on-off driver tube Q2A via the RESET pin. At this moment, TR2_Ctr is a high level, and PWCHECK is a low level, such that the first on-off driver tube Q2A is turned on, and then the first on-off transistor Q1A is turned on. The current of the solar panel 101 is divided into two paths, and one path charges the first capacitor C6 via the diode in the module D3A, while the other path charges capacitor C1 through diode of module D3A-resistor R14-first on-off transistor Q1A-diode to the left of module D3B-diode in second on-off transistor Q1B.

When the energy storage detection module detects that the second energy storage module 202 is full, the first on-off module is disconnected so as to prevent an overcharge, specifically:

when PWLINE2 is greater than Vc1, the energy storage voltage detection chip 3031 outputs a high level via the RESET pin, and at this time, the PWCHECK is a high level; and regardless of whether TR2_Ctr is a high level or a low level, Q2A will be cut off, and then the G pole of Q1A is pulled to a high level by R10 and R14, so that Q1A is cut off, namely, the first on-off module is turned off.

When it is required to discharge the second energy storage module 202 (for example, at night), the MCU 4011 of the control unit sends a high-level sensing signal TR1_Ctr to the base electrode of the first on-off driver tube Q2B via the PC6 pin, such that the first on-off driver tube Q2B is turned on, and then the gate electrode of the first on-off transistor Q1B is grounded and the first on-off transistor Q1B is turned on, namely, the second on-off module 305 is turned on; at this moment, the capacitor C1 can send an output voltage of the first on-off transistor Q1B—the diode at the right side of the module D3B to the input terminal of the switch power supply, and then supply power to the load after being converted by the switch power supply.

When a wireless signal needs to be sent, the MCU 4011 sends a high-level sensing signal RFPWCtr to the base electrode of the wireless on-off driver tube Q4A in the wireless on-off unit 403 via the PD0 pin, so that the wireless on-off driver tube Q4A is turned on, and then the gate electrode of the wireless on-off transistor Q3 is grounded to turn on the wireless on-off transistor Q3, and then the DVCC can output the RFDVCC to the wireless unit via the wireless on-off transistor Q3 so that the wireless unit is powered on to send a preset signal.

In addition, pin No. 12 of MCU 4011 in the control unit turns on the positive electrode of the capacitor C1, so that the capacitor C1 can be used for measuring the electric quantity of the capacitor C1, and then the message required to be sent out by the power consumption module can be written for the user to view.

In one embodiment, referring to FIGS. 7 to 11 and 25, the power consumption module 4 further includes a timing unit 406, the timing unit 406 being connected to the power supply module 304 (for example, a power supply unit 3041 thereof) and/or the control unit 401; and the timing unit 406 is configured and adapted to stop the power supply to the control unit 401 by the power supply module 304 when the control unit 401 is asleep and to turn on the power supply to the control unit 401 by the power supply module 304 after a timed period of time so that the control unit 401 is periodically powered up or awakened.

In the above-mentioned solution, by periodically waking up (powering up) and stopping the power supply, the control unit 401 can be powered down in a low power consumption state (for example, when sleeping) to reduce its power consumption.

Figure 25:
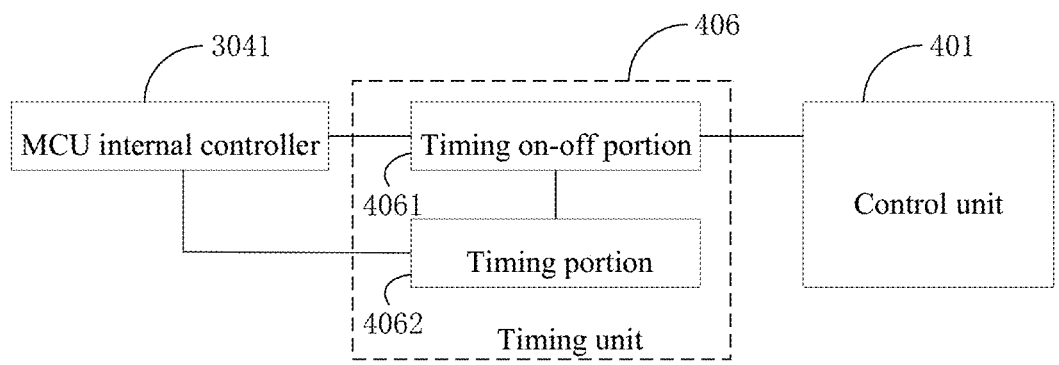
FIG. 25 is a schematic configuration diagram of a part of a power consumption module and a power supply circuit according to an embodiment of the present disclosure.

In a further aspect, referring to FIG. 25, the timing unit 406 comprises a timing on-off portion 4061 provided between the control unit 401 and the output side of the power supply module 304 and a timing portion 4062 connected to the timing on-off portion 4061 to control on-off of the timing on-off portion 4061. The timing portion can realize the function of timing the timing duration, and after the timing on-off portion 4061 is turned off, the timing portion can start timing, and when the timing reaches the timing duration, the power supply of the control unit 401 by the power supply module 304 is turned on by turning on the timing on-off portion 4061.

In a further solution, in addition to directly controlling the power supply on and off between the power supply unit 3041 and the control unit, the timing unit can also control whether the power supply unit operates, and furthermore, the timing unit 406 (for example, a timing portion 4062 thereof) can also be connected to a trigger terminal of the power supply unit 3041 of the power supply module 304;

when the timing unit 406 stops the power supply to the control unit by the power supply module, the timing unit is specifically configured for:
triggering the power supply unit 3041 to stop operating; and
when the timing unit starts the power supply to the control unit by the power supply module, the timing unit is specifically configured for:
triggering the power supply unit 3041 to start operating.

When the power supply unit 3041 includes a conversion portion, the timing unit 406 (for example, the timing portion 4062 thereof) can be connected to a control terminal (or the trigger terminal, the enabling end) of the conversion portion, triggering the power supply unit 3041 to start operating and stop operating, and then for example, the conversion portion can be triggered to start operating and stop operating. When the power supply unit 3041 includes a plurality of conversion portions, a control terminal (or a trigger terminal, an enabling end) of the conversion portions may be connected to the timing unit 406 (e.g. the timing portion 4062 thereof), and the control unit 401 and/or the power supply detection unit 3042, respectively, via logic gates.

In one embodiment, referring to FIGS. 22 and 26 to 30, the power consumption module 4 further includes an actuation portion (such as a key S2, a key KEY1 and a key KEY2);

Referring to FIGS. 22, 26-30, the actuation portion (e.g. key S2, key KEY1, key KEY2) is configured to switch on and off in response to an external actuation being triggered. One end of the actuation portion is electrically connected to one port of the control unit 401 (for example, the MCU 4011 in the control unit 401), and the other end thereof is grounded, wherein one end connected to the control unit 401 (for example, the MCU 4011 in the control unit 401) can also be connected to an output side of the power supply module 304 via a pull-up resistor (for example, a pull-up resistor R19, a pull-up resistor R1 and a pull-up resistor R2), so that when the actuation portion is triggered to turn on, a corresponding port of the control unit 401 (for example, the MCU 4011 in the control unit 401) detects a specified level (for example, a low level). Further, a filter capacitor (e.g. a filter capacitor C26, a filter capacitor Cf3, and a filter capacitor Cf4) is provided between the two ends of the actuation portion (e.g. key S2, key KEY1, key KEY2).

In addition to a press switch, a knob switch can also be used as the actuation portion.

In some solutions, where the actuator uses a push switch (i.e. a key), it may be necessary to use the actuator to perform a corresponding operation (e.g. using a key to switch modes), such as long press, short press, fast multiple presses, etc. However, taking FIG. 26 as an example, the conduction of the key KEY after each depression causes a power consumption, and the key shown in FIG. 26 causes a relatively power-consuming problem.

Figure 26:
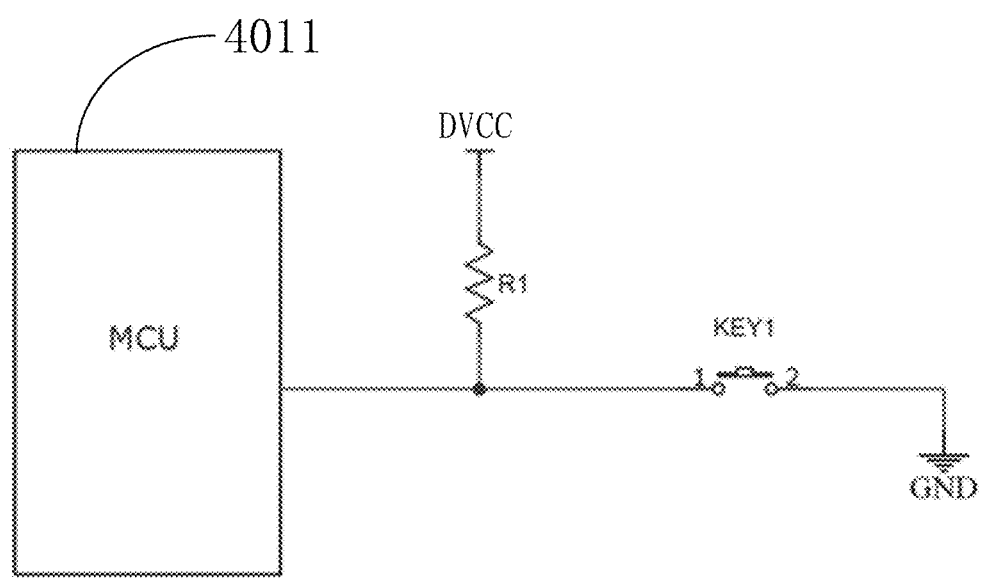
FIG. 26 is a schematic circuit diagram I of a control unit and an actuator according to an embodiment of the present disclosure.
Figure 27:
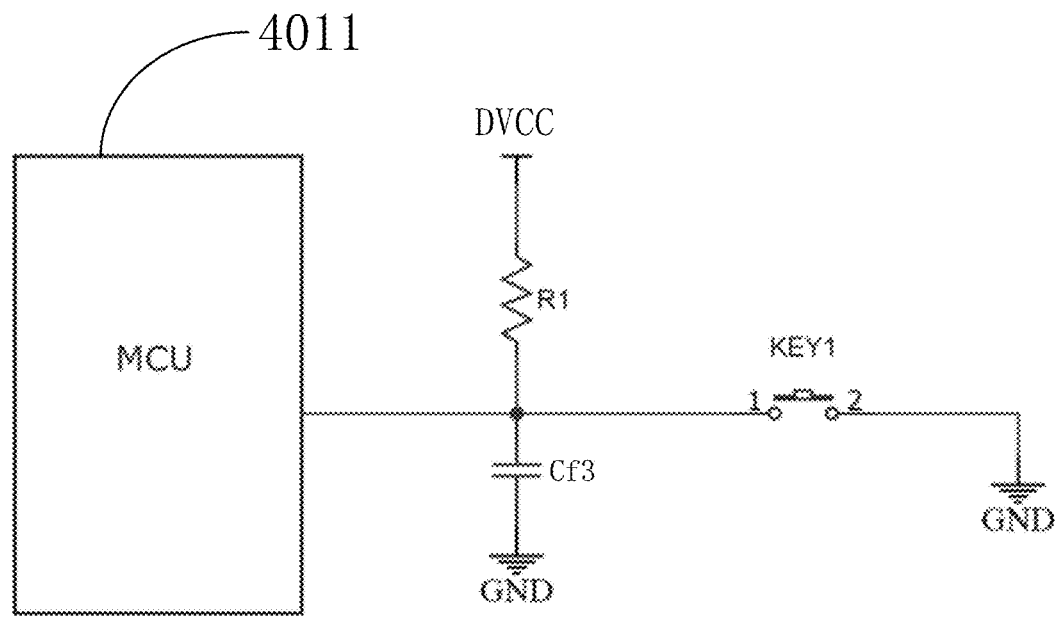
FIG. 27 is a schematic circuit diagram II of a control unit and an actuator according to an embodiment of the present disclosure.

To illustrate this problem, taking FIG. 26 as an example, when the key KEY1 is pressed, a current flows from the DVCC to the GND via the pull-up resistor R1 and the key KEY1, and if the key KEY1 is pressed for a long time (i.e. not released after the key DVCC 1 is pressed), the system always has a current consumption of the DVCC/R1, and this current is relatively large compared with the standby current of the system (for example, when DVCC=3.3V, R1=10 KΩ, this current will bring a current consumption of 3.3 mA, which cannot be ignored compared with the standby current of microamperes or even nanoamperes).

In some solutions, the current can be reduced by increasing the resistance of the pull-up resistor R1, but the resistance of the pull-up resistor R1 cannot be too large. Otherwise, the voltage drop of noise on the pull-up resistor R1 is too large, resulting in inaccurate identifier of a control unit (such as an IO port of a MCU), and furthermore, the key anti-interference capability is very weak and easy to trigger by mistake.

In the examples of FIGS. 27 to 29, and FIG. 22, a filter capacitor (e.g. filter capacitor C26, filter capacitor Cf3, filter capacitor Cf4) may be added to improve stability; small voltage fluctuations such as false hits and disturbances can be buffered by the capacitor to prevent false triggering.

In a further refinement, it is also possible to introduce the switch S5 while adding a pin of the control unit (e.g. its MCU) (e.g. a MCU 4011 IOa on the basis of the MCU 4011 IOb) for controlling the switching on and off of the switch S5 in combination with a program for reducing the long on-time current consumption.

Figure 28:
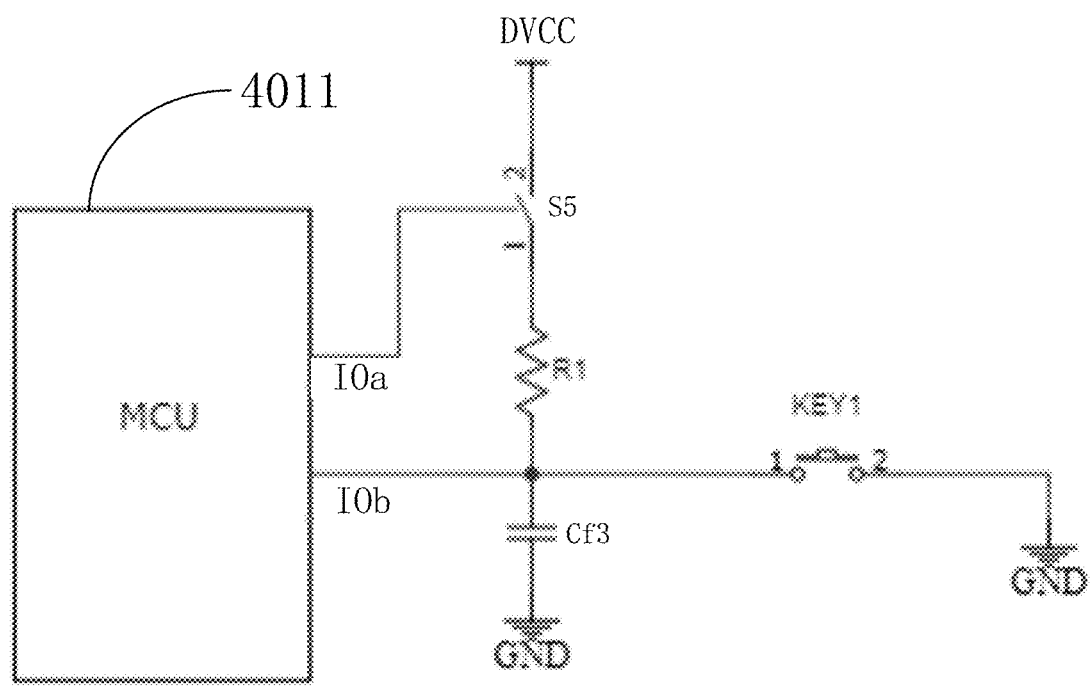
FIG. 28 is a schematic circuit diagram III of a control unit and an actuator according to an embodiment of the present disclosure.
Figure 29:
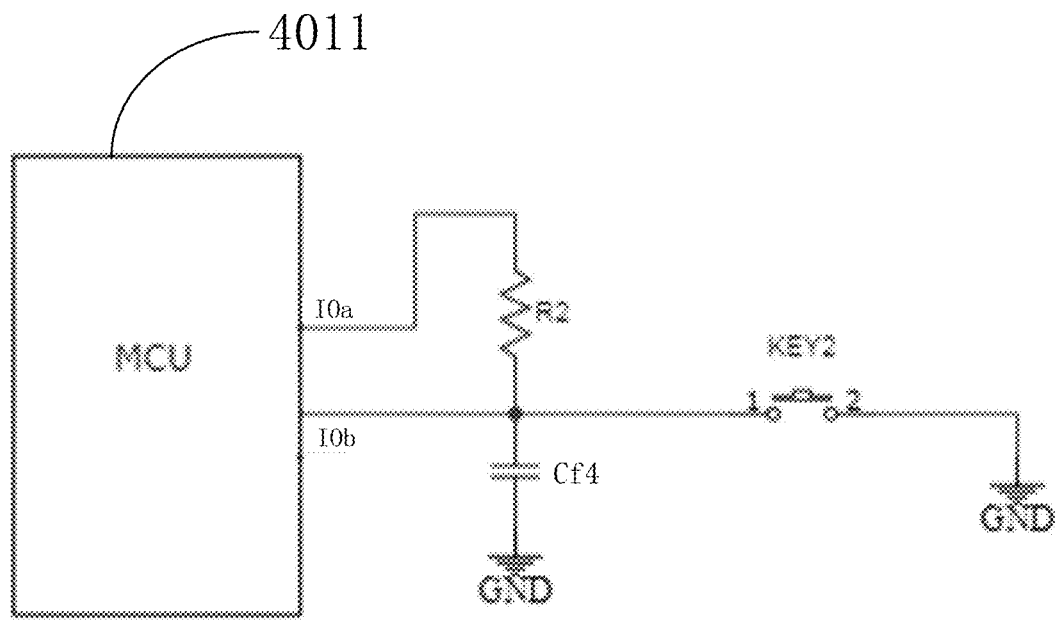
FIG. 29 is a schematic circuit diagram IV of a control unit and an actuator according to an embodiment of the present disclosure.

In the example shown in FIG. 28, the switch S5 is provided outside the MCU 4011; in the example shown in FIG. 29, the switch S5 can be provided inside the MCU 4011, wherein a control terminal of the switch S5 is connected to the MCU 4011 (such as a pin IOa thereof) or a controller therein, a first end of the switch S5 is connected to an output side of the power supply module, and a second end of the switch S5 is connected to one end of the key KEY1 via a pull-up resistor (namely, the key KEY1 is connected to one end of the MCU 4011, such as a MCU 4011 IOb thereof).

Whether the switch S5 is provided inside or outside the MCU, the control unit 401 (e.g. its MCU 4011) can be configured for:
when the switch S5 is turned on, detecting whether a key (e.g. a key KEY1, a key KEY2) is pressed, wherein if it is detected that the key is not pressed, the controllable switch S5 keeps on; if it is detected that the key is pressed, the controllable switch S5 is turned off, and timing is started;
when the timing reaches a specified duration, the switch S5 can be re-controlled to be turned on, and the above-mentioned process is repeated; and
in the above-described process, the time when the key is pressed and the time when the key is not pressed can be determined, and based on the time when the key is pressed and the time when the key is not pressed, it can be determined whether long press, continuous click and single click occur.

In the above-mentioned solution, it is realized to control the switch to turn off when the pressing of the key is detected, and at this time, it can avoid forming a loop between the DVCC, the pull-up resistor, the key and the ground, and furthermore, it can effectively reduce energy consumption and achieve the purpose of saving power.

In a specific example, taking FIG. 28 as an example, MCU may perform the following process that:
X1: MCU can first set the pin IOb as an input for detecting whether the key KEY1 is pressed, and set the pin IOa as an output high level for turning on the switch S5 to supply power to the key circuit;
X2: MCU can start sleep and start falling edge detection;
X3: When the pin IOb recognizes the falling edge of the key KEY1 after being pressed, the MCU can be controlled by both the pin IOa and the pin IOb to output a low level, so as to close the switch S5 to close the power supply loop, and simultaneously, preventing power consumption by forming a loop between the DVCC, the pull-up resistor, the key and ground;
X4: MCU starts sleeping and wakes up regularly; wherein after reaching the specified time duration of the timing, the MCU can set the pin IOb as an input for detecting the current state of the key KEY1; the pin IO2 is set to output a high level for turning on the switch S5 to supply power to the key circuit;
X5: If the pin IO1 detects a low level, it represents that the key KEY1 is still in a pressed state, and can return to step X3; otherwise, it represents that the key is no longer pressed (namely, rebound); based on this, the number of successive presses or the duration of the pressing of the key can be calculated.

In the example shown in FIG. 29, the operation thereof can be understood with reference to the above description.

Figure 30:
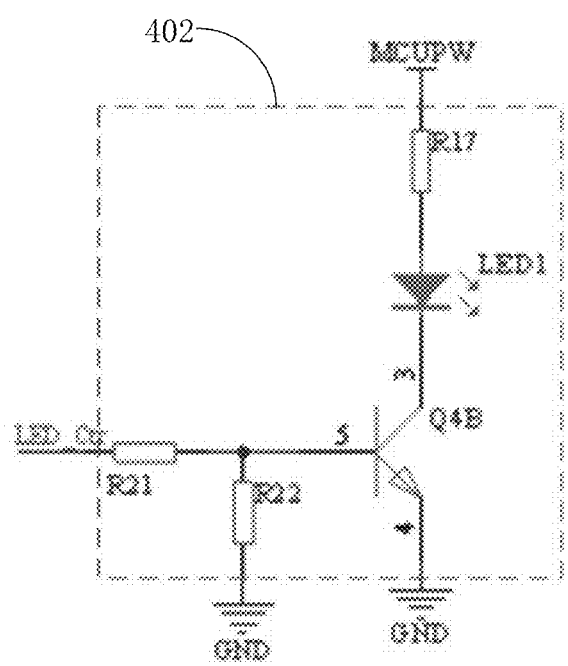
FIG. 30 is a schematic circuit diagram of an indication unit according to an embodiment of the present disclosure.

In one embodiment, referring to FIG. 30, the power consumption module 4 further includes an indication unit 402 connected to one port of the control unit 401 to emit light under the control of the control unit.

The light emitted by the indication unit 402 may indicate one or more kinds of information to the outside, for example, may indicate the operating state of the power consumption module, for example, indicate the change of the operating mode of the power consumption module, and, for example, indicate whether the power consumption module emits a signal and which kind of signal. No matter what the indication unit 402 is used to indicate, it does not depart from the scope of the embodiment of the present disclosure.

By way of further example, referring to FIG. 30, the indication unit 402 includes an indication transistor Q4B and a light emitting diode LED1. The indicator transistor Q4B may be a triode as shown or a field effect transistor.

A negative electrode of the light-emitting diode LED1 is connected to a first end of the indication transistor Q4B, a second end of the indication transistor Q4B is grounded, a control terminal of the indication transistor Q4B is connected to the control unit 401 via a resistor R21, and a positive electrode of the light-emitting diode LED1 is connected to a corresponding voltage source via a resistor R17.

the light-emitting diode can be a light-emitting diode of blue, and the possibility of other colors is not excluded; and the voltage source is an input side of the power supply module.

The blue light-emitting diode needs a voltage of at least 2 v or more to light up, so the resistor R17 is connected to MCUPW instead of DVCC (in the specific example, DVCC may be only 1.8V, which is not enough to light up the light-emitting diode LED1), namely: the LED1 inputs a voltage that is not stepped down by the power module to ensure that the bulb is lit.

8In one embodiment, the power supply circuit further includes an external power interface may be connected to an external power supply; the external power supply interface is directly or indirectly connected to the first end of the first energy storage module and the first end of the second energy storage module, and is configured for supplying power to the first energy storage module and the second energy storage module via an external power supply so as to start the operation of the power consumption module.

In one embodiment, the power consumption module 4 may be connected to a sensor 5. Furthermore, embodiments of the present disclosure may provide a sensing device including the above-mentioned power supply circuit and at least one sensor 5, wherein the consumer module 4 may be part of the power supply circuit or may be a circuit module connected to the power supply circuit.

The sensor 5 is provided to generate a sensing signal in response to a detection result of external detection.

The power consumption module may be powered during the power supply phase to transmit a wireless signal (which may be transmitted via a wireless unit) receiving the sensor signal. The wireless signals therein may for example include: a state update message capable of characterizing the detection result.

In one embodiment, the sensor may be a sensor for detecting whether a door or window is open, such as a door magnetic sensor.

In one embodiment, the sensor includes a state switching portion S1; the state switching portion S1 is connected to the control unit 401.

The state switching portion S1 is configured to be capable of switching states in response to a change in a magnetic field associated with a detection result, the sensing signal generated and transmitted to the control unit is different when the state switching portion is in different states. The change in the magnetic field can for example be such that when a desired detection result occurs for a detected object or environment (e.g. a detection result that a door or window has been opened, a detection result that a door or window has been closed), any one of the following may occur: a magnetic field is created, a magnetic field is removed, the direction of the magnetic field is changed, the strength of the magnetic field is changed, etc. Regardless of how the magnetic field changes, it does not depart from the above-described range as long as it brings about a state transition of the state switching portion (e.g. changing on in the state switching portion S1).

For the state switching portion with three nodes, a single-pole double-throw magnetic control switch (such as a single-pole double-throw reed switch) can be used, wherein the position of the magnet changes with the change of detection results. For example, two different states can be provided, and based on this, a series of state identifier can be achieved, and the specific states can be as shown in the following figure:

| Serial number | State |
| --- | --- |
| 1 | ON |
| 2 | ON -> OFF |
| 3 | OFF |
| 4 | OFF -> ON |

It should be noted that the state switching portion S1 may be implemented using a mechanical switch instead of a magnetic control. There is no current consumption and little static power consumption with the magnetically controlled switch compared to the mechanical switch.

Figure 22:
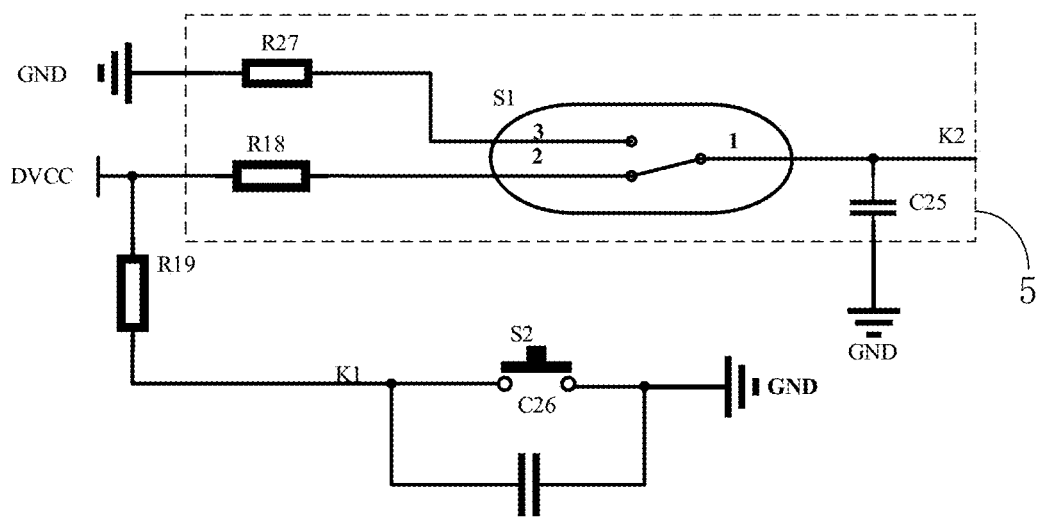
FIG. 22 is a schematic configuration diagram I of a part of a power supply circuit and a sensor according to an embodiment of the present disclosure.
Figure 23:
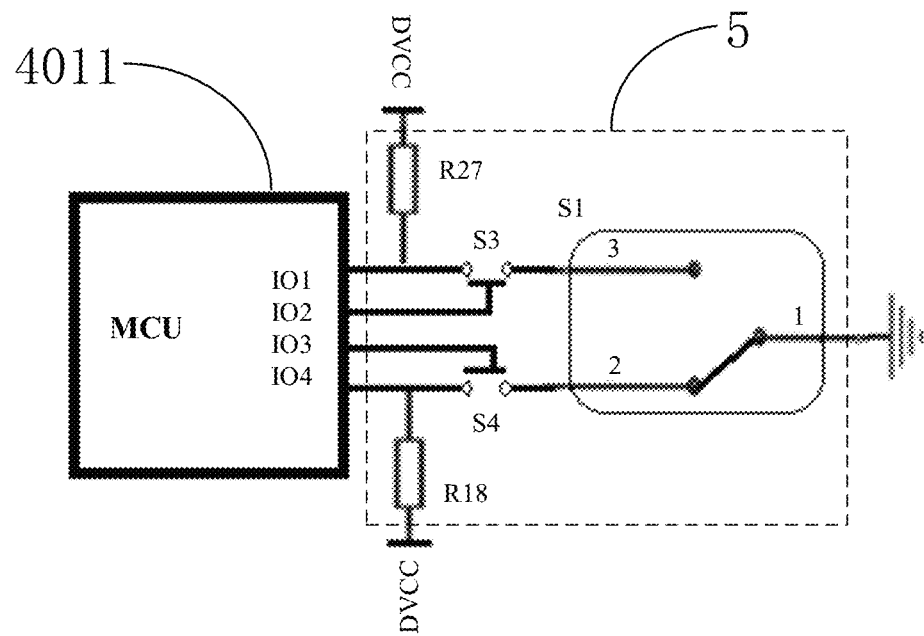
FIG. 23 is a schematic configuration diagram II of a part of a power supply circuit and a sensor according to an embodiment of the present disclosure.
Figure 24:
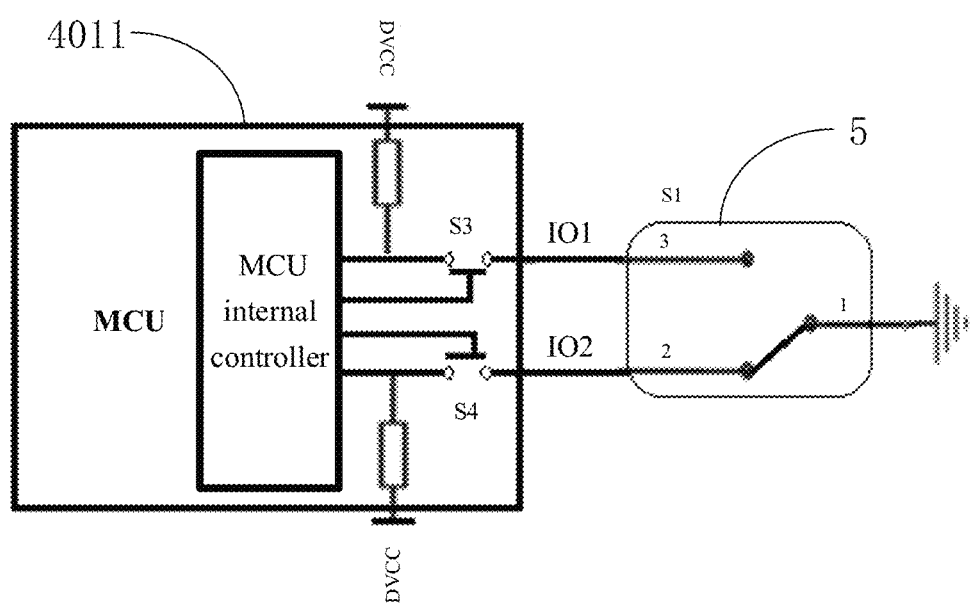
FIG. 24 is a schematic configuration diagram III of a part of a power supply circuit and a sensor according to an embodiment of the present disclosure.

In one specific aspect, referring to FIGS. 22 to 24, the state switching portion S1 has at least three nodes, the at least three nodes comprising at least one feedback node and a grounding node; and the feedback node is directly or indirectly connected to the control unit 401, and the grounding node is directly or indirectly grounded; and in the example shown in FIG. 22, the quantity of feedback nodes is one, and in the examples shown in FIGS. 23 and 25, the quantity of feedback nodes is two.

The state switching portion S1 is configured for:
sensing the detection result of the external detection, and changing an on-off relationship between the at least three nodes; and different detection results correspondingly form different on-off relationships so as to generate different sensing signals, such that the control unit acquires the detection results.

Taking FIG. 22 as an example, a quantity of the feedback nodes is one; the at least three nodes further comprise a power supply node, and the power supply node is connected to the output side of the power supply module to access DVCC; and the state switching portion (e.g. a single-pole double-throw switch S1) is configured for:
when the detection result is a first detection result (for example, a door and window are opened), turning on the feedback node and the power supply node to generate a sensing signal; and
when the detection result is a second detection result (for example, the door and window are closed or not opened), turning on the feedback node and the grounding node to generate another sensing signal.

Furthermore, in the example shown in FIG. 22, the sensor further comprises a sensor capacitor C25, and the feedback node is further grounded via the sensor capacitor C25 to filter the signal transmitted by the feedback node.

Taking FIG. 22 as an example, the single-pole double-throw switch S1 in the sensor employs a magnetic control switch (e.g. a reed switch), it is one state (e.g. door closed) when node 1 and node 2 in the single-pole double-throw switch S1 are connected, and it is the other state (door open) when node 1 and node 3 are connected. For example, when the state of the single-pole double-throw switch S1 is that the node 1 and the node 2 are switched on, and the state is maintained for a long time, the path of the DVCC—the resistor R18—the single-pole double-throw switch S1—the MCU will be continuously in a switched-on state, and at this time the resistor R18 will continue to consume power. When the state of the single-pole double-throw switch S1-S1 is switched from the node 1 connected to the node 2 to the node 1 connected to the node 3 and for a long time, the path of MCU-single-pole double-throw switch S1-resistor R27-GND will continue to be in an on state, and at this time resistor R27 will continue to consume power, resulting in increased power consumption.

It can be seen that in the above-mentioned solution, the problem of large power consumption is caused. The schemes of FIGS. 23 and 24 may help reduce power consumption. Taking FIGS. 23 and 24 as an example, a quantity of feedback nodes is two, a first feedback node and a second feedback node, respectively; the two feedback nodes are respectively connected to different ports of the control unit (for example, MCU 4011 thereof); and a voltage of the first feedback node or a voltage of the second feedback node are able to be pulled to match the voltage of the output side of the power supply module (for example, pulled to DVCC, or pulled to DVCC via a resistor); and the state switching portion (e.g. a single-pole double-throw switch S1) is configured for:

when the detection result is a first detection result, turning on the first feedback node and the grounding node to generate a sensing signal; and when the detection result is a second detection result, turning on the second feedback node and the grounding node to generate another sensing signal.

In a further example, the first feedback node is connected to a first feedback switch S3, and the second feedback node is connected to a second feedback switch S4; and the control unit is further configured such that:

after the grounding node changes from a state where the second feedback node is turned on to a state where the first feedback node is turned on, the first feedback switch is controlled to perform a turn-off action, and the second feedback switch is controlled to perform a turn-on action, such that the control unit can detect whether the grounding node turns on the second feedback node; and after the grounding node changes from a state where the first feedback node is turned on to a state where the second feedback node is turned on, the second feedback switch is controlled to perform a turn-off action, and the first feedback switch is controlled to perform a turn-on action, such that the control unit can detect whether the grounding node turns on the first feedback node.

The first feedback switch S3 and the second feedback switch S4 can be externally connected to the MCU 4011 or internally connected to the MCU 4011.

Here, the principles of FIG. 23 and FIG. 24 are similar, and the differences can be understood such that in FIG. 24, the switch and pull-up resistor inside the MCU are used, and in FIG. 23, the switch and pull-up resistor are separately provided outside the MCU.

Taking FIG. 23 as an example, the state detection process of the magnetron switch in the sensor for detecting the state of the door switch may be, for example, The MCU sets both the pin IO1 and the pin IO4 as inputs for detecting the state of a magnetic control switch (namely, the single-pole double-throw switch S1); the pin IO2 and the pin IO3 both output a high level so as to switch on the first feedback switch S3 and the second feedback switch S4.

If the level state of the pin IO4 changes from a high level to a low level, it represents that 1 and 2 of S1 are turned on (this state is defined as a door opening state, for example); if the door is always open, the current will be continuously consumed through the path of DVCC-resistor R18-second feedback switch S4-single-pole double-throw switch S1-GND, resulting in wasted power.

Since after the door opening state, the next state is certainly the door closing (the door is either opened or closed), it has no meaning to continue the detection pin IO4 at this moment; therefore, when pin IO3 outputs a low level, the second feedback switch S4 is disconnected, so that the path of DVCC-resistor R18-second feedback switch S4-S1-GND is disconnected, and the continuous consumption of electric power is prevented. Simultaneously, the IO1 is set as an input, and the IO2 outputs a high level so as to switch on the first feedback switch S3, and a door closing state is detected via the pin IO1.

The level of the pin IO1 changes from a high level to a low level, and then the node 1 and the node 3 of the single-pole double-throw switch S1 are switched on, which represents changing from a door opening state to a door closing state. At this time, if the door is always closed, the current will be continuously consumed through the path of DVCC-resistor R27-first feedback switch S3-single-pole double-throw switch S1-GND, resulting in wasted power.

Since the next state after the door is closed is certainly that the door is open, it has no meaning to detect the pin IO1 again at this moment. Therefore, at this moment, the pin IO2 outputs a low level, closes the first feedback switch S3, cuts off the path, and prevents power consumption. Simultaneously, the pin IO4 is set as an input, the pin IO3 outputs a high level to switch on the second feedback switch S4, and the arrival of the door opening state is detected via the pin IO4. This process is repeated.

Taking FIG. 24 as an example, the state detection process of the magnetron switch in the sensor for detecting the state of the door switch may be, for example, that both the pin IO1 and the pin IO2 are set as input detection;

if the pin IO2 detects a falling edge (or a low level), it represents that the nodes 1 and 2 in the single-pole double-throw switch S1 are switched on (a door closing state); if the door is always closed, the current will be continuously consumed through the path of pin IO2-single-pole double-throw switch S1-GND;

the MCU 4011 disconnects pin IO2, or enables pin IO2 to output a high resistance state and disconnects the path of IO2-single-pole double-throw switch S1-GND, preventing power consumption, simultaneously, setting pin IO1 as input detection so as to detect the arrival of a door open state via pin IO1;

if the pin IO1 detects a falling edge (or a low level), it represents that the node 1 and the node 3 in the single-pole double-throw switch S1 are switched on (a gate open state); if the door is always open, the current will continue to be consumed through the path of node IO1-single-pole double-throw switch S1-GND;

the MCU 4011 opens the pin IO1, or enables the pin IO1 to output a high resistance state and opens the pin IO1—the single-pole double-throw switch S1—the GND to prevent power consumption, simultaneously, setting a pin IO2 as input detection so as to detect the arrival of a door closed state via the pin IO2.

This process is repeated.

In other examples not shown, the state switching portion may have only two nodes, and furthermore, one node is connected to the control unit, and the suspension, short circuit, pull-up and pull-down of the other node may all form corresponding sensing signals.

Figure 31:
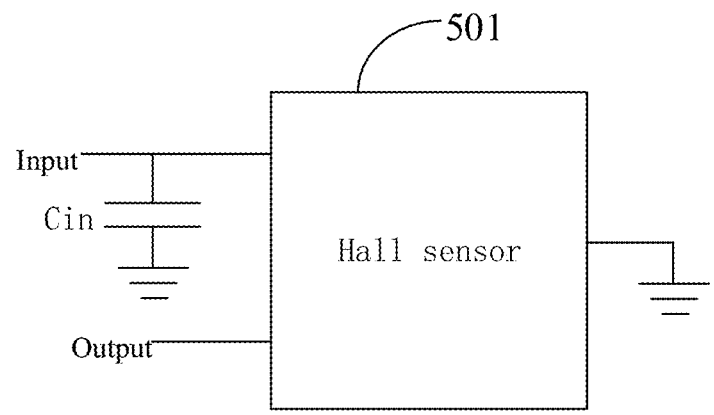
FIG. 31 is a schematic configuration diagram I of a Hall sensor according to an embodiment of the present disclosure.

Referring to FIG. 31, the sensor therein may also be, for example, a Hall sensor 501, which may have an input terminal, an output terminal and a grounding end, the input terminal may be connected to grounding end via an input capacitor CM, and the output terminal may be connected to the control unit. The voltage input at the input terminal may be, for example, DVCC.

Figure 32:
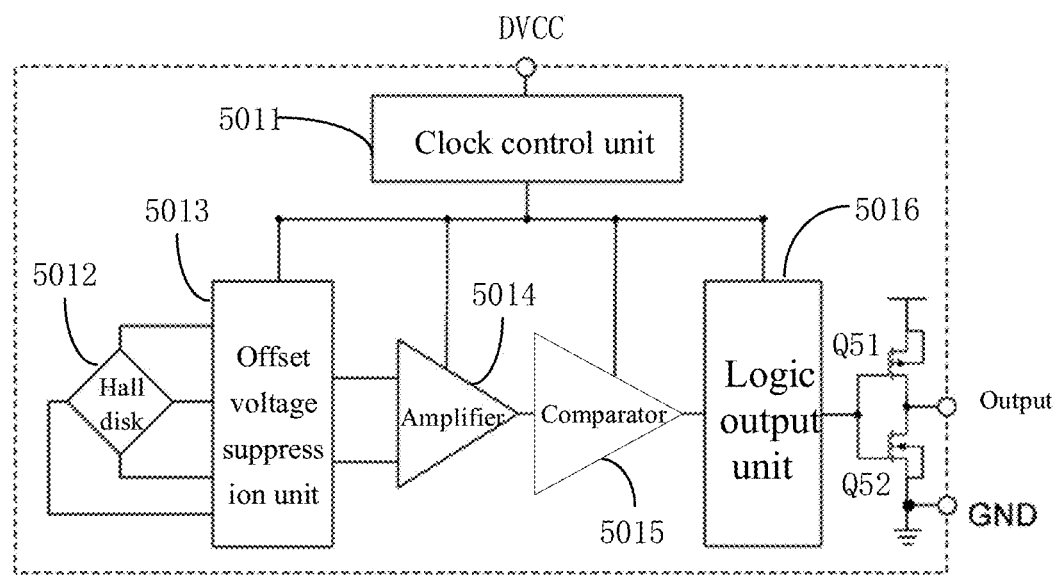
FIG. 32 is a schematic configuration diagram II of a Hall sensor according to an embodiment of the present disclosure.

By way of further example, referring to FIG. 32, the Hall sensor 501 may include: a clock control unit 5011, a Hall disk 5012, an offset voltage suppression unit 5013, an amplifier 5014, a comparator 5015, a logic output unit 5016, an upper transistor Q51 and a lower transistor Q52.

The Hall disk 5012 can output a corresponding electrical signal in response to a magnetic field or a change thereof. An output side of the Hall disk 5012 is connected to a offset voltage suppression module 5013. The offset voltage suppression module 5013 can perform offset voltage suppression processing on the voltage of an output signal of the Hall disk 5012. Then an amplifier 5014 can amplify the electrical signal after the suppression processing, and the amplified signal can represent information about the detected magnetic field. The comparator 5015 can compare the amplified signal with a reference signal and feed back the comparison result to a logic output unit 5016. The logic output unit 5016 can control the on/off of the upper pipe Q51 or the lower pipe Q52, wherein when the upper pipe Q51 is on, the lower pipe Q52 is controlled to be off simultaneously, and when the lower pipe Q52 is on, the upper pipe Q51 is controlled to be off simultaneously, and the output terminal of the Hall sensor can be connected between the upper pipe Q51 and the lower pipe Q52, so as to send a high level to the control unit when the upper pipe Q51 is on, and send a low level to the notification unit when the lower pipe Q52 is on. The clock control unit 5011 may be respectively connected to the offset voltage suppression unit 5013, the amplifier 5014, the comparator 5015 and the logic output unit 5016, and may further output a clock signal so as to use the clock signal to control the wake-up and sleep of the offset voltage suppression unit 5013, the amplifier 5014, the comparator 5015 and the logic output unit 5016, and in some solutions, a power supply may also be provided for same. The clock control unit 5011 may operate when DVCC is received at the input.

The Hall sensor may be, for example, the Hall sensor of KTH1601 or the Hall sensor of KTH1901.

In addition, the sensor may, for example, further include a TMR sensor, wherein an input terminal of the TMR sensor is connected to (i.e. the voltage of the VDD terminal) DVCC, and an output terminal of the TMR sensor may be connected to the control unit, and simultaneously, the input terminal of the TMR sensor may be grounded via a capacitor C29, and the output terminal may be grounded via a capacitor C25.

In addition to the foregoing description, when the energy storage assembly supplies power to the power consumption module, if the power supply to the power consumption module is controlled based only on the power supply voltage interval and the non-power supply voltage interval (namely, the first voltage threshold value), there will be problems. For example, if the back-end circuit (e.g. the power consumption module) is powered up to start operating after being above the first voltage threshold value, once the back-end circuit (e.g. the power consumption module) is operating, the voltage is pulled down below the first voltage threshold value and the output is turned off again (i.e. the power consumption module stops being powered). Further, the system may be continuously going through on/off cycling. If only the first voltage threshold value is increased, this leads to the problem that the "unusable voltage interval" becomes smaller.

In order to solve this problem, in one embodiment, the power supply assembly is further configured to cause the energy storage assembly to supply power to the power consumption module when the power consumption module is in a powered state and the output voltage of the energy storage assembly is in a power supply voltage interval; and cause the energy storage assembly to stop supplying power to the power consumption module when the output voltage is in a non-supply voltage interval; and the supply voltage interval partially coincides with the specified voltage interval.

For example, the specified voltage interval refers to an interval that is less than a first voltage threshold value; the power supply voltage interval refers to an interval that is greater than a power supply stoppage threshold value, and the first voltage threshold value is greater than the power supply stoppage threshold value.

The first voltage threshold value can be, for example, 1.8V, and the power supply stoppage threshold value can be, for example, 1.7V. When the output voltage of the energy storage assembly rises from low to high, it needs to be greater than the first voltage threshold value (for example, 1.8V) to start power supply for the power consumption module, so as to realize the start-up of the power consumption module. When the output voltage of the energy storage assembly goes from high to low, it needs to be as low as a power-off threshold value (e.g. 1.7V) before the output is turned off, i.e. the power to the power consumption module is stopped. This process may be illustrated, for example, in FIG. 33.

Figure 33:
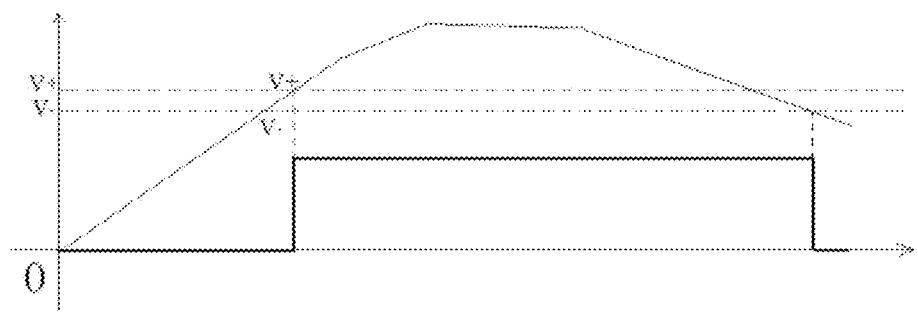
FIG. 33 is a schematic circuit diagram of input voltage and output voltage of the power supply unit according to an embodiment of the present disclosure.

In FIG. 33, the illustrated V+ may be understood as the first voltage threshold value, and the illustrated V− may be understood as the power supply stoppage threshold value. The thin line at the top of the figure can be understood as the input voltage of the power supply unit, i.e. the output voltage of the energy storage assembly, and the thick line as the output voltage of the power supply unit.

The foregoing process can be realized by using a power supply unit and a power supply detection unit, for example,
the power supply detection unit can detect a voltage at the input side of the power supply unit (namely, the output voltage of the energy storage assembly); after the power consumption module has not been powered up and the first energy storage module begins to be charged by the transducer, when the output voltage of the energy storage assembly rises but is not lower than the first voltage threshold value, the power supply unit is not enabled (namely, not connecting a power supply path between the energy storage assembly and the power consumption module). When the output voltage rises to the first voltage threshold value, the power supply unit is enabled, and power supply between the energy storage assembly and the power consumption module is connected, and the power consumption module is powered up. After the power consumption module is powered up, the power supply detection unit (or other circuits; the other circuit may, for example, be a control unit and another detection unit, and is not limited thereto) may detect a voltage at an input side of the power supply unit (namely, the output voltage of the energy storage assembly), determine whether the output voltage of the energy storage assembly falls and reaches the power supply stoppage threshold value (at this time, the power supply unit will not stop supplying power even if the output voltage falls to the first voltage threshold value), and the power supply detection unit (or the other circuit) may control the power supply unit to stop supplying power (for example, turn off) if the output voltage reaches the power supply stop threshold value.

In one example, the power supply detection unit (e.g. a detection chip therein) may be configured with the functionality of a "hysteresis" output, thus eliminating the need for software control using a controller. The voltage values of the hysteresis of different voltage detection chips are different, for example, the voltage detection chip used can select a hysteresis of 100 mv (1.8V-1.7V), and a detection chip with different voltage hysteresis values can also be selected according to actual requirements.

As can be seen, the above-mentioned solution avoids or reduces the likelihood that the circuit is constantly going through on/off cycling.

In order to avoid or reduce the on/off cycling, this can also be achieved by a corresponding arrangement of a power consumption module. In one embodiment, the power module (e.g. its control unit) is configured such that, after power-on and when the specified condition is not satisfied, the power consumption of the power consumption module is a first power consumption; after power-on and when the specified condition is satisfied, the power consumption of the power consumption module is a second power consumption, and the first power consumption is lower than the second power consumption;

the specified condition includes at least one of the following conditions that:
elapsed time after power-up exceeds a specified delay period; and
the voltage of the first energy storage module exceeds a specified power consumption state switching threshold value.

Specifically, the first power consumption is adapted to the power consumption of the power consumption module when the wireless unit is not transmitting the wireless signal and the second power consumption is adapted to the power consumption of the power consumption module when the wireless unit is transmitting the wireless signal.

The power consumption module further comprises a sensor coupled to the control unit, wherein the first power consumption is adapted to the power consumption of the power consumption module when the sensor is inactive and the wireless unit is not transmitting the wireless signal, and the second power consumption is adapted to the power consumption of the power consumption module when the sensor is active and the wireless unit is transmitting the wireless signal.

In the above-mentioned solution, if the specified condition is that elapsed time after power-up exceeds a specified delay period, then after the output voltage of the energy storage assembly reaches a first threshold value, the power consumption module starts up, but is in a first operating state (which can be understood as being in an operating state with the first power consumption). For example, a high power consumption action may not be executed (the high power consumption action can be, for example, sending a packet), and at this moment, only counting down after initialization can be performed, entering a second operating state (which can be understood as being in an operating state with the second power consumption) after delaying for a preset time (namely, a specified delay period), and then sensor detection and message sending can be executed.

In the above aspect, if the specified condition is that the voltage of the first energy storage module exceeds a specified power consumption state switching threshold value, then After the output voltage of the energy storage assembly reaches the first voltage threshold value, the power consumption module starts up, but is in the first operating state (which can be understood as being in an operating state with the first power consumption), for example, a high power consumption action (which can be understood as being in an operating state with the second power consumption) may not be performed, and at this time, it can be determined whether to enter the second operating state (which can be understood as being in an operating state with the second power consumption) according to a capacitor voltage (for example, the voltage of the first energy storage module), and after entering the second operating state, sensor detection and message sending may be performed. If the voltage of the first energy storage module is greater than a power consumption state switching threshold value, the second operating state can be entered. If it is lower than the power consumption state switching threshold value of the second threshold value, the first operation state is maintained.

Figure 13:
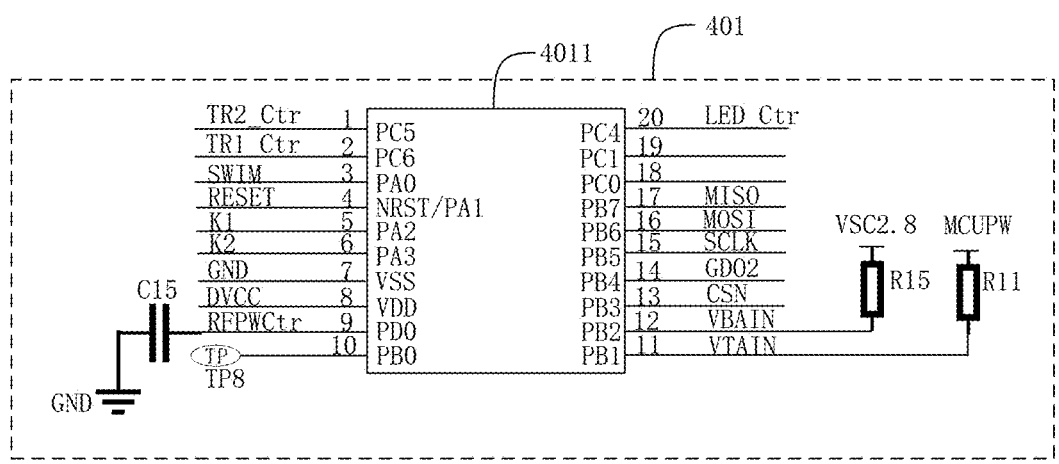
FIG. 13 is a schematic circuit diagram of a control unit according to an embodiment of the present disclosure.

In some solutions, in a transport mode, taking FIG. 13 as an example, when the control unit 401 (for example, MCU 4011) is not powered on, one pin is connected to a value voltage VSC2.8 via a resistor R15, wherein the voltage VSC2.8 is the voltage of the second energy storage module, and the voltage VSC2.8 leaks current to the control unit 401 via the resistor R15. While in a normal operating mode, when the control unit is powered on and a large capacity capacitor is supplied via the second energy storage module, the DVCC will be pulled high, so that the whole supply voltage is high.

Figure 37:
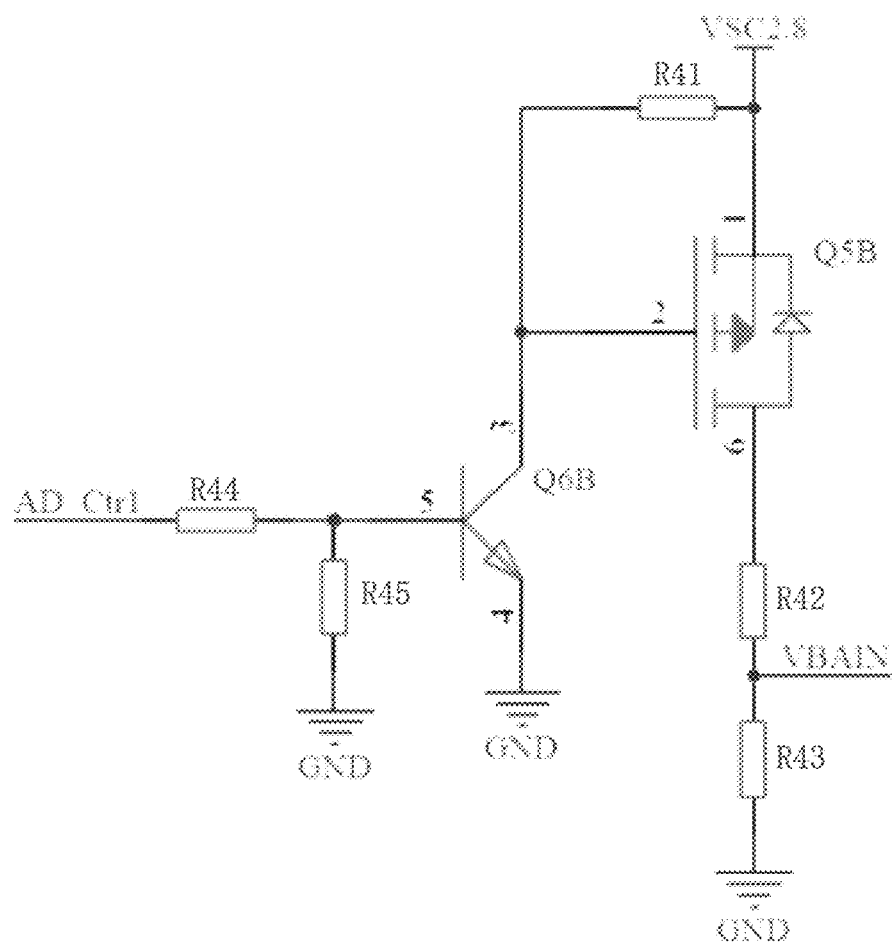
FIG. 37 is a schematic circuit diagram of another sampling module according to an embodiment of the present disclosure.
Figure 38:
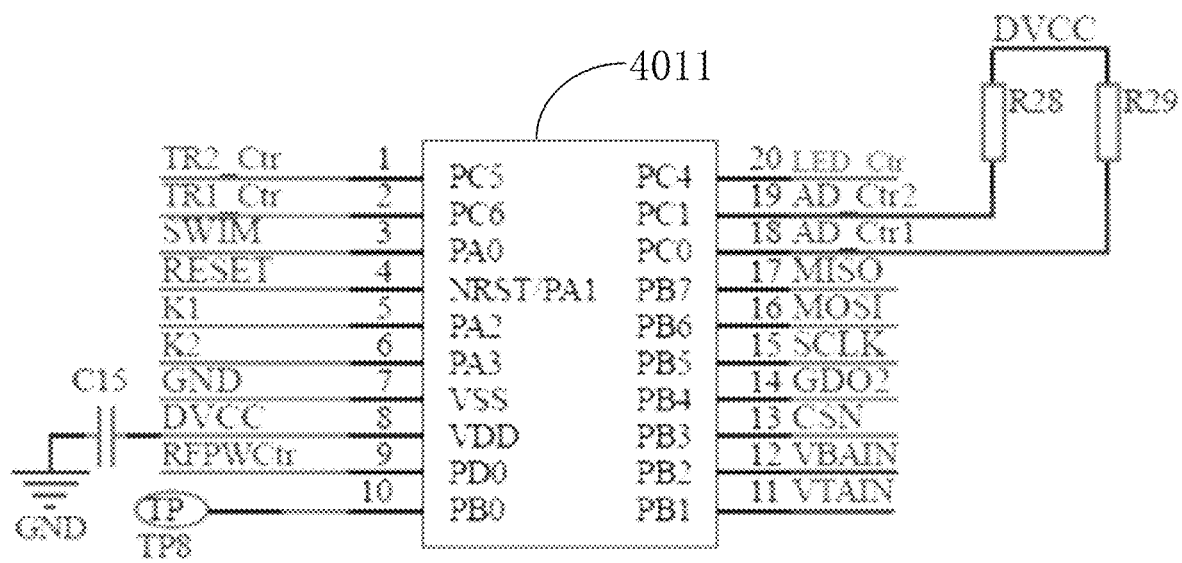
FIG. 38 is a schematic circuit diagram II of a control unit according to an embodiment of the present disclosure.
Figure 39:
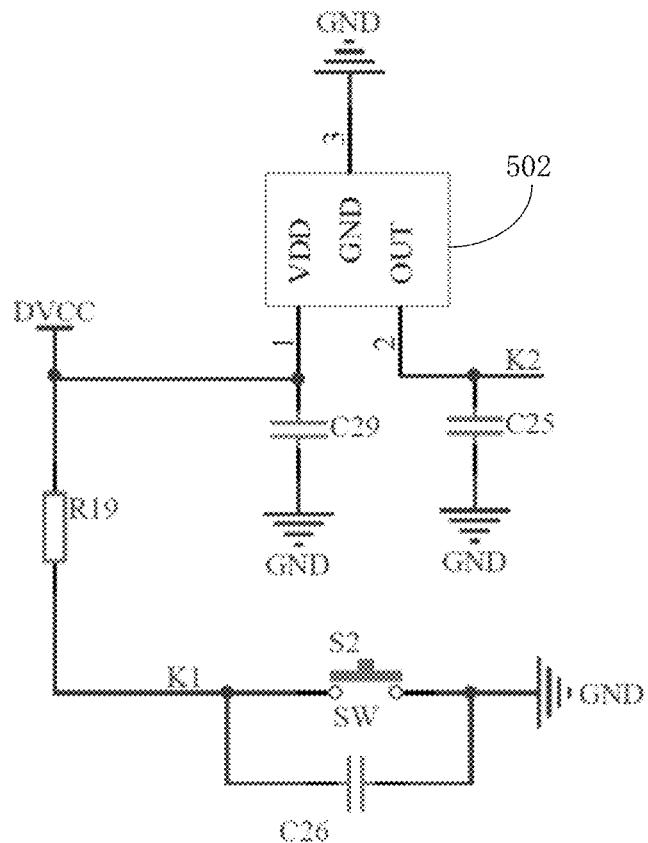
FIG. 39 is a schematic configuration diagram IV of a part of a power supply circuit and a sensor according to an embodiment of the present disclosure.

Therefore, in the circuit shown in FIG. 37, the voltage of the second energy storage module (for example, the large capacity capacitor) can be measured by one transistor, thereby discarding the resistor R15 in FIG. 13, and in the circuit shown in FIG. 37, the control unit can detect the voltage of the second energy storage module (for example, the large capacity capacitor) via the sampling module shown in FIG. 37, wherein the voltage VSC2.8 is the voltage of the second energy storage module (for example, the large capacity capacitor).

For a specific example, referring to FIG. 37, the acquisition module may include: a transistor Q5B and a driver tube Q6B, wherein a first end of the transistor Q5B is connected to a gate electrode of the transistor Q6B, a resistor R41 is provided between the gate electrodes of the first end of the transistor Q6B, the first end of the transistor Q6B can be connected to a second energy storage module so as to acquire a voltage of the second energy storage module, and a second end of the transistor Q6B is grounded via the resistor R42 and the resistor R43, and then the resistor R42 and the resistor R43 can realize voltage division so as to form a voltage VBAIN, which can be input to the control unit and represents the voltage of the second energy storage module. The control unit of the power consumption module is connected between the resistor R42 and the resistor R43, the control terminal of the driver tube Q6B is grounded via the resistor R45, and the control terminal of the driver tube Q6B is also connected to the control unit via the resistor R44 so as to receive a control signal.

By means of the control signal, the driver tube Q6B can be controlled to be turned on when measurement is required, and the control unit measures the voltage of the second energy storage module (for example, the large capacity capacitor) after being divided by the resistor R42 and the resistor R43, so as to obtain the voltage of the second energy storage module (for example, the large capacity capacitor).

The AD_Ctrl pin in FIG. 37 can be connected to the control unit (e.g. MCU) for controlling the on/off of the driver tube Q5B, and the VBAIN pin is connected to the control unit (e.g. MCU) for acquiring the voltage of the first energy storage module (e.g. the large capacity capacitor).

In a transportation mode, the transistor Q6B and the driver tube Q6B are turned off, so that leakage can be prevented. When the voltage of the second energy storage module (e.g. the large capacity capacitor) is measured, VBAIN will not be greater than the output voltage VDD (1.8V) of DCDC due to the presence of voltage dividing resistors (i.e. resistors R42 and R43). Furthermore, the purpose of measuring the voltage of the second energy storage module (e.g. the large capacity capacitor) may also be that, for example, the voltage value of the large capacity capacitor is acquired and sent to the user for viewing.

Figure 40:
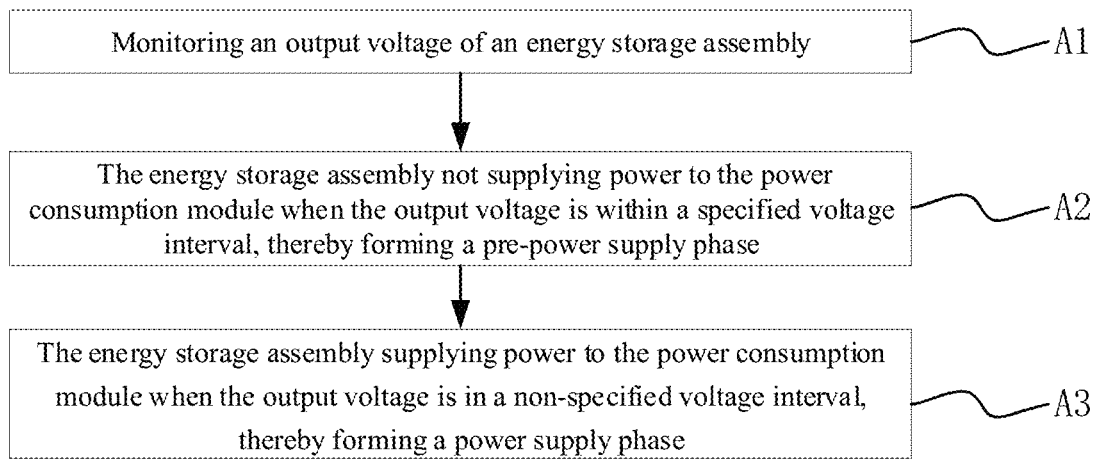
FIG. 40 is a schematic flowchart of a control method according to an embodiment of the present disclosure.

Correspondingly, in the control unit, a pin 18 of the MCU 4011 can be connected to the DVCC via a resistor R28, a pin 19 can be connected to the DVCC via a resistor R29, a pin 12 can be connected to the second energy storage module, and a pin 11 can be connected to the first energy storage module. In the transportation mode, the discharge circuit of the first energy storage module and/or the second energy storage module can also be disconnected, for example, the second on-off module and the power supply unit can be disconnected, so as to reduce the power consumption under long-term storage/transportation. Reducing a starting condition (in a specific case), in the case where the second energy storage module (for example, the large capacity capacitor) has power, a discharge loop can also be opened after starting up (such as the second on-off module 305 being turned on); and the second energy storage module (for example, the large capacity capacitor) can quickly charge the capacitor of the first energy storage module to (for example, the small capacity capacitor) the voltage of the second energy storage module and the voltage drop of a corresponding diode (the diode is connected to a diode between the first energy storage module and the second energy storage module, such as a first discharging diode D21). According to an embodiments of the present disclosure, a control method applied to a power supply circuit is provided, the power supply circuit being configured to supply power to the power consumption module, wherein with reference to FIG. 40, the control method comprises:

A1. monitoring an output voltage of an energy storage assembly;

A2. the energy storage assembly not supplying power to the power consumption module when the output voltage is within a specified voltage interval, thereby forming a pre-power supply phase; and A3. the energy storage assembly supplying power to the power consumption module when the output voltage is in a non-specified voltage interval, thereby forming a power supply phase.

Optionally, the energy storage assembly comprises a first energy storage module and a second energy storage module; step S2 further comprises that the first energy storage module is powered by a transducer.

Optionally, step A3 further comprises supplying power to the first energy storage module and the second energy storage module simultaneously via the transducer.

Optionally, a first end of the first energy storage module is directly or indirectly connected to a first end of a transducer, and a first end of the second energy storage module is connected to the first end of the transducer via a first on-off module; step A1 further includes:

supplying power to the first energy storage module via the transducer such that the first energy storage module is able to monitor an output voltage of the first energy storage module through a power supply module.

Optionally, an input side of the power supply module is respectively directly or indirectly connected to a first end of the first energy storage module and a first end of the second energy storage module, and an output side of the power supply module is connected to the power consumption module; and step A2 further comprises that when the output voltage is lower than a specified first voltage threshold value, the power supply module remains turned off such that a power supply circuit between the energy storage assembly and the power consumption module is disconnected, thereby forming the specified voltage interval ending at the first voltage threshold value.

Optionally, the control terminal of the first on-off module is connected to a control unit in the power consumption module; step A3 further includes:

in the power supply phase, the first on-off module is controlled to be turned on by the control unit, such that the second energy storage module receives and stores electrical energy generated by the transducer when the first on-off module is turned on.

Optionally, the first voltage threshold value matches the power required by the power consumption module to complete one time of powering up.

Optionally, the first voltage threshold value is greater than the power required by the power consumption module to complete one time of powering up.

Optionally, the control method further includes:

the control unit controlling the first on-off module to be turned off when the voltage of the second energy storage module reaches a second voltage threshold value.

Optionally, the second voltage threshold value matches a voltage at which the second energy storage module is fully charged.

Optionally, an input side of the power supply module is connected to a first end of the second energy storage module via a second on-off module; and a control terminal of the second on-off module is electrically connected to a control unit of the power consumption module so as to be controlled by the turning on and turning off of the control unit; and the control unit is configured and adapted to control the turning on and turning off of the second on-off module during the power supply phase, and when the second on-off module is turned on, the electrical energy of the second energy storage module is able to be supplied to the power consumption module by the power supply module.

Optionally, the power supply module comprises a power supply unit, a first conversion portion, a second conversion portion, and a conversion portion switching portion; a first node of the conversion portion switching portion is directly or indirectly connected to the first end of the first energy storage module and the first end of the second energy storage module, a second node of the conversion portion switching portion is connected to an input side of the first conversion portion, and a third node of the conversion portion switching portion is connected to an input side of the second conversion portion; a control terminal of the conversion portion switching portion is further connected to the control unit; and an input side of the power supply unit is directly or indirectly connected to the first end of the first energy storage module and the first end of the second energy storage module, and an output side of the power supply unit is connected to a power supply terminal of the power consumption module; and the control method further includes:

the control unit controlling the conversion portion switching portion to switch on the first node and the third node when a voltage at the input side of the power supply unit is lower than a conversion portion switching threshold value; and the control unit controlling the conversion portion switching portion to switch on the first node and the second node when the voltage at the input side of the power supply unit is greater than the conversion portion switching threshold value.

Optionally, the first conversion portion is a switch power supply, and the second conversion portion is a linear regulator.

Optionally, the power supply assembly further comprises a first switching unit and a second switching unit;

a first node of the first switching unit is connected to the second end of the transducer, a second node of the first switching unit is grounded, and a third node of the first switching unit is connected to the first end of the second energy storage module; and a control terminal of the first switching unit is further connected to the control unit;

a first node of the second switching unit is connected to the second end of the first energy storage module, a second end of the second switching portion unit is connected to the first end of the second energy storage module, and a third node of the second switching unit is grounded; and a control terminal of the second switching unit is further connected to the control unit;

the control method further includes:

the control unit controlling the first switching unit to switch on the first node and the second node and controlling the second switching unit to switch on the first node and the third node when the power supply module supplies power to the power consumption module and the voltage at the input side of the power supply module is greater than the specified voltage threshold value; and the control unit controlling the first switching unit to switch on the first node and the third node and controlling the second switching unit to switch on the first node and the second node when the power supply module supplies power to the power consumption module and the voltage at the input side of the power supply module is lower than the specified voltage threshold value;

Optionally, the power consumption module further comprises a wireless unit connected to the control unit, the output side of the power supply module is further connected to the power supply terminal of the wireless unit via a wireless on-off unit, and a control terminal of the wireless on-off unit is connected to the control unit; and the control method further includes:

the control unit controlling the wireless on-off unit to be turned on when it is necessary to use the wireless unit to send or receive the wireless signal; and the control unit controlling the wireless on-off unit to be turned off when it is unnecessary to use the wireless unit to send or receive the wireless signal.

Optionally, the power consumption module is further connected to a sensor comprising a state switching portion capable of changing in response to a detection result of external detection, the state switching portion being connected to the control unit;

the control method further includes:

the control unit acquiring the detection result from the state switching portion; and the control unit sending out a state update message which is able to characterize the detection result.

The state update message therein is a kind of content of a wireless signal control unit thereof sends out a wireless signal via a wireless unit) sent by the power consumption module. The status update message may characterize the detection result or a change in the detection result.

Optionally, the state switching portion has at least three nodes, wherein the at least three nodes comprise a first feedback node, a second feedback node and a grounding node, the two feedback nodes are respectively connected to different ports of the control unit, the first feedback node is connected to a first feedback switch, the second feedback node is connected to a second feedback switch, and a voltage of the first feedback node or the second feedback node is able to be pulled to match the voltage of the output side of the power supply module;

the control method further includes that:

after the grounding node changes from a state where the second feedback node is turned on to a state where the first feedback node is turned on, the first feedback switch is controlled to perform a turn-off action by the control unit, and the second feedback switch is controlled to perform a turn-on action, such that the control unit can detect whether the grounding node turns on the second feedback node; and after the grounding node changes from a state where the first feedback node is turned on to a state where the second feedback node is turned on, the second feedback switch is controlled to perform a turn-off action by the control unit, and the first feedback switch is controlled to perform a turn-on action, such that the control unit can detect whether the grounding node turns on the first feedback node.

In one embodiment, before sending out a state update message which is able to characterize the detection result, the method further includes:

when in the first mode, if the detection result changes, generating the state update message which can represent the changed detection result.

The first mode therein can be understood as a normal operating mode of the sensing device (or understood as comprising a power consumption module and a sensor), in which mode, the above-mentioned state update of the state update message can be realized, and in some solutions, a heartbeat message can also be sent and received regularly in the normal operating mode, so as to ensure that the connection between the sensing device (or understood as comprising a power consumption module and a sensor) and the server is maintained.

Further, the control method further includes that:

when in the first mode and the detection result does not change, if the control unit hibernates for a preset timing duration, the control unit wakes up once, and sends a heartbeat message to the outside once after each wake-up, and hibernates again after sending the heartbeat message. In an embodiment, the control method further includes:

controlling a second on-off module between the first end of the second energy storage module and the input side of the power supply module to remain off when in the second mode.

Battery products (e.g. sensing devices) consume power during transportation and storage due to hibernation, and sensing devices can, since solar panels provide power in addition to batteries, use solar panels for power-on actions, and cut off battery power during transportation and storage to save battery power. Further, the mode of the sensing device (or understood to include both the power module and the sensor) may include the storage mode as a second mode in addition to the normal operating mode.

During storage or transportation, the control unit may control the second on-off module 305 to be in an off-state in the second mode, thereby ensuring that the main power supply is not depleted during transportation and long-term storage, resulting in a non-start-up problem. Further, the control method further includes:

determining that the sensing device enters the second mode if a first conversion signal is acquired in the first mode; and determining that the sensing device enters the first mode if a second conversion signal is acquired in the second mode.

Optionally, the power module further includes a key coupled to the control unit, the first conversion signal being generated in response to a first manipulation of the key and the second conversion signal being generated in response to a second manipulation of the key.

Optionally, at least one of the following of the first and second manipulations is different:

a key pressed;

a number of times the key is pressed; and a length of time a key is pressed.

Optionally, the first manipulation is that the key is pressed for a first specified period of time; and the second manipulation is that the key is pressed a specified number of times, and the interval between two adjacent presses is less than a second specified duration.

With the above-mentioned solution, switching between the two modes (i.e. switching between the first mode and the second mode, i.e. switching between the normal operating mode and the storage mode) can be achieved. The keys therein may for example be a key KEY1, a key KEY2, a key S2), i.e. an actuator.

Optionally, after determining that the sensing device enters the first mode, the method further includes: sending out a corresponding first mode packet to the outside; and after determining that the sensing device enters the second mode, the method further includes: sending out a corresponding second mode packet to the outside.

Optionally, the power consumption module further includes an indication unit; the indication unit may be, for example, the indication unit 402 shown in FIG. 30.

After determining that the power consumption module enters the first mode, the method further includes: controlling the indication unit to emit light to the outside so as to feed back a first feedback signal; and after determining that the power consumption module enters the second mode, the method further includes: controlling the indication unit to emit light to the outside so as to feed back a second feedback signal.

Optionally, at least one of the following terms of the first feedback signal and the second feedback signal is different:

luminescence times;

luminescence duration; and luminescence color.

Optionally, the first feedback signal is illuminated N times and the second feedback signal is illuminated M times, wherein M is not equal to N.

It can be seen that in the above-mentioned solution, external feedback of modes can be achieved. Optionally, determining that the sensing device enters the first mode includes: setting a mode identifier of the sensing device as a first mode identifier corresponding to the first mode to use the first mode identifier to indicate that the power consumption module is in the first mode; and determining that the sensing device enters the second mode includes: setting the mode identifier of the sensing device to a second mode identifier corresponding to the second mode to use the second mode identifier to indicate that the power consumption module is in the second mode.

If the sensor is a door or window sensor: the solar panel can quickly start the power consumption module through the first energy storage module after a certain period of illumination, so that a sensor connected to the power consumption module is activated, namely, a certain illumination can complete a power-on action. Thus, the simple logic of simply turning off the second on-off module 305 can cause a problem of accidental power-on with light (e.g. solar panels accidentally receive light during product transport or handling, resulting in automatic power-on).

For this purpose, a mode flag (namely, a mode identifier) can be stored in the control unit, and the flag indicates whether the second energy storage module is switched on at the next start-up, namely, an additional triggering condition is required to trigger the second energy storage module to be switched on after entering a storage mode, so that it can be ensured that the system is not accidentally triggered to switch on the second energy storage module and consume power. In the non-storage mode, the flag can be used to indicate that the system is booted, i.e. the system can be booted autonomously as long as the boot condition is met without external intervention.

Examples of Actual Handling Process:

In a normal operating mode, long pressing a key 3S (this key can be, for example, the key S2 in FIG. 22), then the control unit can send a mode switching message (for example, a second mode message) via the wireless unit, and the light-emitting diode LED1 in the indication unit 402 flashes three times and then enters a storage mode (namely, a second mode). In the storage mode (namely, the second mode), the control unit instructs the second on-off module to turn off so as to turn off a discharge loop of the second energy storage module (for example, the capacitor C1), and sets a mode identifier to 1 in the memory to indicate that the storage mode (namely, the second mode) is currently. After entering the storage mode (namely, the second mode), if there is no continuous light, the electrical energy in the first energy storage module will quickly consume light, so that the system is powered down to notify the operation and can be transported or stored. In the storage mode, even if the solar panel accidentally receives light and activates the sensor, when the control unit detects that the mode identifier is 1 after power-on, the second on-off module will still be disconnected, so that the discharge loop of the lithium battery (for example, the second energy storage module) is disconnected, and the operation will be stopped soon after the electrical energy consumption in the first energy storage module is finished.

If the key is pressed for three times in short succession (the interval is less than 1S), a mode switching message (for example, a first mode message) is sent once, the light-emitting diode LED1 blinks once, and the control unit sets a mode identifier to 0, indicating that a normal operating mode is entered from a storage mode, and sending out a heartbeat message and detecting a sensor can be realized.

Optionally, the transducer may be an energy converter that converts any one or more of optical energy, electromagnetic wave energy, vibration energy, and thermal energy into electrical energy.

Optionally, capacitance of the first energy storage module is less than capacitance value of the second energy storage module; and the capacitance of the first energy storage module is greater than a minimum electrical energy required for the power consumption module to initialize once.

Optionally, the first energy storage module is configured as a capacitor so as to be quickly charged to activate the power consumption module.

In the above-mentioned solution, the operation of the control unit can also be regarded as a control method.

An embodiment of the present disclosure also provides an electronic device comprising:
 a processor; and
 a memory for storing executable instructions of the processor,
 wherein the processor is configured to perform the above-mentioned method, in particular wherein the operating process of the control unit, via the execution of the executable instructions.

The processor is capable of communicating with memory over bus.

The embodiment of the present disclosure further provides a computer-readable storage medium having stored thereon computer programs, wherein the programs, when executed by a processor, implement the method described above, in particular wherein the operation of the unit is controlled.

Those of ordinary skill in the art will appreciate that all or some of the steps to implement the method embodiments described above may be performed by hardware associated with program instructions.

The aforementioned program may be stored in a computer-readable storage medium. The program, when executed, performs steps comprising the various method embodiments described above. The storage medium includes: various media can store program codes, such as ROM, RAM, magnetic or optical disks.

Figure 41:
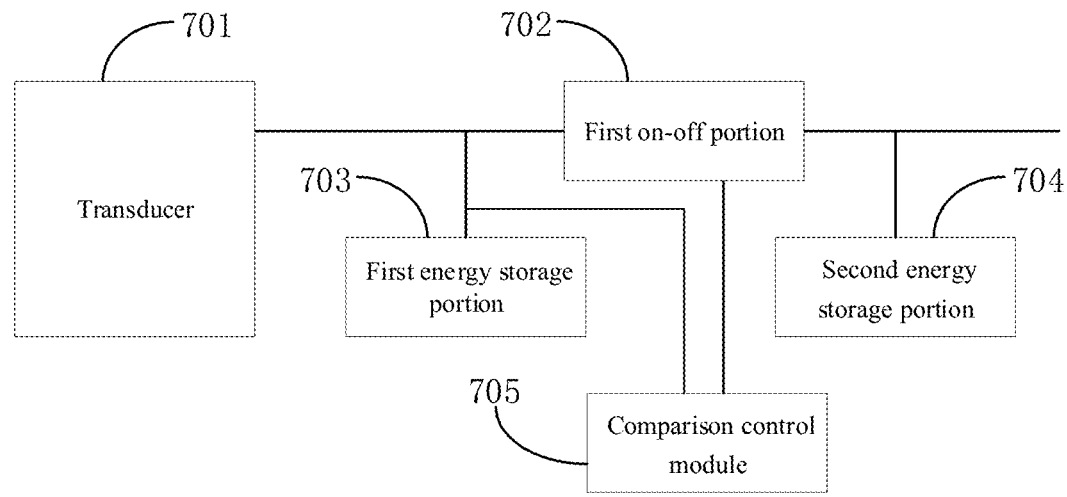
FIG. 41 is a schematic configuration diagram I of a power supply circuit according to another embodiment of the present disclosure.

With reference to FIG. 41, an embodiment of the present disclosure further provides another power supply circuit, comprising:
 a transducer 701 for generating electrical energy;
 a first energy storage portion 703 directly or indirectly operably connected to the transducer 701 and configured to receive and store the electrical energy;
 a second energy storage portion 704 directly or indirectly connected to the transducer 701 through a first on-off portion 702 and configured to be adapted to receive and store the electrical energy when the first on-off portion 702 is turned on; and
 a comparison control module 705, the comparison control module 705 being configured and adapted to monitor the voltage of the first energy storage portion 703 in the circuit, and when the voltage of the first energy storage portion 703 is lower than a specified threshold value, using an output control terminal to output to the first on-off portion 702 a first level for controlling the first on-off portion to be turned off or controlling the output control terminal to be in a high resistance state,
 wherein when the output control terminal is in the high impedance state, the first on-off portion 702 is kept off, so that the transducer 701 only charges the first energy storage portion 703 to form a first charging state; and
 when the voltage of the first energy storage portion 703 is greater than or equal to the specified threshold value, the output control terminal is used to output to the first on-off portion 702 a second level for controlling the first on-off portion 702 to be turned on so that the transducer 701 supplies power to the first energy storage portion 703 and the second energy storage portion 704 simultaneously to form a second charging state.

Figure 42:
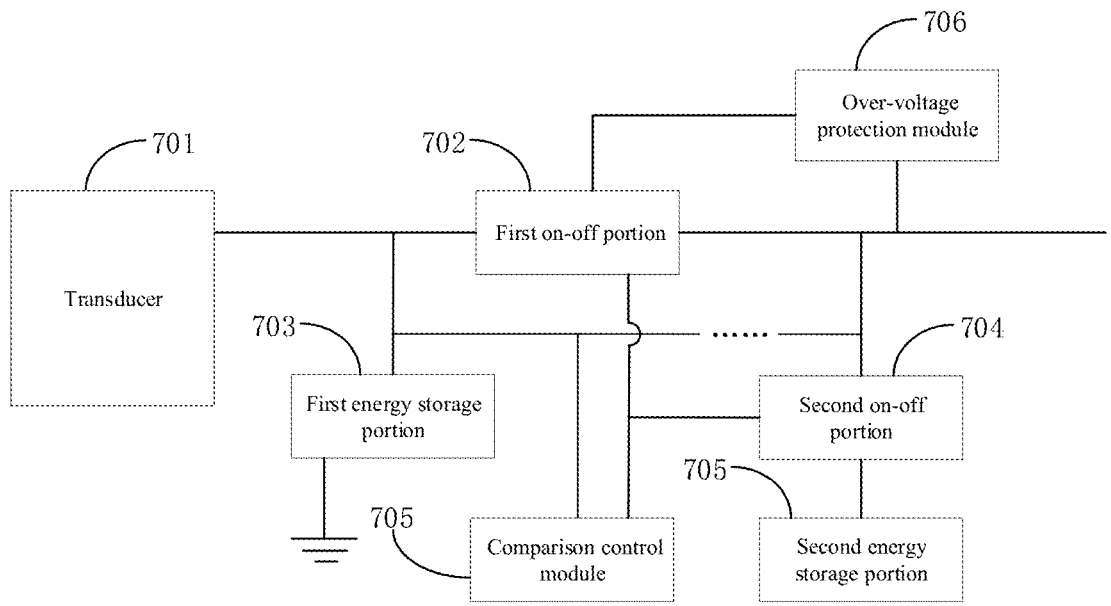
FIG. 42 is a schematic configuration diagram II of a power supply circuit according to another embodiment of the present disclosure.

In one embodiment, referring to FIG. 42, the comparison control module 705 is further configured and adapted to monitor a voltage of the second energy storage portion 704 in the circuit, and output a first level for controlling the first on-off portion 702 to be turned off to the first on-off portion 702 or control the output control terminal to be in the high impedance state using the output control terminal when the voltage of the second energy storage portion 704 is lower than the specified threshold value, such that the transducer 701 switches between the first charging state and the second charging state.

In the above-mentioned solution, the first energy storage portion can be charged preferentially when the first energy storage portion has a low electric quantity, and compared with the solution of charging both energy storage portions simultaneously, the charging efficiency at this time can be effectively improved, and rapid charging can be achieved, thereby providing a basis for rapid start-up.

Referring to FIG. 42, the power supply circuit further includes a second on-off portion 704; the output terminal of the transducer 701 is directly or indirectly connected to the first end of the first energy storage portion 703, a second end of the first energy storage portion 703 is grounded, the first end of the first energy storage portion 703 is further connected to the first end of the first on-off portion 702, the output terminal of the transducer 701 is further connected to the first end of the first on-off portion 702, the second end of the first on-off portion 702 is directly or indirectly connected to the first end of the second on-off portion 704, the first end of the second energy storage portion 705 is connected to a second end of the second on-off portion 704, and a second end of the second energy storage portion 705 is grounded; a power supply node between the second end of the first on-off portion 702 and the first end of the second on-off portion 704 is also connected to the power consumption module wherein the power consumption module can be powered via the power supply node, and the power consumption module here can be understood with reference to the foregoing, and can also be connected to the sensor; and the comparison control module 705 is respectively directly or indirectly connected to the first end of the first energy storage portion 703, a control terminal of the first on-off portion 702 and a control terminal of the second on-off portion 704.

When the second on-off portion 704 is turned off, the first energy storage portion 703 separately supplies power to the power consumption module; and
 when the second on-off portion 704 is turned on, the first energy storage portion 703 and the second energy storage portion 705 supply power to the power consumption module simultaneously.

Furthermore, in the above-mentioned aspect, it is possible to selectively use the first energy storage portion to supply power to the electric module, or to simultaneously use the first energy storage portion and the second energy storage portion to supply power to the electric module, which helps to avoid using the second energy storage module to supply power when the electric quantity of the second energy storage module is low.

In one embodiment, the specified threshold value is greater than an operating voltage of the power consumption module. Furthermore, it is ensured that the operational requirements of the power consumption module can be satisfied as a result of the rapid charging of the first energy storage portion.

In one embodiment, referring to FIG. 42, the power supply circuit further includes an over-voltage protection module, the over-voltage protection module 706 directly or indirectly connecting the power supply node and the first on-off portion; and the over-voltage protection module 706 is configured for:

detecting a voltage of the power supply node, and when the voltage of the power supply node is greater than an upper threshold value, outputting to the first on-off portion a protection signal for causing the first on-off portion to be turned off.

Figure 43:
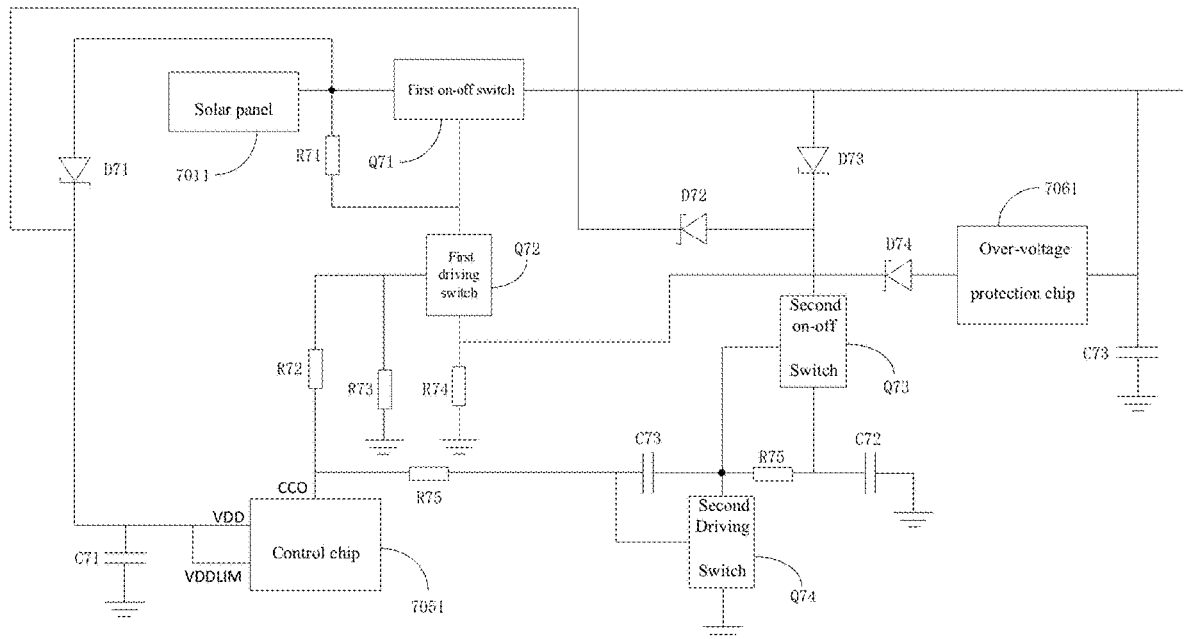
FIG. 43 is a schematic circuit diagram of a power supply circuit according to another embodiment of the present disclosure.

Further, referring to FIG. 43, the over-voltage protection module 706 includes an over-voltage protection chip 7061; and an input terminal of the over-voltage protection chip 7061 is connected to the power supply node and is grounded via a detection capacitor C73; a reset end of the over-voltage protection chip 7061 is connected to the first on-off portion via a diode D74; and a positive electrode of the diode D74 is connected to the reset end of the over-voltage protection chip 7061.

In one embodiment, referring to FIG. 43, the power supply circuit further includes a first zener diode D71, wherein a positive electrode of the first zener diode D71 is connected to the output terminal of the transducer 701 (for example, a solar panel 7011) and a first end of the first on-off portion 702, and a negative end of the first zener diode D71 is connected to a first end of the first energy storage portion 703 (for example, the capacitor C71). Here, reverse discharge of the first energy storage portion can be avoided by the first zener diode D71.

In one embodiment, the power supply circuit further includes a second zener diode D72, the second zener diode D72 is connected between the power supply node and the first end of the second on-off portion 704, and a negative electrode of the second zener diode D73 is connected to the first end of the second on-off portion 704. Here, reverse discharge of the second energy storage portion can be avoided by the second zener diode D72.

In one embodiment, the power supply circuit further includes a third zener diode D73, wherein a positive electrode of the third zener diode D73 is connected to a first end of the second on-off portion 704, and a negative end of the second zener diode D73 is connected to a first end of the first energy storage portion 703 (for example, the capacitor C71). By means of the third zener diode, the electrical energy of the second energy storage portion (e.g. The capacitor C72) can be prevented from being transferred back to the first energy storage portion 703 (e.g. The capacitor C71), thereby saving electrical energy.

In a specific solution, referring to FIG. 43, the first on-off portion comprises a first driving switch Q72 and a first on-off switch Q71, a first end of the first driving switch Q72 is connected to a control terminal of the first on-off switch Q71, a second end of the first driving switch Q72 is directly or indirectly grounded, a control terminal of the first driving switch Q72 is directly or indirectly connected to the comparison control module 705 so as to receive the first level and the second level wherein for example, the control terminal of the first driving switch Q72 may be connected to the comparison control module 705 via a resistor R72, and a first end of the first on-off switch Q71 serves as the first end of the first on-off portion Q71, a second end of the first on-off switch Q71 serves as the second end of the first on-off portion, and a resistor R71 is further connected between the first end of the first on-off switch Q71 and the control terminal.

The first driving switch Q72 may be a triode or other transistor such as a field effect transistor, and the first on-off switch Q71 may be a field effect transistor or other transistor such as a triode.

If the second end of the first driving switch Q72 is further connected to the over-voltage protection module 706 to receive the protection signal sent by the over-voltage protection module to turn off the first on-off portion, the second end and a control terminal of the first driving switch Q72 are respectively grounded via a resistor R74 and a resistor R73.

In a specific solution, referring to FIG. 43, the second on-off portion comprises a second driving switch Q74 and a second on-off switch Q73, a first end of the second driving switch Q74 is connected to a control terminal of the second on-off switch Q73, a second end of the second driving switch Q74 is grounded, a control terminal of the second driving switch Q74 is directly or indirectly connected to the comparison control module 705 so as to receive the first level and the second level, and a first end of the second on-off switch Q73 serves as the first end of the second on-off portion, a second end of the second on-off switch Q73 serves as the second end of the second on-off portion, and a resistor R75 is further connected between the first end of the second on-off switch Q73 and the control terminal, and a capacitor C73 is connected between the first end of the second driving switch Q73 and the control terminal.

The comparison control module 705 is further configured for:

controlling the output control terminal to be in the high impedance state when the first energy storage portion 703 (for example, the capacitor C71) has just started to be charged and the voltage of the first energy storage portion 703 (for example, the capacitor C71) is always lower than the specified threshold value.

In a specific example, capacitance value of the first energy storage portion is less than capacitance value of the second energy storage portion. For example, the first energy storage portion (for example, the capacitor C71) has a capacitance value ranging from 470 μF to 1000 μF, and the second energy storage portion (for example, the capacitor C72) has a capacitance value of 0.25 F. Similar to the power supply circuit described above, the transducer may be an energy converter that converts any one or more of optical energy, electromagnetic wave energy, vibration energy, thermal energy into electrical energy, and may include, for example, a solar panel 7011. The solar panel may be an amorphous silicon low-light solar battery panel. The solar panel has a length of 35 mm and a width of 13 mm.

In a specific example, the comparison control module 705 can adopt a control chip 7051, and the control chip 7051 can adopt STM300$x$. Furthermore, in an exemplary operation process:

when the supply voltage VDD (i.e. the voltage of the capacitor C71) of the control chip 7051 reaches a typical VON threshold value (i.e. a specified threshold value) of 2.45 V, the charging switch as shown in the figure connects the short-term storage capacitor (for example, the capacitor C71) and the long-term storage capacitor (i.e. the capacitor C72) in parallel with the energy source (i.e. the solar panel).

If the supply voltage VDD (i.e. the voltage of the capacitor C71) is then below VON (i.e. a specified threshold value), switching back to short-term storage power alone (i.e. the solar panel only powers the capacitor C71) will charge faster (facilitating fast start-up).

As long as the long-term storage capacitor C72 voltage remains below VON (i.e. a specified threshold value), the first on-off switch Q71 switches continuously between short-term and long-term storage to ensure continuous operation of the device. This mechanism mitigates the effect of the lengthy time required to charge the long-term memory at start-up operation. In addition, the short-term storage capacitor C71 does not exceed VON (i.e. the specified threshold value) until the voltage on the long-term storage capacitor C72 also exceeds VON (i.e. the specified threshold value).

The first on-off switch Q71 can use a PMOS transistor, and the CCO pin output of the STM 300x chip drives the first driving switch Q72 to control charging and discharging. If the supply voltage VDD of the STM 300x chip is below the VON threshold value (i.e. the specified threshold value), only a small storage capacitor (i.e. the capacitor C71) is filled through the first zener diode D71. Once VON (i.e. the specified threshold value) is reached, the control signal at the CCO pin goes high, the second driving switch Q74 and the second on-off switch Q73 are opened, and the long-term storage capacitor C72 is filled through the second on-off switch Q73.

The VON (i.e. the specified threshold value) may be greater than the operating voltage (e.g. 1.8V) of the power consumption module (e.g. the MCU in the power consumption module as a control unit). The CCO pin outputs a low level when the supply voltage VDD is less than VON (i.e. the specified threshold value) and greater than the operating voltage of the power consumption module (e.g. the MCU serving as the control unit in the power consumption module), at which time only the short-term storage capacitor C71 is charged, and charging of the long-term storage capacitor C72 is not started until the supply voltage VDD is greater than VON (i.e. the specified threshold value). Through this process, quick start-up can be effectively ensured.

In a further example, two specified threshold values, VON and VOFF, may be combined, wherein, VON>VOFF.

After start-up, immediately after the start of charging, if the supply voltage VDD is less than VON, the COO pin can output a low level or a high resistance state, and controls the first on-off portion and the second on-off portion to be turned off. With the power consumption of the first capacitor C71, the power supply voltage VDD gradually increases, and if the power supply voltage VDD is greater than VON, then the CCO pin can output a high level, and controls the first on-off portion and the second on-off portion to be turned on. When the power supply voltage VDD decreases, if the power supply voltage VDD is not less than the VOFF, the output high level of the COO pin can be kept such that the first on-off portion and the second on-off portion are turned on. With discharging, if the power supply voltage is less than the VOFF, the COO pin can output a low level or a high resistance state, and controls the first on-off portion and the second on-off portion to be turned off.

In the above-mentioned scenario, the comparison control module such as a STM 300x chip may be designed for use with an external energy collector and an external energy store. In order to support fast start-up times and long-term operation without energy supply, two different types of energy storage are commonly used. Capacitors for small (short-term) energy storage (for example, the capacitor C71) is filled quickly and allow fast start-up, while capacitors for large (long-term) energy storage (for example, the capacitor C72) is filled more slowly, but may provide large buffering when no energy is available, e.g. in a solar sensor at night.

If both energy storages (for example, the capacitor C71 and capacitor C72) are depleted and the supply voltage is below VON (i.e. the specified threshold value), then only the small storage capacitor (for example, the capacitor C71) is charged. Once VON (i.e. the specified threshold value) is reached, the CCO pin output signal changes and the system will begin charging a large storage capacitor (for example, the capacitor C72).

Figure 44:
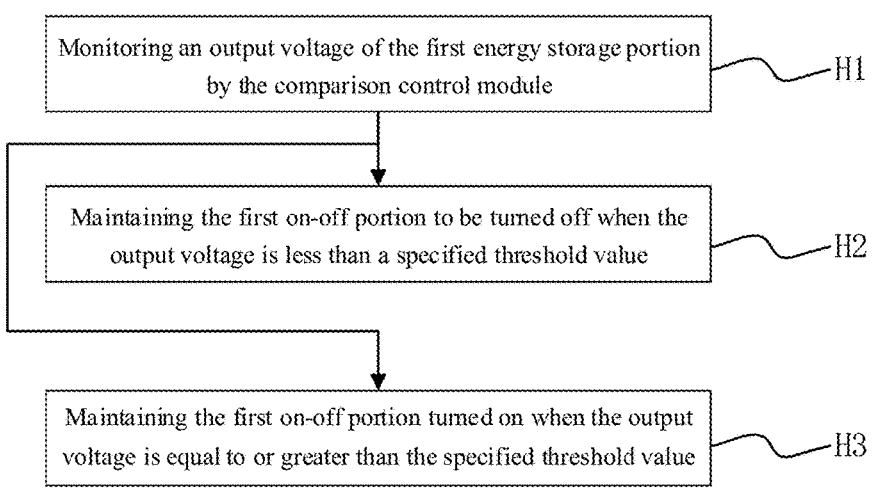
FIG. 44 is a schematic flowchart of a power supply method according to an embodiment of the present disclosure.

Matching the power supply circuit shown in FIGS. 41 and 43, an embodiment of the present disclosure also provides a power supply method applied in a power supply circuit, the power supply circuit comprising a comparison control module, a transducer, a first energy storage portion and a second energy storage portion;

the first energy storage portion is directly or indirectly electrically connected to the transducer, the second energy storage portion is connected to the transducer via a first on-off portion, and the first on-off portion is controlled by the comparison control module; and the power supply method, with reference to FIG. 44, includes the steps of:

H1. monitoring an output voltage of the first energy storage portion by the comparison control module;

H2. maintaining the first on-off portion to be turned off when the output voltage is less than a specified threshold value; and H3. maintaining the first on-off portion turned on when the output voltage is equal to or greater than the specified threshold value.

Optionally, step H2 further includes: supplying power to the first energy storage portion through the transducer.

Optionally, step H3 further includes: supplying power to the first energy storage portion and the second energy storage portion through the transducer.

Optionally, the first energy storage portion alone provides power to a power consumption module when the first switching unit is turned off.

Optionally, the second energy storage portion supplies power to a power consumption module via a second on-off portion controlled by the comparison control module; and when the first on-off portion is turned on, the second on-off portion is also turned on, such that the first energy storage portion and the second energy storage portion supply power to the power consumption module simultaneously.

Optionally, the specified threshold value is greater than an operating voltage of the power consumption module.

Optionally, capacitance value of the first energy storage portion is less than capacitance value of the second energy storage portion.

Optionally, the first energy storage portion has a capacitance value in the range of 470 μF to 1000 μF and the second energy storage portion has a capacitance value of 0.25 F.

Optionally, the transducer comprises a solar battery panel.

Figure 45:
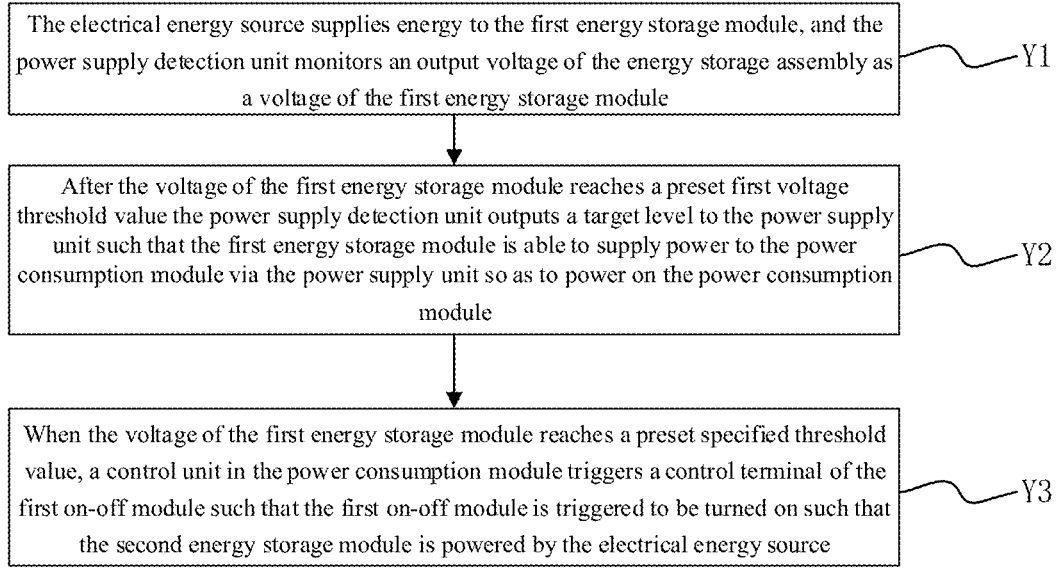
FIG. 45 is a schematic flowchart of a rapid start-up method according to an embodiment of the present disclosure.

An embodiment of the present disclosure provides a rapid start-up method applied to a power supply circuit, wherein the power supply circuit comprises an electrical energy source, an energy storage assembly and a power supply assembly, the energy storage assembly and the power supply assembly are configured for supplying power to a power consumption module, the energy storage assembly comprises a first energy storage module and a second energy storage module, the power supply assembly comprises a power supply module and a first on-off module, and the power supply module comprises a power supply unit and a power supply detection unit; a first end of the second energy storage module is electrically connected to a first end of the electrical energy source via the first on-off module; the electrical energy source may be, for example, the transducer mentioned above, but may also be an electrical energy source other than a transducer; and the rapid start-up method, with reference to FIG. 45, includes the steps that:

Y1. the electrical energy source supplies energy to the first energy storage module, and the power supply detection unit monitors an output voltage of the energy storage assembly as a voltage of the first energy storage module;

Y2. after the voltage of the first energy storage module reaches a preset first voltage threshold value, the power supply detection unit outputs a level to the power supply unit such that the first energy storage module is able to supply power to the power consumption module via the power supply unit so as to power on the power consumption module; and Y3. when the voltage of the first energy storage module reaches a preset specified threshold value, a control unit in the power consumption module triggers a control terminal of the first on-off module such that the first on-off module is triggered to be turned on such that the second energy storage module is powered by the electrical energy source, wherein the first voltage threshold value is less than the specified threshold value.

Optionally, when the power consumption module is in a powered-on state and the output voltage of the energy storage assembly is less than a power supply stoppage threshold value, the second on-off module is turned off, the energy storage assembly stops supplying power to the power consumption module, and the first voltage threshold value is greater than the power supply stoppage threshold value.

Optionally, the first on-off module comprises a first control terminal and a second control terminal, and is configured to be turned on when the first control terminal and the second control terminal are triggered simultaneously; and the rapid start-up method further comprises:

a first control terminal of the first on-off module receives a specified level and is triggered when the voltage of the first energy storage module is greater than the specified threshold value; and the first control terminal of the first on-off module stops receiving the specified level when the voltage of the first energy storage module is lower than the specified level.

Optionally, the power supply assembly further comprises an energy storage detection module, an input terminal of the energy storage detection module is electrically connected to a first end of the second energy storage module, and an output terminal is electrically connected to a second control terminal of the first on-off module; and the rapid start-up method further comprises:
monitoring a voltage of the second energy storage module;

triggering the second control terminal when the voltage of the second energy storage module does not reach a second voltage threshold value; and deactivating the second control terminal when the voltage of the second energy storage module reaches the second voltage threshold value.

Optionally, the power supply assembly further comprises a second on-off module; the second on-off module is connected between the first end of the second energy storage module and the input terminal of the power supply unit; and the rapid start-up method further comprises:
after the power consumption module is powered on, the second on-off module is turned on, and when the second on-off module is turned on, the electrical energy of the second energy storage module is able to be supplied to the power consumption module by the power supply unit.

Optionally, the first voltage threshold value matches a minimum power required for initialization of the power consumption module.

Optionally, the specified threshold value is greater than a minimum power required for initialization of the power consumption module.

Optionally, capacitance of the first energy storage module is less than capacitance of the second energy storage module; and the capacitance value of the first energy storage module is greater than a minimum electrical energy required for the power consumption module to initialize once.

Figure 46:
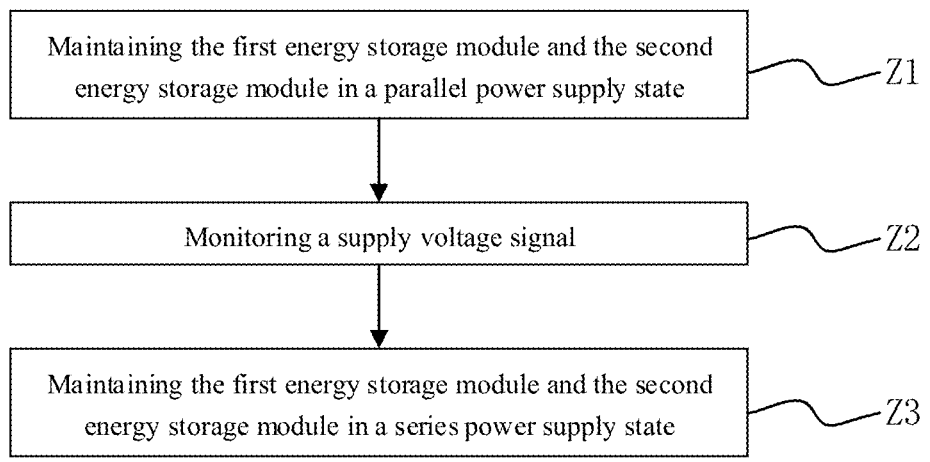
FIG. 46 is a schematic flowchart of a power supply method according to an embodiment of the present disclosure.

With reference to FIG. 46, an embodiment of the present disclosure provides a power supply method applied in a power supply circuit for supplying power to a power consumption module, wherein the power supply circuit comprises a first energy storage module and a second energy storage module, the power supply method comprising the steps of:

Z1. maintaining the first energy storage module and the second energy storage module in a parallel power supply state;

Z2. monitoring a supply voltage signal; and

Z3. maintaining the first energy storage module and the second energy storage module in a series power supply state.

Optionally, maintaining the first energy storage module and the second energy storage module in a parallel power supply state specifically includes:

a. supplying power to the first energy storage module such that the first energy storage module is applied to monitor an output voltage of the first energy storage module through a power supply detection unit;

b. when the output voltage of the first energy storage module reaches a preset first voltage threshold value, the power supply detection unit outputting the specified level to an enabling end of a power supply unit so as to enable the power supply unit, such that the first energy storage module can supply power for a power consumption module via the power supply unit;

c. when the output voltage of the first energy storage module reaches a preset second voltage threshold value, a control unit in the power consumption module enabling the second energy storage module to be powered by controlling a first on-off module to be turned on; and after the power consumption module is powered on, controlling a second on-off module to be turned on, and when the second on-off module conducts, the electrical energy of the second energy storage module can be supplied to the power consumption module by the power supply unit; and the first energy storage module and the second energy storage module are connected in parallel to supply energy to the power consumption module to form a parallel power supply state.

Optionally, power is supplied to the first energy storage module and the second energy storage module via a transducer.

Optionally, the control unit of the power consumption module acquires and monitors the output voltage of the first energy storage module, and uses same as the power supply voltage signal; when the power supply voltage signal is in a preset first threshold value range, connecting the negative electrode of the first energy storage module to the positive electrode of the second energy storage module, so that the first energy storage module and the second energy storage module form a serial circuit relationship to supply power to the power consumption module to form a serial power supply state.

Optionally, the control unit connects the negative electrode of the first energy storage module to the positive electrode of the second energy storage module via a first switching unit and a second switching unit; specifically include:

a first node of the first switching unit is connected to the second end of the transducer, a second node of the first switching unit is grounded, and a third node of the first switching unit is connected to the first end of the second energy storage module; and a control terminal of the first switching unit is further connected to the control unit of the power consumption module;

a first node of the second switching unit is connected to the second end of the first energy storage module, a second end of the second switching portion unit is connected to the first end of the second energy storage module, and a third node of the second switching unit is grounded; and a control terminal of the second switching unit is further connected to the control unit of the power consumption module; and the first switching unit is configured for:

turning on the first node and the second node under the control of the power consumption module when the power supply module supplies power to the power consumption module and the voltage at the input side of the power supply module is greater than the specified voltage threshold value; and turning on the first node and the third node under the control of the power consumption module when the power supply module supplies power to the power consumption module and the voltage at the input side of the power supply module is lower than the specified voltage threshold value; and the second switching unit is configured for:

turning on the first node and the third node under the control of the power consumption module when the power supply module supplies power to the power consumption module and the voltage at the input side of the power supply module is greater than the specified threshold value; and turning on the first node and the second node under the control of the power consumption module when the power supply module supplies power to the power consumption module and the voltage at the input side of the power supply module is lower than the specified voltage threshold value.

Optionally, the first switching unit includes a first switch tube and a second switch tube;

the first switch tube is connected to a first end of the second switch tube to form a first node of the first switching unit, a second end of the first switch tube forms a second node of the first switching unit, and a second end of the second switch tube forms a third node of the first switching unit; and a control terminal of the first switch tube is connected to the power consumption module, and a control terminal of the second switch tube is connected to the power consumption module via an inverter; or a control terminal of the second switch tube is connected to the power consumption module, and a control terminal of the first switch tube is connected to the power consumption module via an inverter.

Optionally, the second switching unit includes a third switch tube and a fourth switch tube;

the third switch tube is connected to a first end of the fourth switch tube to form a first node of the second switching unit, a second end of the third switch tube forms a second node of the third switching unit, and a second end of the fourth switch tube forms a third node of the second switching unit; and a control terminal of the third switch tube is connected to the power consumption module, and a control terminal of the fourth switch tube is connected to the power consumption module via an inverter; or a control terminal of the fourth switch tube is connected to the power consumption module, and a control terminal of the third switch tube is connected to the power consumption module via an inverter.

Optionally, the first voltage threshold value matches a minimum power required for initialization of the power consumption module.

Optionally, the second voltage threshold value is greater than a minimum power required for initialization of the power consumption module.

Optionally, capacitance of the first energy storage module is less than capacitance of the second energy storage module; and the capacitance value of the first energy storage module is greater than a minimum electrical energy required for the power consumption module to initialize once.

Embodiments of the disclosure also provide a sensing system including the sensing device mentioned above, a gateway and a terminal connected to the gateway.

Optionally, the terminal is configured and adapted to acquire the state update message transmitted by the sensing device, and feed back the state update message to the outside.

Optionally, the sensing system further includes a server; and the sensing device sends the state update message to the server via the gateway, such that the server sends a preset control instruction according to the state update message, so as to control a corresponding terminal.

Optionally, the server is a cloud server.

Finally, it should be noted that the above-mentioned embodiments are merely illustrative of the technical solution of the present disclosure, and are not restrictive. Although the present disclosure has been described in detail with reference to the foregoing embodiments, those skilled in the art will appreciate that the technical solutions disclosed in the above-mentioned embodiments can still be amended, or some or all of the technical features thereof can be replaced with equivalents. Such modifications and substitutions do not depart the substance of the corresponding technical solution from the scope of the technical solutions of the embodiments of the present disclosure.

The invention claimed is:

1. A power supply circuit, comprising:

a transducer configured to receive energy in a form other than electrical energy to produce electrical energy;

an energy storage assembly directly or indirectly operably connected to the transducer and configured to receive and store the electrical energy;

a power supply assembly, the power supply assembly being electrically connected between the energy storage assembly and a power consumption module, and being configured to monitor an output voltage of the energy storage assembly so that the energy storage assembly does not supply power to the power consumption module when the power consumption module is in a non-powered state and the output voltage is within a specified voltage range, thereby forming a pre-power supply phase; wherein the power supply assembly instructs the energy storage assembly to supply power to the power consumption module when the output voltage is within a non-specified voltage range, thereby forming a power supply phase;

wherein the energy storage assembly comprises a first energy storage module and a second energy storage module; the power supply assembly comprises a power supply module, an input side of the power supply module is respectively directly or indirectly connected to a first end of the first energy storage module and a first end of the second energy storage module, and an output side of the power supply module is connected to the power consumption module;

the power supply module is configured such that if it is detected that a voltage of the first energy storage module is within the specified voltage range when the power consumption module is not powered on, a power supply path between the energy storage assembly and the power consumption module is disconnected, thereby forming the pre-power supply phase; and the electrical energy stored by the first energy storage module and/or the second energy storage module is supplied to the power consumption module after the power consumption module is powered up, thereby forming the power supply phase;

wherein the power supply assembly further comprises a first on-off module;

a first end of the second energy storage module is electrically connected to a first end of the transducer via the first on-off module; the first on-off module is configured to remain off during the pre-power supply phase such that the transducer is charging only the first energy storage module during the pre-power supply phase; and the first energy storage module has a capacitance value in the range of 470 µF~1000 µF and the second energy storage module has a capacitance value in the range of 0.2 F~0.5 F.

2. The power supply circuit according to claim 1, wherein the power supply assembly is further configured to cause the energy storage assembly to supply power to the power consumption module when the power consumption module is in a powered state and the output voltage of the energy storage assembly is in a power supply voltage range; and cause the energy storage assembly to stop supplying power to the power consumption module when the output voltage is in a non-supply voltage range; and the specified voltage interval range refers to an range that is less than a first voltage threshold value; and the power supply voltage range refers to an range that is greater than a power supply stoppage threshold value, and the first voltage threshold value is greater than the power supply stoppage threshold value.

3. The power supply circuit according to claim 1, wherein the first on-off module comprises a first control terminal and a second control terminal, and is configured to be turned on when the first control terminal and the second control terminal are triggered simultaneously; the second energy storage module is used for receiving and storing the electrical energy generated by the transducer when the first on-off module is turned on; and the first control terminal of the first on-off module is configured to be triggered to receive a specified level during the power supply phase.

4. The power supply circuit according to claim 3, wherein the first control terminal of the first on-off module is configured for receiving the specified level and being triggered when the voltage of the first energy storage module is above a specified threshold value; and the specified threshold value is matched to a lowest operating voltage.

5. The power supply circuit according to claim 4, wherein when the voltage of the first energy storage module is above the specified threshold value during the power supply phase, the power consumption module is configured to output the specified level to the first control terminal of the first on-off module, in order to trigger the first control terminal of the first on-off module.

6. The power supply circuit according to claim 4, wherein the power supply assembly further comprises a charging determination and detection module, an input terminal of the charging determination and detection module is electrically connected to a first end of the first energy storage module, and an output terminal is electrically connected to a first control terminal of the first on-off module; and the charging determination and detection module is configured to output the specified level to the first control terminal of the first on-off module to trigger the first control terminal of the first on-off module when the voltage of the first energy storage module is above the specified threshold value during the power supply phase.

7. The power supply circuit according to claim 1, wherein the power supply assembly further comprises an energy storage detection module;

an input terminal of the energy storage detection module is electrically connected to a first end of the second energy storage module, and an output terminal of the energy storage detection module is electrically connected to a second control terminal of the first on-off module, the energy storage detection module is configured to monitor a voltage of the second energy storage module, and trigger the second control terminal when the voltage of the second energy storage module does not reach a second voltage threshold value, and the second control terminal is not triggered when the voltage of the second energy storage module reaches the second voltage threshold value; and the second voltage threshold value matches a voltage at which the second energy storage module is fully charged.

8. The power supply circuit according to claim 1, wherein the power supply module is specifically configured for:

if it is detected that the voltage of the first energy storage module does not reach the specified first voltage threshold value when the power consumption module is not powered on, keeping the power supply circuit between the first energy storage module and the second energy storage module with the power consumption module disconnected so as to form the specified voltage range with the first voltage threshold value as an end point;

if it is detected that the voltage of the first energy storage module reaches the specified first voltage threshold value, starting to supply the electrical energy stored by the first energy storage module to the power consumption module so as to power up the power consumption module; and the first voltage threshold value matches the power required by the power consumption module to complete one time of powering up.

9. The power supply circuit according to claim 8, wherein the power supply assembly further comprises:

a second on-off module connected between the first end of the second energy storage module and the input side of the power supply module;

the power consumption module is further configured to control the second on-off module to be turned on during the power supply phase, wherein when the second on-off module is turned on, the electrical energy stored by the second energy storage module is able to be supplied to the power consumption module by the power supply module; and the power consumption module is further electrically connected to the first end of the second energy storage module to monitor a voltage of the second energy storage module, so as to control the second on-off module to be turned on when the voltage of the second energy storage module reaches a preset third voltage threshold value, such that the electrical energy of the second energy storage module is able to be supplied by the power supply module to the power consumption module.

10. The power supply circuit according to claim 9, wherein the power supply module comprises a power supply unit and a power supply detection unit;

the input side of the power supply unit is directly or indirectly connected to the first end of the first energy storage module and the first end of the second energy storage module, and the output side of a power supply unit is connected to the power supply terminal of the power consumption module; the power supply detection unit is connected to the input side of the power supply unit, and the power supply detection unit is further connected to a trigger terminal of the power supply unit;

the power supply detection unit is configured to monitor a voltage at the input side of the power supply unit during the pre-power supply phase as the voltage of the first energy storage module;

when it is monitored that the voltage of the first energy storage module does not reach a specified first voltage threshold value, the power supply unit is not triggered, such that the power supply unit maintains an off state in the specified voltage range; and when it is monitored that the voltage of the first energy storage module reaches a specified first voltage threshold value, then a specified level is output to trigger the power supply unit to start operation, such that initialization of power-on of the power consumption module is completed.

11. The power supply circuit according to claim 9, wherein the second on-off module is connected between the first end of the second energy storage module and the input terminal of the power supply unit;

the power supply unit supplies the electrical energy stored by the first energy storage module to the power consumption module when the second on-off module is turned off; and the power supply unit supplies the electrical energy stored by the first energy storage module and the second energy storage module to the power consumption module when the second on-off module is turned on.

12. A sensing device, comprising:

at least one sensor, the sensor being provided to generate a sensing signal in response to a detection result of external detection;

a power supply circuit, the power supply circuit comprising:

a transducer configured to receive energy in a form other than electrical energy to produce electrical energy;

an energy storage assembly directly or indirectly operably connected to the transducer and configured to receive and store the electrical energy;

a power supply assembly, the power supply assembly being electrically connected between the energy storage assembly and a power consumption module, and being configured to monitor an output voltage of the energy storage assembly so that the energy storage assembly does not supply power to the power consumption module when the power consumption module is in a non-powered state and the output voltage is within a specified voltage range, thereby forming a pre-power supply phase; wherein the power supply assembly instructs the energy storage assembly to supply power to the power consumption module when the output voltage is within a non-specified voltage range, thereby forming a power supply phase, such that the power consumption module is powered during the power supply phase to transmit a wireless signal upon receiving the sensing signal; and the sensor is a door magnetic sensor.

13. The sensing device according to claim 12, wherein the power supply assembly is further configured to cause the energy storage assembly to supply power to the power consumption module when the power consumption module is in a powered state and the output voltage of the energy storage assembly is in a power supply voltage range; and cause the energy storage assembly to stop supplying power to the power consumption module when the output voltage is in a non-supply voltage range;

the supply voltage range partially coincides with the specified voltage range; and the specified voltage range refers to a range that is less than a first voltage threshold value; the power supply voltage range refers to a range that is greater than a power supply stoppage threshold value, and the first voltage threshold value is greater than the power supply stoppage threshold value.

14. The sensing device according to claim 12, wherein the energy storage assembly comprises a first energy storage module and a second energy storage module; the power supply assembly comprises a power supply module, an input side of the power supply module is respectively directly or indirectly connected to a first end of the first energy storage module and a first end of the second energy storage module, and an output side of the power supply assembly is connected to the power consumption module;

the power supply module is configured such that if it is detected that a voltage of the first energy storage module is within the specified voltage range when the power consumption module is not powered on, a power supply path between the energy storage assembly and the power consumption module is disconnected, thereby forming the pre-power supply phase; and the electrical energy stored by the first energy storage module and/or the second energy storage module is supplied to the power consumption module after the power consumption module is powered up, thereby forming the power supply phase.

15. The sensing device according to claim 14, wherein the power supply assembly comprises a first on-off module; and a first end of the second energy storage module is electrically connected to a first end of the transducer via the first on-off module; the first on-off module is configured to remain off during the pre-power supply phase such that the transducer is charging only the first energy storage module during the pre-power supply phase.

16. A power supply circuit, comprising:

a transducer for generating electrical energy;

a first energy storage portion directly or indirectly operably connected to the transducer and configured to receive and store the electrical energy;

a second energy storage portion directly or indirectly connected to the transducer through a first on-off portion and configured to be adapted to receive and store the electrical energy when the first on-off portion is turned on; and a comparison control module configured to monitor a voltage of the first energy storage portion, and when the voltage of the first energy storage portion is lower than a specified threshold value, either output a first level via an output control terminal to turn off the first on-off portion, or set the output control terminal to a high impedance state; and when the output control terminal is in the high impedance state, the first on-off portion is kept off, such that the transducer only charges the first energy storage portion to form a first charging state; and when the voltage of the first energy storage portion is greater than or equal to the specified threshold value, the output control terminal is used to output to the first on-off portion a second level for controlling the first on-off portion to be turned on such that the transducer supplies power to the first energy storage portion and the second energy storage portion simultaneously to form a second charging state;

further comprising a second on-off portion; the output terminal of the transducer is directly or indirectly connected to the first end of the first energy storage portion, a second end of the first energy storage portion is grounded, the first end of the first energy storage portion is further connected to the first end of the first on-off portion, the output terminal of the transducer is further connected to the first end of the first on-off portion, the second end of the first on-off portion is directly or indirectly connected to the first end of the second on-off portion, the first end of the second energy storage portion is connected to a second end of the second on-off portion, and a second end of the second energy storage portion is grounded; a power supply node between the second end of the first on-off portion and the first end of the second on-off portion is also connected to the power consumption module; and the comparison control module is respectively directly or indirectly connected to the first end of the first energy storage portion, a control terminal of the first on-off portion and a control terminal of the second on-off portion;

when the second on-off portion is turned off, the first energy storage portion separately supplies power to the power consumption module;

when the second on-off portion is turned on, the first energy storage portion and the second energy storage portion supply power to the power consumption module simultaneously; and the specified threshold value is greater than an operation voltage of the power consumption module.

17. The power supply circuit according to claim 16, wherein the comparison control module is further configured and adapted to monitor a voltage of the second energy storage portion in the circuit, and when the voltage of the second energy storage portion is lower than the specified threshold value, either output a first level via an output control terminal to turn off the first on-off portion, or set the output control terminal to a high impedance state, such that the transducer switches between the first charging state and the second charging state.

* * * * *